(12) United States Patent
Boro et al.

(10) Patent No.: US 9,736,134 B2
(45) Date of Patent: Aug. 15, 2017

(54) CHILD-ORIENTED COMPUTING SYSTEM

(71) Applicant: LeapFrog Enterprises, Inc., Emeryville, CA (US)

(72) Inventors: Clifford T. Boro, San Diego, CA (US); Vidar Vignisson, San Diego, CA (US); Thomas C. Broadhead, San Diego, CA (US); Will Von Reis, Del Mar, CA (US); Andrew Kreiling, Austin, TX (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 14/488,142

(22) Filed: Sep. 16, 2014

(65) Prior Publication Data

US 2015/0135285 A1  May 14, 2015

Related U.S. Application Data

(63) Continuation of application No. 12/037,082, filed on Feb. 25, 2008, now abandoned, which is a (Continued)

(51) Int. Cl.
| | |
|---|---|
| *G06F 17/30* | (2006.01) |
| *H04L 29/06* | (2006.01) |
| *G06F 21/62* | (2013.01) |
| *G06F 21/31* | (2013.01) |
| *H04L 29/08* | (2006.01) |
| *G06F 7/06* | (2006.01) |
| *G06F 3/048* | (2013.01) |

(52) U.S. Cl.
CPC .............. *H04L 63/08* (2013.01); *G06F 3/048* (2013.01); *G06F 7/06* (2013.01); *G06F 17/30* (2013.01); *G06F 21/31* (2013.01); *G06F 21/6218* (2013.01); *H04L 29/08072* (2013.01)

(58) Field of Classification Search
CPC .. G06F 17/30864; G06F 21/6218; G06F 7/06; G06F 7/30; H04L 63/0853
USPC ...... 707/781–783; 725/9–11, 25, 28, 30, 31; 726/2, 27; 709/217, 219, 227, 228, 229; 713/182; 715/741, 764
See application file for complete search history.

(56) References Cited

U.S. PATENT DOCUMENTS

| | | | |
|---|---|---|---|
| 5,382,983 | A | 1/1995 | Kwoh et al. |
| 5,678,041 | A | 10/1997 | Baker et al. |

(Continued)

FOREIGN PATENT DOCUMENTS

| | | |
|---|---|---|
| WO | 2006/102295 A2 | 9/2006 |
| WO | 2008/104003 A2 | 8/2008 |

OTHER PUBLICATIONS

Christiana et al., Internet Safety: Adolescents' Self-report, 2002, Google Scholar—Society for Adolescent Medecine, 7-10.*

(Continued)

*Primary Examiner* — Jean B Fleurantin
(74) *Attorney, Agent, or Firm* — Kilpatrick Townsend & Stockton LLP

(57) ABSTRACT

A child-oriented browsing system is provided wherein the system is implemented using a piece of client software, executing on the computing device of a child, and a website/server that manages the client software and other functions of the child-oriented browsing system.

20 Claims, 36 Drawing Sheets

Related U.S. Application Data continuation-in-part of application No. 11/385,982, filed on Mar. 20, 2006, now abandoned.

(60) Provisional application No. 60/903,040, filed on Feb. 23, 2007, provisional application No. 60/742,976, filed on Dec. 6, 2005, provisional application No. 60/663,215, filed on Mar. 18, 2005.

(56) References Cited

U.S. PATENT DOCUMENTS

| | | | |
|---|---|---|---|
| 5,948,054 | A | 9/1999 | Nielsen |
| 5,978,817 | A | 11/1999 | Giannandrea et al. |
| 5,996,011 | A | 11/1999 | Humes |
| 6,097,385 | A | 8/2000 | Robinson |
| 6,181,364 | B1 | 1/2001 | Ford |
| 6,356,921 | B1 | 3/2002 | Kumar et al. |
| 6,442,658 | B1 | 8/2002 | Hunt et al. |
| 6,539,430 | B1 | 3/2003 | Humes |
| 6,557,165 | B1 | 4/2003 | Nagashima et al. |
| 6,745,367 | B1 * | 6/2004 | Bates et al. ............ 715/205 |
| 6,772,336 | B1 | 8/2004 | Dixon, Jr. |
| 6,785,901 | B1 | 8/2004 | Horiwitz et al. |
| 6,928,453 | B2 | 8/2005 | Roddy |
| 7,080,037 | B2 | 7/2006 | Burger et al. |
| 7,080,139 | B1 | 7/2006 | Briggs et al. |
| 7,257,564 | B2 | 8/2007 | Loughmiller et al. |
| 7,302,488 | B2 | 11/2007 | Mathew et al. |
| 7,349,943 | B2 | 3/2008 | Lin et al. |
| 7,356,836 | B2 | 4/2008 | Bellinson et al. |
| 7,366,761 | B2 | 4/2008 | Murray et al. |
| 7,440,922 | B1 | 10/2008 | Kempkes et al. |
| 7,653,606 | B2 | 1/2010 | Loughmiller et al. |
| 7,720,463 | B2 | 5/2010 | Marsico |
| 7,849,143 | B2 | 12/2010 | Vuong |
| 7,908,282 | B2 | 3/2011 | Naick et al. |
| 7,949,563 | B2 | 5/2011 | Collins |
| 7,984,500 | B1 | 7/2011 | Khanna et al. |
| 8,046,700 | B2 | 10/2011 | Bates et al. |
| 8,065,173 | B2 | 11/2011 | Abu-Hakima et al. |
| 8,069,182 | B2 | 11/2011 | Pieper |
| 8,131,763 | B2 * | 3/2012 | Tuscano et al. ............ 707/783 |
| 8,185,953 | B2 | 5/2012 | Rothstein et al. |
| 8,495,222 | B2 | 7/2013 | Yamamoto |
| 8,578,501 | B1 | 11/2013 | Ogilvie |
| 8,768,954 | B2 | 7/2014 | Pieper |
| 8,868,741 | B2 | 10/2014 | Vignisson |
| 8,875,309 | B1 | 10/2014 | Diamond et al. |
| 8,909,655 | B1 | 12/2014 | McDonnell |
| 2002/0049806 | A1 | 4/2002 | Gatz et al. |
| 2002/0095415 | A1 | 7/2002 | Walker et al. |
| 2002/0133708 | A1 | 9/2002 | Gudorf et al. |
| 2003/0140152 | A1 | 7/2003 | Creig Humes |
| 2004/0003071 | A1 | 1/2004 | Mathew et al. |
| 2004/0003279 | A1 | 1/2004 | Beilinson |
| 2004/0051733 | A1 | 3/2004 | Katiz |
| 2004/0097287 | A1 | 5/2004 | Postrel |
| 2005/0028191 | A1 | 2/2005 | Sullivan et al. |
| 2005/0102407 | A1 | 5/2005 | Clapper |
| 2005/0114705 | A1 | 5/2005 | Reshef et al. |
| 2005/0114901 | A1 | 5/2005 | Yui et al. |
| 2005/0130112 | A1 | 6/2005 | Lotvin et al. |
| 2005/0144297 | A1 | 6/2005 | Dahlstrom et al. |
| 2005/0240530 | A1 | 10/2005 | Watanabe |
| 2006/0020596 | A1 | 1/2006 | Liu et al. |
| 2006/0041655 | A1 | 2/2006 | Holloway et al. |
| 2006/0080702 | A1 | 4/2006 | Diez et al. |
| 2006/0242306 | A1 | 10/2006 | Boro et al. |
| 2006/0248144 | A1 | 11/2006 | Zhu et al. |
| 2006/0253874 | A1 | 11/2006 | Stark et al. |
| 2007/0067794 | A1 | 3/2007 | Russell et al. |
| 2007/0073777 | A1 | 3/2007 | Werwath et al. |
| 2007/0124785 | A1 | 5/2007 | Marsico |
| 2007/0156757 | A1 | 7/2007 | Tang et al. |
| 2007/0156895 | A1 | 7/2007 | Vuong |
| 2007/0239639 | A1 | 10/2007 | Loughmiller et al. |
| 2007/0260603 | A1 * | 11/2007 | Tuscano et al. ............ 707/9 |
| 2007/0271220 | A1 | 11/2007 | Carter |
| 2008/0092171 | A1 | 4/2008 | Roberts et al. |
| 2008/0134093 | A1 | 6/2008 | Dharmarajan et al. |
| 2008/0195428 | A1 | 8/2008 | O'Sullivan |
| 2008/0196108 | A1 | 8/2008 | Dent et al. |
| 2008/0201488 | A1 | 8/2008 | Kenner et al. |
| 2008/0222717 | A1 | 9/2008 | Rothstein et al. |
| 2008/0228740 | A1 | 9/2008 | Weiss |
| 2008/0228776 | A1 | 9/2008 | Weiss |
| 2008/0250484 | A1 | 10/2008 | Chong et al. |
| 2008/0287106 | A1 | 11/2008 | Baldwin et al. |
| 2008/0307339 | A1 * | 12/2008 | Boro et al. ............ 715/764 |
| 2009/0132655 | A1 | 5/2009 | Behrens |
| 2009/0177519 | A1 | 7/2009 | Tota et al. |
| 2009/0254656 | A1 | 10/2009 | Vignisson et al. |
| 2013/0268669 | A1 | 10/2013 | Tessman et al. |
| 2015/0089599 | A1 | 3/2015 | Vignisson et al. |

OTHER PUBLICATIONS

Notice of Allowance dated Nov. 17, 2015 for U.S. Appl. No. 14/486,873, 18 pages.

Non-Final Office Action, dated Apr. 30, 2015, in U.S. Appl. No. 14/486,873, filed Sep. 15, 2014, 18 pages.

International Search Report dated Sep. 25, 2007 for International Patent Application No. PCT/US2006/010167 , 2 pages.

International Search Report dated May 26, 2009 for International Patent Application No. PCT/US2008/054927, 3 pages.

* cited by examiner

Category List

Enter Category Name [        ] [Go]

<< Previous Group | (1-20) (21-40) (41-60) (61-80) (81-100) ... (1161-1176) | Next Group >>

| Webpages | Photos | Videos | Name |
|---|---|---|---|
| 11 webpages of 165 | 8 photos of 491 | 1 videos of 23 | 123 |
| 0 webpages of 40 | 8 photos of 491 | 1 videos of 23 | 50 cent |
| 0 webpages of 6 | 0 photos of 0 | 3 videos of 7 | aaliyah |
| 7 webpages of 25 | 2 photos of 9 | 1 videos of 153 | aardvarks |
| 11 webpages of 207 | 13 photos of 184 | 15 videos of 622 | abc |
| 2 webpages of 53 | 0 photos of 0 | 0 videos of 3 | abc's and 123's |
| 9 webpages of 159 | 4 photos of 33 | 4 videos of 19 | Abraham Lincoln |
| 1 webpages of 27 | 0 photos of 7 | 0 videos of 135 | acid rain |
| 0 webpages of 817 | 2 photos of 351 | 8 videos of 708 | action |
| 11 webpages of 142 | 0 photos of 1 | 0 videos of 496 | action and adventure |
| 7 webpages of 58 | 4 photos of 10 | 1 videos of 5 | action figures |
| 0 webpages of 2848 | 0 photos of 24 | 5 videos of 54 | activities |
| 9 webpages of 52 | 0 photos of 3 | 7 videos of 260 | actors and actresses |
| 0 webpages of 0 | 0 photos of 0 | 1 videos of 2 | adam brody |
| 0 webpages of 1 | 0 photos of 0 | 8 videos of 326 | aerosmith |
| 4 webpages of 28 | 0 photos of 0 | 5 videos of 27 | aesop's fables |
| 1 webpages of 165 | 0 photos of 131 | 0 videos of 504 | afghanistan |

Search List: 123 (154 webpages)

[ Search Results | Keyword List | Old Tag List | Best Webpages | Rejected ] [ Photo List | Accepted Photos ]
[ Video List ] [ Accepted Videos ] [ Back to All Categories ]

<< Previous Group [ (1-20) (21-40) (41-60) (61-80) (81-100) ... (141-154) | Next Group >>

Learning Planet

☑ PreK(3-5) ☑ Basic(6-8) ☐ Advanced(9¡-11)

Undo Top www.learningplanet.com (id = 610)

Count The Bananas

☑ PreK(3-5) ☐ Basic(6-8) ☐ Advanced(9¡-11)

Undo Top www.storyplace.org (id = 634)

Do To Learn -- How Many?

☑ PreK(3-5) ☑ Basic(6-8) ☐ Advanced(9¡-11)

CHILD-ORIENTED COMPUTING SYSTEM

CROSS-REFERENCES TO RELATED APPLICATIONS

This application is a continuation of U.S. patent application Ser. No. 12/037,082, entitled "Child-Oriented Computing System," which claims priority to U.S. Provisional Patent Application Ser. No. 60/903,040, entitled "Child-Oriented Computing System," and filed on Feb. 23, 2007, which are incorporated herein in their entirety by reference.

This application is a continuation of U.S. patent application Ser. No. 12/037,982, entitled "Child-Oriented Computing System," which is a continuation-in-part of, and claims priority to, U.S. patent application Ser. No. 11/385,982 filed Mar. 20, 2006 entitled "Child-Oriented Computing Facilities," which claims priority from U.S. Provisional Application No. 60/742,976 filed Dec. 26, 2005 entitled "Computer Systems and Methods" and from U.S. Provisional Application No. 60/663,215 filed on Mar. 18, 2005 entitled "Computing System," which are incorporated herein in their entirety by reference.

FIELD OF THE INVENTION

This invention relates to methods and systems involving providing a child-oriented computing system, and more particularly, embodiments of the present invention relate to software systems adapted to facilitate child-oriented computing activities.

BACKGROUND OF THE INVENTION

It is well known that personal computing devices, when used in conjunction with the Internet, provide vast opportunities for learning, entertainment, communication, receiving timely information, accessing electronic/informational services, and so forth. It seems that everyone, from schoolchildren through elderly people, is increasingly using personal computing devices in the course of their daily activities, for work and for pleasure. This trend seems destined to continue into the foreseeable future.

Increasingly, children use personal computing devices to keep track of their schedules, check the weather, play games, communicate with friends and parents, complete homework assignments, learn new things, and so forth. This increased use of personal computing devices by children creates a challenge for parents, who may wish to monitor or filter the information to which a child has access. Moreover, a parent may determine that a child should spend more time using a personal computing device for one thing (such as doing homework) and less time using it for other things (such as playing games). Unfortunately, a modern personal computing device typically does not provide a parent with the controls that would allow him to define a policy relating to how a child may use the personal computing device.

More generally, most personal computing devices are directed at and best operated by adults. The hardware is typically sensitive to environmental conditions—cell phones fail when dropped in water, DVDs fail when scratched, and so forth. The software is typically loaded with features that, even when they work as advertised, are often hard to learn, explain, understand, or fully utilize. To illustrate this, consider some of the actions that are associated with clicking a mouse button in the Windows XP operating system: Rapidly double-left-clicking an icon may open the object associated with the icon or it may pull up a menu of options from which the user is supposed to select an application that should open the object. However, slowly double-left-clicking the icon may cause the name of the icon to be placed in an edit mode. Right clicking the icon may cause a menu of options to appear. Clearly, the designers of these personal computing devices assume that the users of the devices will bring a certain degree of care and cognition to the task of using the devices.

Unfortunately, it is not safe to assume that a child can provide the level of care or cognition required to effectively operate most personal computing devices. There remains a need for personal computing devices that are directed at children and that are associated with appropriate parental controls and oversight tools and techniques.

SUMMARY OF THE INVENTION

Described herein are systems and methods for providing a child-oriented computing system.

In embodiments, the methods and systems disclosed herein include a combination system that includes a PC, TV, DVD Player and Personal Video Recorder designed for children. The system may use an operating system (e.g. Linux operating system, Window's operating system) with a graphical user interface designed to enable common tasks performed by kids, such as doing homework, playing games, and communicating with other kids. The system may be preloaded with games and homework tools, as well as ability to watch DVDs and TV (and record programs). The system may include communication software, such as email and instant messenger applications. The system may be provided with a form factor designed for children.

In embodiments the methods and systems may be provided with parental controls, such as controls that control the content that children can access (whether on television, websites, games, or the like), controls that restrict when children can access what content, and controls based on events (such as allowing access to games or television when homework is complete). Controls can be exercised by and/or shared with others, such as teachers, tutors, caregivers, or the like.

Methods and systems disclosed herein can include a subscription service that allows parents to modify controls through, for example, a remote network interface, such as a Web interface. Through the networks parents can help children keep schedules, such as waking them up, letting them know how to dress (such as based on the weather as determined through the web), sending timed messages about homework, sending photographs or video, or the like. In embodiments, the parental controls may provide control over the time when the applications on the computing system are available to the child. For example, a parent may set the controls to allow the child to watch television, video, or a DVD between certain hours in the day, while other activities such as word processing, spreadsheet software and the like may be offered during other periods including overlapping periods.

In embodiments, the child-oriented computing system may provide parental control over a child's use of the computing facility, wherein the control may be administered locally at the computing facility or remotely from an administrative computing facility. In embodiments the remote parental controls allow parents to set, reset, and modify parental controls, to integrate and send movies (such as home movies), to set calendar events, to send messages and the like, to transmit calendars items and messages from their Web site to the computing facility.

In embodiments the user interface and content for the system may be adaptive and may change automatically, with user triggers, based on events, such as the age of a child or the user interface and content may change based on another parameter. For example, as a child celebrates a birthday or the child achieves a certain level of competence, the device may make available new applications, such as instant messenger, or access to age-appropriate games and contents. Also, the content of applications may become more sophisticated and robust, such as offering other buttons and controls that are hidden for younger children.

In embodiments the user interface and/or content may change based on the user demonstrating proficiency, such as adding more functions of an application or presenting new applications when a child demonstrates mastery of a particular task. For example, if a child shows the ability to open and view photos, applications for editing and sending photos may be presented, and the like.

In embodiments, the user interface for the system may include characters that are designed to walk children through common tasks such as learning new applications.

In embodiments, the user interface may provide an access control feature, which may present a child with a number of pictorial challenges in lieu of requiring the child to enter a password to gain access to the system.

In embodiments the device may include the capability to be provided with a personalized or customized exterior, such as with printable slide in panels that allow a user to change the "skin" of the device cheaply and conveniently. In embodiments the "skins" can be silk screened for convenient interchanging of styles and colors.

In embodiments the cable connections come out of the top of the device, for easier access by users (and permitting the device to be placed against a wall without rear access). In embodiments the user interface includes an LCD screen.

In embodiments, one part of the child-oriented computing system is a computing facility, such as a COTS PC. This computing facility may be operatively coupled to the Internet and, through the Internet, to an external facility. The computing facility may be designed for use by a child, who may be a user of the computing facility.

In embodiments, the computing facility may consist of parts and part combinations that provide a curved, recessed, raised, painted, or other appearance, which may be directed at being attractive to a child. The parts and part combinations may also be designed to shed liquids away from electrical parts, should liquids be spilled on the computing facility. The parts and part combinations may provide a pivot or tilt that provides an improved viewing angle with respect to a monitor of the computing facility and a user of the computing facility.

In embodiments, digital content may be built into the computing facility as a standard feature, or it may be downloaded via the Internet; retrieved from a physical medium, such as a CD, DVD; created at the computing facility by a user of the computing facility; and so forth.

In embodiments, the computing facility may provide increased reliability as compared with analogous facilities directed at adults. In one embodiment, this increased reliability is provided by computing facility's automatic storage of digital content from a physical medium into a local storage facility of the computing facility.

In embodiments, the computing facility provides a service, which may comprise a media aspect and a non-media aspect. The media aspect may be associated with a media facility, which may be an audiovisual facility, an audio facility, an image facility, a Web facility, an interactive program facility, a messaging facility, and a help facility. All of these facilities may be associated with digital content and may provide a rendition of the digital content to the user of the computing facility.

Various embodiments of the child-oriented computing system are provided with an administrative server application and an administrative software component provided locally at the computing facility and/or remotely at an external facility or an administrative computing facility, respectively. Some of these embodiments provide parental controls that are only locally accessible at the computing facility. Others of these embodiments provide only remotely accessible parental controls that are not accessible at the computing facility. Still others of the embodiments provide a mix of local and remote parental control.

In embodiments, the child-oriented computing system may provide a parental community that may enable parents to communicate with each other.

In embodiments, the computing facility may provide different user interfaces that vary in complexity and capability, perhaps as a function of the age and/or skill level of a user.

In embodiments, a parent may have access to a support button, which may provide an authorization to log and transmit current system information to an external facility, perhaps in association with or during a call to technical support.

BRIEF DESCRIPTION OF THE DRAWINGS

The foregoing and other objects and advantages of the invention will be appreciated more fully from the following further description thereof, with reference to the accompanying drawings wherein:

FIG. 34 illustrates an example of a content category review portion of the child-oriented browsing system; and FIGS. 35 and 36 illustrate an example of the listing of the web pages for a particular content category of the child-oriented browsing system.

DETAILED DESCRIPTION OF THE INVENTION

Figure 1:
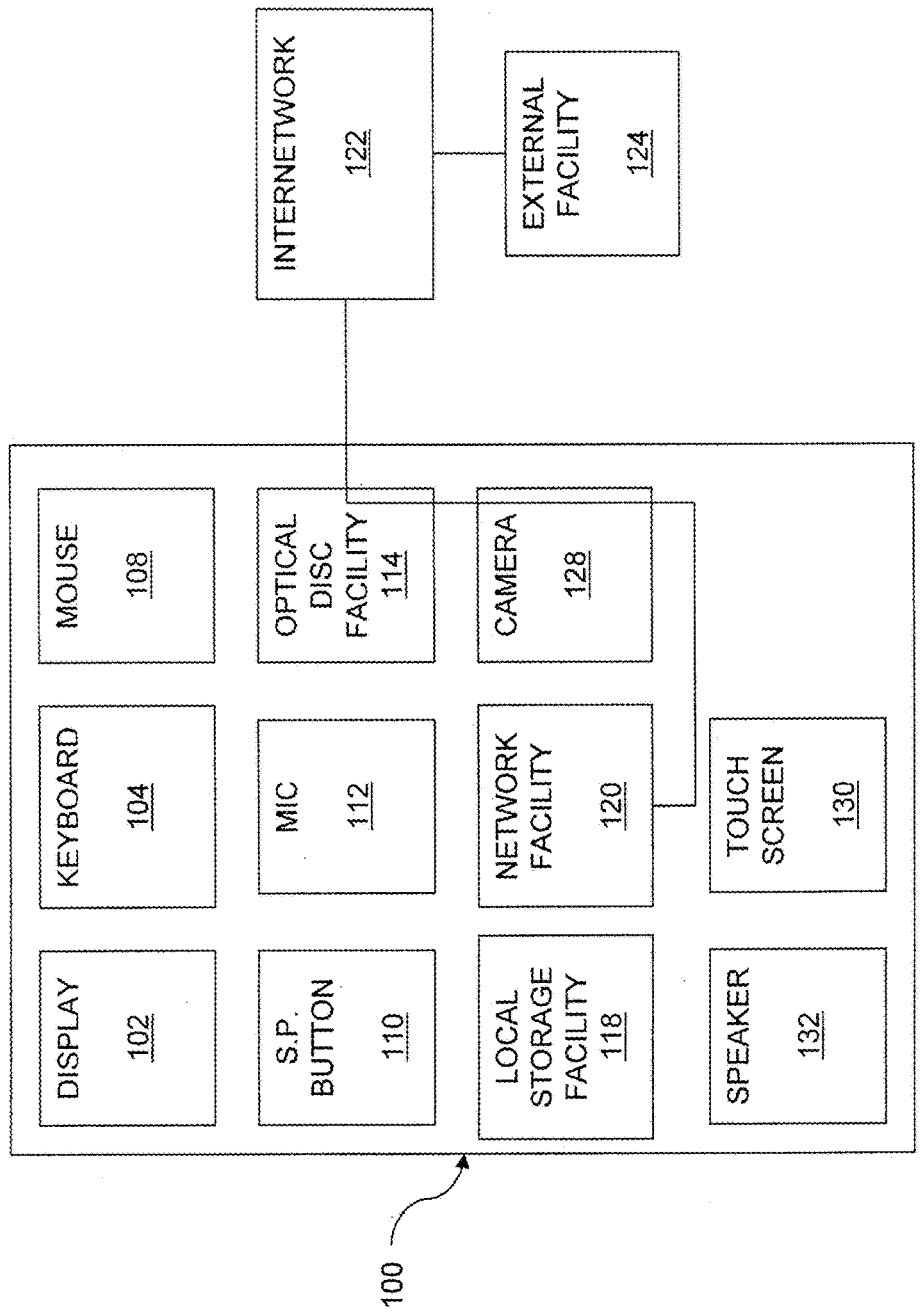
FIG. 1 is a hardware block diagram of an embodiment of a computing facility.

Referring to FIG. 1, in some embodiments, a child-oriented computing facility 100 may comprise a commercial, off-the-shelf (COTS) computing facility, such as and without limitation a personal computer (PC), a cell phone, a Sony PSP2, and the like. The COTS computing facility may run an operating system such as Linux or a variant thereof, a Microsoft Windows-brand operating system, Mac OS X, and so forth. In the preferred embodiment, the computing facility 100 may comprise a COTS PC.

In embodiments, the computing facility 100 according to the principles of the present invention may comprise the following elements: a display 102; a keyboard 104; a mouse 108; a special-purpose button 110; a microphone 112; a optical disc facility 114; a local storage facility 118; a network facility 120; a camera 128; a touch screen 130; a speaker 132; and so forth. The computing facility may be operatively coupled to an internetwork 122, such as the Internet. The internetwork 122 may, in turn, be operatively coupled to an external facility 124, which is described in detail hereinafter in reference to other figures.

In embodiments, the internal components of the computing facility 100 may include a primary motherboard. The motherboard may include a central processing unit (CPU); RAM memory (which may be the local storage facility 118), such as a RIMM chip, SRAM, DRAM, a BIOS chip; a PCI slot; an Accelerated Graphics Port; a ZIF socket; a disk controller, which may be directed at controlling a hard drive or floppy drive; an additional chipset; an expansion slot; a parallel port; a PS/2 port; a serial port; an ATX power connector; a fan; a battery; and so forth. The motherboard may be connected to an external power supply in order to receive power from a standard wall electrical outlet. Additional internal components may include a media drive (of which the optical disc facility 114 may be comprised) and/or ports, such as and without limitation a compact disc player/recorder, a digital video disc player/recorder, removable disk drives (e.g. a USB jump drive, memory card or the like). The internal components may connect with multimedia components, such as an audio speaker and/or the display 102 (which may comprise an LCD, plasma, CRT, LED, holographic, or other monitor or display device).

Figure 2:
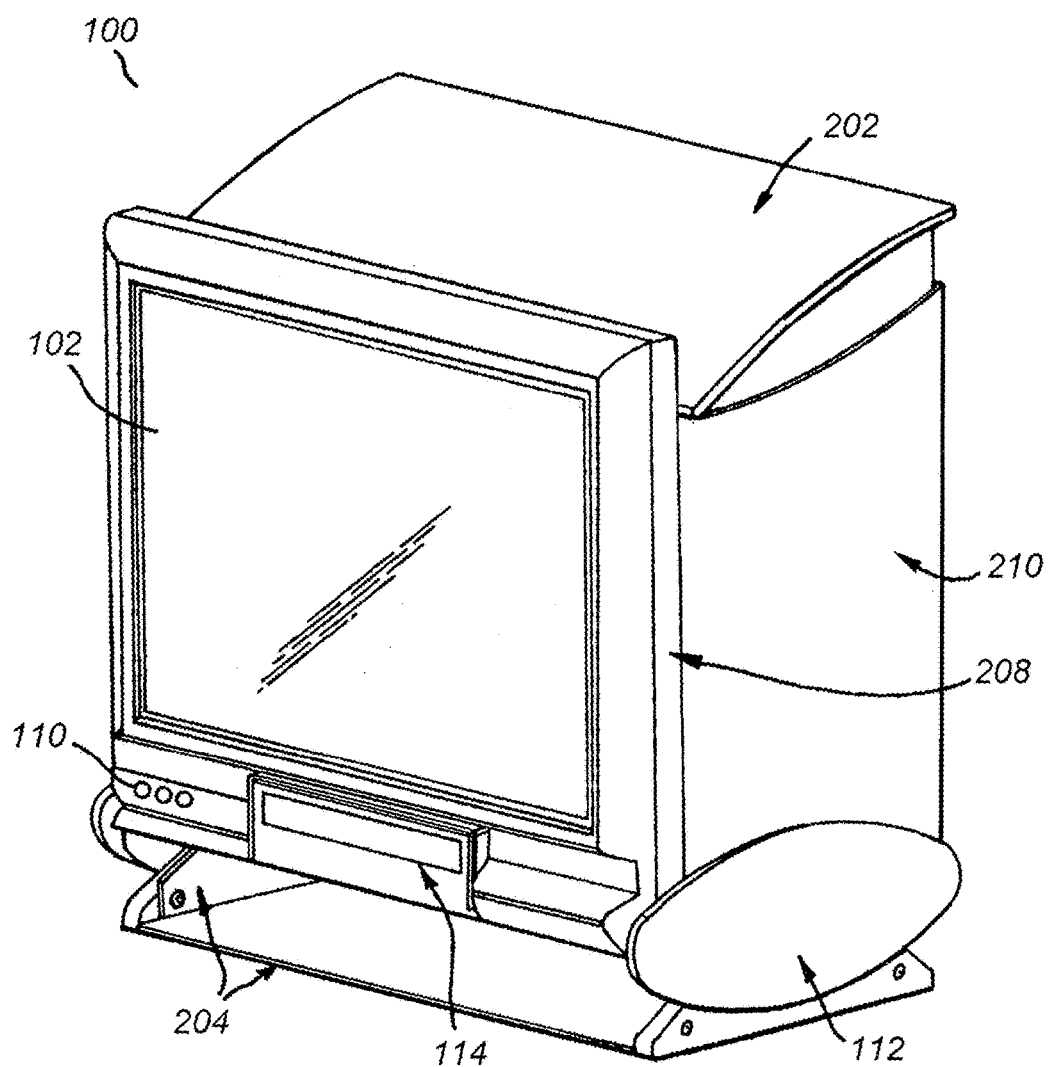
FIG. 2 is a perspective view of an embodiment of a computing facility.

Referring to FIG. 2, one of many possible embodiments of the computing facility 100 may consist of parts and part combinations selected from the group of a top cover 202, a tilt base and keyboard home 204, a monitor front bezel and overall front covers 208, two side panels 210 (due to the perspective of the figure, only one is shown), and two oval panels 212 (again, due to the perspective of the figure, only one is shown). The computing facility 100 may be constructed from a number of parts and or a single formed piece. The computing facility 100 may be shaped with compound curves, arcs, cutouts, recessed areas, raised areas, and the like. The computing facility 100 may be decorated with color and or design. For example, the raw materials for the parts may be pigmented and or painted. The computing facility 100 may have designs that are formed into the material (e.g., by relief designs or raising the material), painted onto the material and/or applied to the material. The top cover 202 may be designed in a shape that sheds liquids away from electrical parts that are vulnerable to liquids. For example, a "spill-proof" design may include a top cover 202 with a plane that is curved such that a spilled liquid will be forced by gravity to follow the curved plane away from the internal components, rather than seeping straight down into the computing facility 100.

In embodiments the computing facility 100 may comprise arcs formed into each side wall, extending below the base of the computing facility 100. These curve extensions may fit into the tilt base 204. The tilt base 204 may be used to adjust the viewing angle of the display 102. In conjunction with the curved lower portion of the side panels 210, the tilt base 204 may permit the monitor 102 to rotate forwards and backwards on an axis running parallel to the plane of the monitor 102. This may allow the overall enclosure (that is, the computing facility excluding the tilt base 204) to tilt frontward and backward, which may improve a viewing angle with respect to the monitor 102 and a user of the computing facility 100. The pivot point may be approximately at the center of gravity of the computing facility 100. The sides of the computing facility 100 may be constructed of sheet metal for improved cost efficiency, and structural soundness. The tilt base 204 may be either two independent parts, one on the right and left, or one continuous part with a tilt feature. The continuous part may have provisions to store a keyboard and may also hold the mouse 108 and/or remote control (which may comprise the special-purpose button 110).

In embodiments the face of the DVD player/recorder 114 may be positioned so that it is on the same side of the computing facility 100 as the monitor screen 102. The DVD player/recorder 114 may be placed within the computing facility 100 so that it is directly beneath the lower edge of the monitor 102, with the body of the DVD player/recorder 114 positioned perpendicular to the monitor screen 102.

In embodiments, the top panel 202 may be curved to provide a deterrent to setting objects on the computing facility. The top panel 202 may be translucent, transparent, or opaque. The top panel 202 may be lighted for a decorative effect. Air gaps placed in the back, bottom, and/or sides of the computing facility 100 are provided to permit greater air circulation inside the computing facility.

In embodiments a power supply for the computing facility may face the same side as the motherboard. The power supply may be an external power supply or an internal power supply.

In embodiments, a design, form factor, and/or configuration of the computing facility 100 may allow for changing the external panels 202, 210, 212. For example, there may be left, right, back, and/or top interchangeable "skins," plus oval shaped parts on the left and right side of the computing facility 100. The external skins may be decorative through the use of pigment, paint, embossing, shaping, relief or raised areas, stickers, silk screening, and the like. The external skins, panels, or other such external physical components may be capable of changing without the use of tools. For example, the panels may snap on or have some other type of non-tool required fastening system (e.g. through the use of clips, pressure fittings, and the like). The use of flat panels in the design may allow for low cost printing. The panels may also be clear and allow for placing photos behind them. Flat panels may lower the cost of shipping the computing facility, as they may be packed for shipment in an unassembled state thereby reducing the volume of the shipment. The decorative panels may be thin (e.g. a film or wall paper-type material). In sum, this design may allow a user of the computing facility to easily change its appearance.

In embodiments, the front panel 208 of the computing facility 100 may be designed to hold the computing facility's power and feature controls, of which the special-purpose button 110 may be comprised. Controls may include a power on-off switch, a sleep mode switch that enables a user to turn off major power consuming functions during periods of inactivity, a TV mode to open a TV function, a volume control, TV channel function, a processing facility, digital video recorder functions (e.g. play, stop, pause etc.), and the like. These controls and features may be located on the front panel 208 and/or in other locations, such as on a remote control or other part of the computing facility 100. The front panel 208 may be designed to change easily by slipping a decorative panel on over the front.

In embodiments, a sound system may be associated with the computing facility 100. The sound system may comprise the speakers 132, which may be placed inside the computing facility 100. These internal audio speakers 132 may be placed facing the user on the front panel 208 of the computing facility 100. Alternatively, the sound system may comprise a jack to which external audio speakers may be connected. The opening of this jack may be disposed anywhere on the computing facility 100.

In embodiments, the footprint of the computing facility 100 may be minimized based at least in part on the use of a small sized motherboard. This may allow for the footprint to be similar in size to a conventional desktop personal computer with a CRT monitor. The design may provide additional space saving based at least in part on the computing facility 100 combining the functions of a television, digital video recorder, and computer. The design of the computing facility 100 may minimize the number of individual parts required by combining features. For example, the use of a CRT monitor in this combination may appear like a television screen or typical CRT layout, however, this configuration compacts the components behind the monitor to make efficient use of the space. The design may use fewer parts than a typical computer monitor chassis and monitor and may, therefore, have a cost advantage over separate components.

Figure 3:
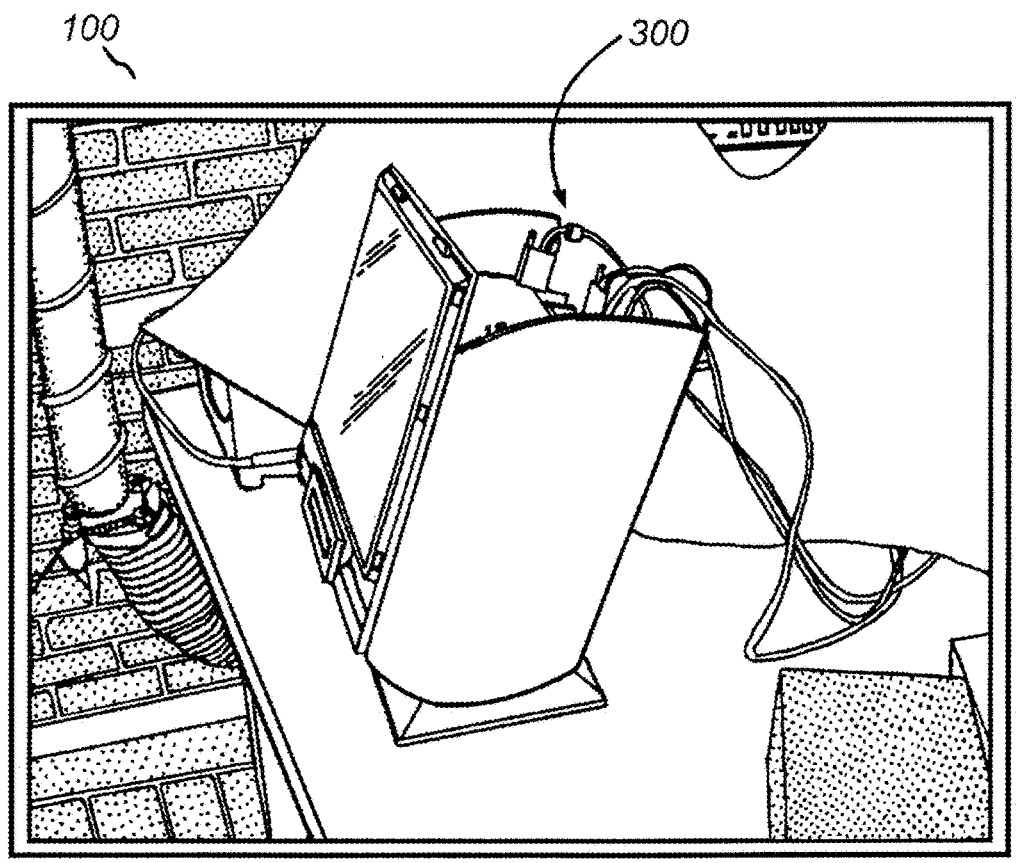
FIG. 3 is a perspective view of an embodiment of a computing facility.

Referring now to FIG. 3, in embodiments, the primary PC motherboard may be vertically positioned so that the external connectors 300 (e.g., USB ports) are facing upwards. Vertical positioning of the motherboard may allow for efficient cooling by enabling the heated air rising from the motherboard to be more quickly evacuated from the computing facility 100. The spill-proof, curved top panel 202 may be hinged so that it may be opened for access to the internal components of the machine. The hinge may have a pivot point on the back side of the computing facility, opposite the monitor screen. As depicted, the top panel 202 may also be capable of being removed from the computing facility entirely.

In embodiments, the hardware design of the computing facility 100 may save space by providing the functionality of multiple devices within a single compact device. A child's room may be cramped with space at a premium. The hardware design of the computing facility 100 may save space based at least in part on providing a multiple purpose computing facility with a width, height and depth of a typical CRT monitor and its stand. The keyboard may fit in a space beneath the DVD/CD combination drive 114 and space may be provided to store a remote control and a mouse when not in use. The cables used by the computing facility may exit from the top of the computing facility 100, enabling the computing facility to be placed flush against a wall. The weight of the computing facility 100 may enable easy movement of the computing facility between rooms.

In embodiments, the computing facility 100 may be designed for simplicity of physical setup. For example, the computing facility 100 may be shipped with the keyboard 104 and mouse 108 connected. The setup of cables for the computing facility 100 may be reduced to only the power cable, television cable, and internet cable. The computing facility 100 may ship with a clearly labeled cable splitter, television cable and Ethernet cable already connected to the unit for easy setup. The reduction of cables required by the computing facility 100 may be obtained based at least in part on the computing facility's built-in 15 inch monitor 102, eliminating the need for a separate monitor cable and monitor power cable. Additionally, the computing facility 100 may have built in speakers 132, eliminating the need for cables between speakers, a speaker power cable and a cable from the speakers to the computer chassis. The computing facility 100 may have a built in infrared receiver for a remote control, thereby eliminating the need for a separate cable extending to a TV Tuner card.

In embodiments, the computing facility 100 may be ergonomically designed to address the special computing needs of children and safeguards required. The computing facility 100 may have a spill proof keyboard, with a layout and key sizes that are appropriate for kids in a target age group. The computing facility 100 may provide a mouse 108 that is appropriately sized for the hands of children. The computing facility 100 may provide a slot-loading CD-R/CD-RW/DVD-ROM drive 114 to prevent tray breakage that can occur with non-slot-loading drives. The computing facility 100 may enable kids to match the aesthetics of a computing facility to their preferences, by providing the ability to replace panels 202, 210, 212 on the exterior of the computing facility 100.

Referring now to the present invention in general terms, an objective of the present invention may be to provide parental control over a child's access to digital content. The parental control may be provided remotely, with the parent at a separate location from the child. The parental control may be provided locally. Additionally or alternatively, the parental control may be provided asynchronously, with the parent specifying a control at one time and the child being subject to the control at another time.

Figure 4:
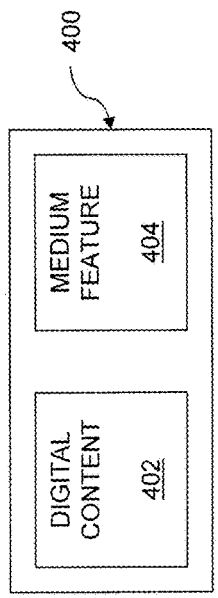
FIG. 4 depicts a physical medium containing digital content and a medium feature.

Referring now to FIG. 4, the digital content 402 may comprise a digital representation of one or more of the following, any of which may or may not be protected by digital rights management: a movie, a song, a multimedia presentation, a Macromedia Flash file, a sound clip, a text message, a blog post, a picture, an avatar, a comment, a calendar, an event reminder, an icon, a signal, an instant message, a file, or any other content.

The digital content 402 may be contained in a physical medium 400. This medium 400 may comprise any medium capable of storing and/or transmitting the digital content 402. Thus, the medium 400 may without limitation comprise, RAM, a DVD disc, a CD, an HD-DVD disc, a Blu-ray disc, a data network connection such as may be associated with the Internet (such as and without limitation comprising a physical layer, a data-link layer, a transport layer, and/or an application layer), a Firewire connection, an S-Video connection, a USB connection, a SCSI connection, a memory stick, a USB key, a dongle, Flash memory device, and so forth.

The physical medium 400 may comprise a medium feature 404. In some embodiments, the medium feature 404 may comprise an intentional design feature, such as and without limitation a form factor, a computer storage density, a pit depth, a magnetic property, an optical property, a power requirement, a physical interface, and so forth. In other embodiments, the medium feature 404 may comprise an unintentional feature, which may be deleterious to the performance of the physical medium 400, such as and without limitation a manufacturing defect, a design defect, a scratch (such as on an optical disc), and so forth. In some cases, a user may provide the medium feature 404. In one example of particular relevance, the physical medium 400 may be an optical disc and the user may be a child. In this example, the child may intentionally or unintentionally introduce a scratch to the optical disc. This scratch may be a medium feature 404. It will be appreciated that the scratch may cause a degradation of performance of the optical disc. This degradation of performance may without limitation comprise a reduced read speed, a reduce write speed, a prevention of access to parts of the digital content 402, a prevention of access to all of the digital content 402, and so forth. Many other such examples will be apparent.

Figure 5:
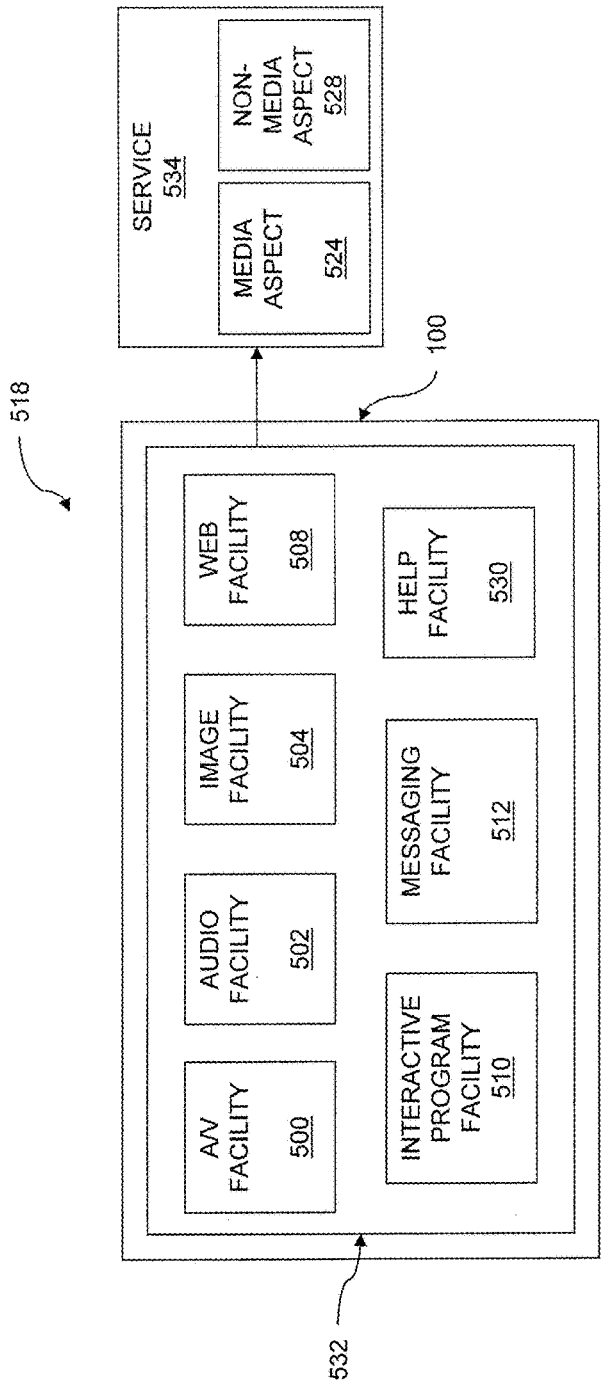
FIG. 5 is a functional block diagram of an embodiment of a computing facility providing a service.

Referring now to FIG. 5, a child-oriented computing system 518 may comprise the computing facility 100, which itself may comprise a service software component 532 directed at children. The service software component 532 may comprise one or more media facilities. These facilities, which are described in detail hereinafter, may allow a user such as a child to access the digital content 402 of the physical medium 400, perhaps without having an adult present to configure, monitor, or enable the content 402 or the medium 400. These facilities may also provide increased reliability as compared with analogous facilities directed at adults. This increased reliability may be provided to compensate for common problems that a child, in particular, may have in configuring, accessing, or otherwise utilizing the content 402 or the medium 400. Other aspects and benefits of the service software component 532 will be appreciated from the following discussion.

In some embodiments, the digital content 402 may be provided as a built-in component or standard feature of the computing facility 100. In other embodiments, the digital content 402 may be provided by the physical medium 400. In still other embodiments, the digital content 402 may be provided as a software download 600. This software download 600 may comprise any of the digital content 402 described herein or appreciated from the present description.

The service software component 532 may provide a service 534. The service 534 may comprise a media aspect 524 and/or a non-media aspect 528. The media aspect 524 may be provided by one or more of the media facilities. The non-media aspect 528 may be provided by a portion of the service software component 532 that is not the media facilities. The service 534 and its aspects are described in detail hereinafter.

In some embodiments, the service software component 532 may be implemented as software, hardware, or a combination of both software and hardware. This will be appreciated more fully from the following discussion and from the detailed descriptions provided hereinafter with references to FIGS. 6, 7, 8, 9, 10, 11, 12, 13, and 14.

The media facilities of the service software component 532 may comprise an audiovisual facility 500, an audio facility 502, an image facility 504, a Web facility 508, an interactive program facility 510, a messaging facility 512, and a help facility 530. Any or all of the media facilities may be associated with digital content and may provide a rendition of the digital content to the user, such as via the display 102, the speaker 132, and so forth. The audiovisual facility 500 may be associated with audiovisual content, such as and without limitation a television program, a movie, a home video, a real-time video stream, and the like. The audio facility 502 may be associated with audio content, such as and without limitation a song, an audio clip, a real-time audio stream, and the like. The image facility 504 may be associated with still-image content, such as and without limitation a picture, a screenshot, a drawing, and the like. The Web facility 508 may be associated with a Web content, such as and without limitation a static Web page, a dynamic Web page, client-side Web application such as a Java applet or Javascript program, and the like. The interactive program facility 512 may be associated with interactive content, such as and without limitation a computer game, an educational software program, a word processor, spreadsheet program, task list program, calendar program, and so forth. The messaging facility 512 may be associated with an instant message, a textual conversation, a video chat (which may be a special instance of the audiovisual content), an audio chat (which may be a special instance of the real-time audio stream), and so forth. The help facility 530 may be associated with a help feature, such as and without limitation an entertaining help message, a visually demonstrative help message, a one-time help message, a periodic help-message, a start-up help message, an animated cartoon character that provides a help message, and so forth.

Generally, an audiovisual program may be an instance of the digital content 402 and the audiovisual facility 500 may receive, transmit, and/or provide it. The media aspect 524 of the service 534 may comprise this receiving, transmitting, and/or providing. The audiovisual facility 500 may provide a user with the ability to watch a live audiovisual program, perhaps in association with or in accordance with an audiovisual program guide, which in embodiments may be downloaded from the Internet. The audiovisual facility 500 may provide one or more capabilities that may be associated with a digital video recorder, such as a TiVo. These capabilities may comprise an ability to record an audiovisual program according to a schedule or on demand; an ability to pause and resume a live audiovisual program; an ability to play a recorded audiovisual program; an ability to play an on-demand audiovisual program; an ability to fast-forward, rewind, and pause a recorded or on-demand audiovisual program that is being played; an ability to record one audiovisual program while watching another audiovisual program, which may be recorded, live, or on-demand; and so forth. The media aspect 524 may comprise the abilities and capabilities described in this paragraph.

The audiovisual facility 500 may provide a user with an ability to watch an audiovisual program (i.e. an instance of digital content 402) that is stored on and/or provided by an optical disc, memory stick, or other instance of the physical medium 400. For example, the audiovisual facility 500 may provide the ability to play a DVD. The audiovisual facility 500 may additionally provide the user with an ability to receive an instance of digital content 402 that may be associated with the audiovisual program. In embodiments, this instance of digital content 402 may be a digital movie poster and may be downloaded, perhaps automatically, from the Internet. The audiovisual facility 500 may additionally provide the user with an ability to submit a rating directed at an audiovisual program, such as according to a 5-star rating, a point rating on a 10-scale, a thumbs-up/thumbs-down rating, an academic-style A-through-F rating, or any other rating methodology. In some embodiments, the rating may further comprise a textual entry provided by the user. This textual entry may comprise a tag. The audiovisual facility 500 may provide the user with an ability to view a rating provided by a second user. In this way, the user may appreciate the audiovisual program in advance of experiencing it or in the context of the experience of the second user. The media aspect 524 may comprise the abilities described in this paragraph.

In embodiments, the audiovisual facility 500 may provide to the user an ability to receive the audiovisual program either for real-time streaming playback or for storage as an audiovisual file in the local storage facility 118, wherein the file may comprise the audiovisual program. The media aspect 524 may comprise this ability. Receiving the audiovisual program may comprise downloading from a data network connection such as may be associated with the Internet; accepting from a Firewire connection, a USB connection, or other such instance of the physical medium 400; or ripping from a CD, DVD, or other such instance of the physical medium 400. Thus, a plurality of audiovisual programs may be stored as a plurality of audiovisual files in the local storage facility 118.

The audiovisual facility 500 may provide a management capability associated with the plurality of audiovisual programs. This capability may comprise a providing a catalog to the user, wherein the catalog comprises a list of some or all of the plurality of audiovisual files. In the preferred embodiment the catalog may be presented as a hierarchical structure, organized by title, director, actor, subject, release date, MPAA rating, popularity, user rating, or any other information associated with the audiovisual files. The user may be allowed to arrange the catalog, partition the catalog into two catalogs, aggregate two catalogs into one catalog, receive the catalog from a physical medium 400, transmit or record the catalog to a physical medium 400, and so forth. The media aspect 524 may comprise the management capability described in this paragraph.

The audiovisual facility 500 may provide a rendering of a selection of the plurality of audiovisual files according the catalog, such as according to which of the audiovisual files appear in the catalog, the order in which the audiovisual files appear in the catalog, and so forth. The media aspect 524 may comprise this rendering.

Generally, an audio program may be an instance of the digital content 402 and the audio facility 502 may receive, transmit, and/or provide it. The media aspect 524 of the service 534 may comprise this receiving, transmitting, and/or providing. The audio facility 502 may provide a user with the ability to hear a live audio program, perhaps in association with or in accordance with an audio program guide, which in embodiments may be downloaded from the Internet. The audio facility 502 may provide one or more capabilities that may be associated with an audio recorder. These capabilities may comprise an ability to record an audio program according to a schedule or on demand; an ability to pause and resume a live audio program; an ability to play a recorded audio program; an ability to play an on-demand audio program; an ability to fast-forward, rewind, and pause a recorded or on-demand audio program that is being played; an ability to record one audio program while listening to another audio program, which may be recorded, life, or on-demand; and so forth. The media aspect 524 may comprise the abilities and capabilities described in this paragraph.

The audio facility 502 may, for the user, render audible an audio program (i.e. an instance of digital content 402) that is stored on and/or provided by an optical disc, memory stick, or other instance of the physical medium 400. For example, the audio facility 502 may provide the ability to play a CD. The audio facility 502 may additionally provide the user with an ability to receive an instance of the digital content 402 that may be associated with the audio program. In embodiments, this instance of digital content 402 may be a digital CD insert and may be downloaded, perhaps automatically, from the Internet. The audio facility 502 may additionally provide the user with an ability to submit a rating directed at an audio program, such as according to a 5-star rating, a point rating on a 10-scale, a thumbs-up/thumbs-down rating, an academic-style A-through-F rating, or any other rating methodology. In some embodiments, the rating may further comprise a textual entry provided by the user. This textual entry may comprise a tag. The audio facility 502 may provide the user with an ability to view a rating provided by a second user. In this way, the user may appreciate the audio program in advance of experiencing it or in the context of the experience of the second user. The media aspect 524 may comprise the abilities described in this paragraph.

In embodiments, the audio facility 502 may provide to the user an ability to receive the audio program either for real-time streaming playing or for storage as an audio file in the local storage facility 118, wherein the file may comprise the audio program. The media aspect 524 may comprise this ability. Receiving the audio program may comprise downloading from a data network connection such as may be associated with the Internet; accepting from a Firewire connection, a USB connection, or other such instance of the physical medium 400; or ripping from a CD, DVD, or other such instance of the physical medium 400. Thus, a plurality of audio programs may be stored as a plurality of audio files in the local storage facility 118.

The audio facility 502 may provide a management capability associated with the plurality of audio programs. This capability may comprise a providing a playlist to the user, wherein the playlist comprises a list of some or all of the plurality of audio files. In the preferred embodiment the list may be presented as a hierarchical structure, organized by title, artist, album, release date, popularity, user rating, or any other information associated with the audio files. The user may be allowed to arrange the playlist, partition the playlist into two playlists, aggregate two playlists into one playlist, receive the playlist from physical medium 400, transmit or record the playlist to the physical medium 400, and so forth. The media aspect 524 may comprise the management capability described in this paragraph.

The audio facility 502 may provide a rendering of a selection of the plurality of audio files according the playlist, such as according to which of the audio files appears in the playlist, the order in which the audio files appear in the playlist, and so forth. The media aspect 524 may comprise this rendering.

Generally, a digital image may be an instance of the digital content 402 and the image facility 504 may receive, transmit, and/or provide it. The media aspect 524 of the service 534 may comprise this receiving, transmitting, and/or providing. The image facility 504 may provide a user with the ability to view the digital image. The image facility 504 may provide one or more capabilities that may be associated with a photo editor. These capabilities may comprise an ability to manipulate the digital image, such as to crop the image, to reduce red eye of a subject into the image, to rotate the image, to scale the image, and so forth. In embodiments, image may be recorded to the local storage facility 118, from which it may later be rendered. The media aspect 524 may comprise the abilities and capabilities described in this paragraph.

The image facility 504 may provide render visible a digital image (i.e. an instance of digital content 402) that is stored on and/or provided by an optical disc, memory stick, or other instance of the physical medium 400. The image facility 504 may additionally provide the user with an ability to receive an instance of the digital content 402 that may be associated with the digital image. The image facility 504 may additionally provide the user with an ability to submit a rating directed at a digital image, such as according to a 5-star rating, a point rating on a 10-scale, a thumbs-up/thumbs-down rating, an academic-style A-through-F rating, or any other rating methodology. In some embodiments, the rating may further comprise a textual entry provided by the user. This textual entry may comprise a tag. The image facility 504 may provide the user with an ability to view a rating provided by a second user. In this way, the user may appreciate the digital image in advance of experiencing it or in the context of the experience of the second user. The media aspect 524 may comprise the abilities described in this paragraph.

In embodiments, the image facility 504 may provide to the user an ability to receive the digital image either for instant viewing or for storage as an image file in the local storage facility 118, wherein the file may comprise the digital image. The media aspect 524 may comprise this ability. Receiving the digital image may comprise downloading from a data network connection such as may be associated with the Internet; accepting from a Firewire connection, a USB connection, or other such instance of the physical medium 400; or copying from a CD, DVD, or other such instance of the physical medium 400. In some embodiments, the physical medium 400 may be associated with and/or operatively coupled to a digital camera, a Web camera, or any other digital imaging facility. In any case, a plurality of digital images may be stored as a plurality of image files in the local storage facility 118.

The image facility 504 may provide a management capability associated with the plurality of digital images. This capability may comprise providing a photo album to the user, wherein the photo album comprises a list of some or all of the plurality of image files. In the preferred embodiment the list may be presented as thumbnail images in a hierarchical structure, organized by date, subject, color, resolution, user-specified preference, or any other information associated with the image files. The thumbnail images may have a one-to-one correspondence with the plurality of image files. The hierarchical structure may be displayed as images within pages of a photo album, wherein the photo album may contain multiple sections of pages. Alternatively or additionally, the hierarchical structure may be displayed as a tree-like data structure, with a root node, interior nodes, and leaf nodes. Alternatively or additionally, each image in the hierarchy may be displayed either according to a slideshow format (with each image being shown one-by-one, with an automatic progression from one image to the next) or according to a flat representation in which thumbnails of the images are simultaneously displayed. In the case of the flat representation, a user may select one of the thumbnails to view a higher resolution version of the image. The user may be allowed to arrange the images on a page of the photo album, partition a section of the photo album into two sections, aggregate two sections of the photo album into one section of the photo album, receive part or all of the photo album from physical medium 400, transmit or record part or all of the playlist to the physical medium 400, and so forth. The media aspect 524 may comprise the management capability described in this paragraph.

In some embodiments, a plurality of photo albums may be provided. In this case, a representative image taken from each of the albums may be displayed. Alternatively, a plurality of dynamic slideshows, each of which is associated with one of the photo albums, may be displayed. In any case, the user may select which album he wishes to view by choosing the representative image or associated slideshow of the album.

The image facility 504 may provide an easy way for the user to navigate a Web site. All but the simplest of Web sites are hierarchical, with a home page at the root level; with the pages accessible via hyperlink from the home page at a second level that is immediately below the root level; with the pages linked from those pages at a third level that is immediately below the second level, and so forth. Such a hierarchy may be too difficult for a user to navigate, particularly when the user is a young child. To remedy this, the image facility 504 may present a Web site in a flat representation in which each of the pages of the Web site are represented by a thumbnail image, many or all of which may be simultaneously displayed. The user can select a Web page for viewing by choosing the thumbnail image that represents the page. In some embodiments, only a subset of the Web pages of a Web site may be approved for viewing by the user. In this case, thumbnail images for only those approved pages will be provided by the image facility 504.

The image facility 504 may provide a rendering of a selection of the plurality of image files according to their arrangement in the photo album, such as according to which of the image files appear in the photo album, the order in which the image files appear in the photo album, and so forth. This rendering may be presented as a slide show, with one image file being automatically displayed for some amount of time and then a second image file being automatically displayed for some amount of time. The media aspect 524 may comprise this rendering.

Generally, a Web page or component thereof may be an instance of the digital content 402 and the Web facility 508 may receive, transmit, and/or provide it. The media aspect 524 of the service 534 may comprise this receiving, transmitting, and/or providing. The Web facility 508 may provide a user with the ability to view the Web page. The Web facility 508 may provide one or more capabilities that may be associated with a Web browser. These capabilities may comprise an ability to enter information into a field of the Web page; to select an item in the Web page; to interact with a dynamic portion of the Web page; and so forth. In embodiments, perhaps utilizing an automatic technique such as caching or a manual technique such as saving the Web page to disk, the Web page may be recorded to the local storage facility 118, from which it may later be rendered. The media aspect 524 may comprise the abilities and capabilities described in this paragraph.

The Web facility 508 renders visible a Web page (i.e. an instance of digital content 402) that is stored on and/or provided by an optical disc, memory stick, or other instance of the physical medium 400. The Web facility 508 may additionally provide the user with an ability to receive an instance of the digital content 402 that may be associated with the Web page. In embodiments, this instance of the digital content 402 may comprise an advertisement. The Web facility 508 may additionally provide the user with an ability to submit a rating directed at a Web page, such as according to a 5-star rating, a point rating on a 10-scale, a thumbs-up/thumbs-down rating, an academic-style A-through-F rating, or any other rating methodology. In some embodiments, the rating may further comprise a textual entry provided by the user. This textual entry may comprise a tag. The Web facility 508 may provide the user with an ability to view a rating provided by a second user. In this way, the user may appreciate the Web page in advance of experiencing it or in the context of the experience of the second user. The media aspect 524 may comprise the abilities described in this paragraph.

In embodiments, the Web facility 508 may provide to the user an ability to receive the Web page either for instant viewing or for storage as a file-based representation in the local storage facility 118, wherein the file-based representation may comprise the Web page. The media aspect 524 may comprise this ability. Receiving the Web page may comprise downloading from a data network connection such as may be associated with the Internet; or copying from a CD, DVD, or other such instance of the physical medium 400. A plurality of Web pages be stored as a plurality of file-based representations in the local storage facility 118.

The Web facility 508 may provide a management capability associated with the plurality of Web pages. This capability may comprise providing bookmarks to the user, wherein the bookmarks comprise a list of some or all of the plurality of Web pages. In the preferred embodiment the bookmarks may be presented in a hierarchical structure, organized by date, subject, keyword, tag, user-specified preference, or any other information associated with the Web pages. The hierarchical structure may be displayed as a tree-like data structure, with a root node, interior nodes, and leaf nodes. The user may be allowed to arrange the bookmarks, partition the bookmarks into two sets of bookmarks, aggregate two sets of bookmarks into one set of bookmarks, receive some or all of the bookmarks from physical medium 400, transmit or record some or all of the bookmarks to the physical medium 400, and so forth. The media aspect 524 may comprise the management capability described in this paragraph.

The Web facility 508 may providing a rendering of a selection of the plurality of Web pages according the arrangement of the bookmarks, such as according to which of the bookmarks are present, the order in which the bookmarks appear, and so forth. This display of a selection of the plurality of Web pages may be presented in multiple browser tabs, with a one-to-one correspondence between the bookmarks and the tabs. The media aspect 524 may comprise this rendering.

Generally, an interactive computer program may be an instance of the digital content 402 and the interactive program facility 501 may receive, transmit, and/or provide it. The media aspect 524 of the service 534 may comprise this receiving, transmitting, and/or providing. The interactive program facility 510 may provide a user with the ability to utilize the interactive computer program, such as and without limitation to interact with a user interface provided by the interactive computer program. The interactive program facility 510 may provide one or more capabilities that may be associated with a computer game, an educational computer program, and the like. In embodiments, the interactive computer program may be recorded to the local storage facility 118, from which it may later be launched. The media aspect 524 may comprise the abilities and capabilities described in this paragraph.

The interactive program facility 510 may provide a user with an ability to utilize the interactive computer program (i.e. an instance of digital content 402) that is stored on and/or provided by an optical disc, memory stick, or other instance of the physical medium 400. The interactive program facility 510 may additionally provide the user with an ability to receive an instance of the digital content 402 that may be associated with the Web page. In embodiments, this instance of the digital content 402 may comprise an advertisement. The interactive program facility 510 may additionally provide the user with an ability to submit a rating directed at an interactive computer program, such as according to a 5-star rating, a point rating on a 10-scale, a thumbs-up/thumbs-down rating, an academic-style A-through-F rating, or any other rating methodology. In some embodiments, the rating may further comprise a textual entry provided by the user. This textual entry may comprise a tag. The interactive program facility 510 may provide the user with an ability to view a rating provided by a second user. In this way, the user may appreciate the interactive computer program in advance of experiencing it or in the context of the experience of the second user. The media aspect 524 may comprise the abilities described in this paragraph.

In embodiments, the interactive program facility 510 may provide to the user an ability to download an interactive computer program from a data network connection such as may be associated with the Internet; or to copy the interactive computer program from a CD, DVD, or other such instance of the physical medium 400. The media aspect 524 may comprise this ability. A plurality of interactive computer programs may be stored as a plurality of file-based representations in the local storage facility 118.

The interactive program facility 510 may provide a management capability associated with the plurality of interactive computer programs. This capability may comprise a providing a catalog to the user, wherein the catalog comprises a list of some or all of the plurality of interactive computer programs. In the preferred embodiment the catalog may be presented as a hierarchical structure, organized by title, publisher, subject, release date, ESRB rating, popularity, user rating, or any other information associated with the plurality of interactive computer programs. The user may be allowed to arrange the catalog, partition the catalog into two catalogs, aggregate two catalogs into one catalog, receive the catalog from a physical medium 400, transmit or record the catalog to a physical medium 400, and so forth. This management capability may further allow for the installation, execution, and/or removal of an interactive computer program. The media aspect 524 may comprise the management capability described in this paragraph.

Generally, an e-mail message, an instant message, audio-chat message, video-chat message, instant message session, audio-chat session, or video-chat session (collectively referred to as "a message") may be an instance of the digital content 402 and the messaging facility 512 may receive, transmit, and/or provide it. The media aspect 524 of the service 534 may comprise this receiving, transmitting, and/or providing. The messaging facility 512 may provide a user with the ability to utilize a message, such as and without limitation to create the message, to transmit the message, to receive the message, to see the message, to hear the message, and/or to otherwise render the message. The messaging facility 512 may provide one or more capabilities that may be associated with a message, such as to accept the message (manually or automatically), reject the message (manually of automatically), filter message, respond to the message (manually or automatically), participate in the message, and so forth. Thus, the messaging facility 512 may enable one user to communicate with another user, in a real-time or asynchronous fashion. In embodiments, the message may be recorded to the local storage facility 118, from which it may later be utilized. The media aspect 524 may comprise the abilities and capabilities described in this paragraph.

When the messaging facility 512 filters the message, one aspect of the filtering may relate to looking forward a word or phrase that is classified as inappropriate. Such classification may be automatically provided by or built into the messaging facility 512 and/or may be specified by a user or an administrative user. When an inappropriate word or phrase is detected in a message, the messaging facility 512 may take an action. The action could be a default action or an action specified by the user or the administrative user. In any case, the action may be to reject the message; to warn or notify the administrative user about the message; and/or to warn or notify the user about the message. The warning or notification may take the form of a text message, an audio message or tone, a dynamic thermometer icon that displays a hotter temperature when the inappropriate word or phrase is detected; a dialog box; a visual indication; and so forth.

The messaging facility 512 may provide a user with an ability to utilize the message (i.e. an instance of digital content 402) that is stored on and/or provided by an optical disc, memory stick, or other instance of the physical medium 400. The interactive program facility 510 may additionally provide the user with an ability to receive an instance of the digital content 402 that may be associated with the message. In embodiments, this instance of the digital content 402 may comprise a graphical emoticon. The messaging facility 512 may additionally provide the user with an ability to submit a rating directed at a message, such as according to a 5-star rating, a point rating on a 10-scale, a thumbs-up/thumbs-down rating, an academic-style A-through-F rating, a spam/not-spam rating, or any other rating methodology. In some embodiments, the rating may further comprise a textual entry provided by the user. This textual entry may comprise a tag. The messaging facility 512 may provide the user with an ability to view a rating provided by or associated with a second user. In this way, the user may appreciate the message and/or the second user in advance of experiencing the message. The media aspect 524 may comprise the abilities described in this paragraph.

In embodiments, the messaging facility 512 may provide to the user an ability to download a message from a data network connection such as may be associated with the Internet; or to copy the message from a CD, DVD, or other such instance of the physical medium 400. The media aspect 524 may comprise this ability. A plurality of messages may be stored as a plurality of file-based representations in the local storage facility 118.

The messaging facility 512 may provide a management capability associated with the plurality of messages. This capability may comprise a providing a catalog to the user, wherein the catalog comprises a list of some or all of the plurality of messages. In the preferred embodiment the catalog may be presented as a hierarchical structure, organized by identity of the second user, popularity, rating, keyword, tag, or any other information associated with the messages. The user may be allowed to arrange the catalog, partition the catalog into two catalogs, aggregate two catalogs into one catalog, receive the catalog from a physical medium 400, transmit or record the catalog to a physical medium 400, and so forth. The media aspect 524 may comprise the management capability described in this paragraph.

The messaging facility 512 may provide an ability to display, to archive, and/or to retrieve of one or more of the messages. The media aspect 524 may comprise this ability.

Generally, a help feature (and the like) may be an instance of the digital content 402 and the help facility 530 may transmit and/or provide it. The media aspect 524 of the service 534 may comprise this transmitting and/or providing. The help facility 530 may provide a user with the ability to utilize a help feature, such as and without limitation to receive the help feature, to see the help feature, to hear the help feature, and/or to otherwise render the help feature. The help facility 530 may provide one or more capabilities that may be associated with a help feature, such as providing the feature once, periodically, autonomously, in response to a user input, and so forth. Thus, the help facility 530 may enable one user to receive a help feature at an appropriate and/or convenient time. In embodiments, the help feature may be recorded to the local storage facility 118, from which it may later be utilized. The media aspect 524 may comprise the abilities and capabilities described in this paragraph.

The help facility 530 may render usable a help feature (i.e. an instance of digital content 402) that is stored on and/or provided by an optical disc, memory stick, or other instance of the physical medium 400. The help facility 530 may additionally provide the user with an ability to receive an instance of the digital content 402 that may be associated with the message. In embodiments, this instance of the digital content 402 may comprise a hyperlink to a live help session. The help facility 530 may additionally provide the user with an ability to submit a rating directed at a help feature, such as according to a 5-star rating, a point rating on a 10-scale, a thumbs-up/thumbs-down rating, an academic-style A-through-F rating, or any other rating methodology. In some embodiments, the rating may further comprise a textual entry provided by the user. This textual entry may comprise a tag. The help facility 530 may provide the user with an ability to view a rating provided by or associated with a second user. In this way, the user may appreciate the help feature in advance of experiencing the help feature. The media aspect 524 may comprise the abilities described in this paragraph.

In embodiments, the help facility 530 may provide to the user an ability to download a help feature from a data network connection such as may be associated with the Internet; or to copy the help feature from a CD, DVD, or other such instance of the physical medium 400. The media aspect 524 may comprise this ability. A plurality of help features may be stored as a plurality of file-based representations in the local storage facility 118.

The help facility 530 may provide a management capability associated with the plurality of help features. This capability may comprise a providing a catalog to the user, wherein the catalog comprises a list of some or all of the plurality of help features. In the preferred embodiment the catalog may be presented as a hierarchical structure, organized by subject, rating, keyword, tag, or any other information associated with the help features. The user may be allowed to arrange the catalog, partition the catalog into two catalogs, aggregate two catalogs into one catalog, receive the catalog from a physical medium 400, transmit or record the catalog to a physical medium 400, and so forth. The media aspect 524 may comprise the management capability described in this paragraph.

The help facility 530 may provide an ability to display, to archive, and/or to retrieve one or more of the help features. The media aspect 524 may comprise this ability.

The service software component 532 may further comprise an aspect directed at compensating for a user-introduced, unintentional medium feature 404. The media aspect 524 may comprise this aspect. In one example, the medium feature 404 is a scratch, which may render the physical medium 400 partly or completely ruined. Prior to the introduction of this medium feature 404, this aspect of the service software component 532 may store the digital content 402 to the local storage facility 118. Thenceforth, the presence or proper functioning of the physical medium 400 may be unnecessary, since the digital content 402 is available from the local storage facility 118. This aspect may cut across all of the elements of the service software component 532, applying more or less equally both to all of them and to all of the possible forms of digital content 402 that may be associated with them. It should be appreciated that this aspect may provide a user such as a child with increased and reliable access to the digital content 402 within with the physical medium 400.

Figure 6:
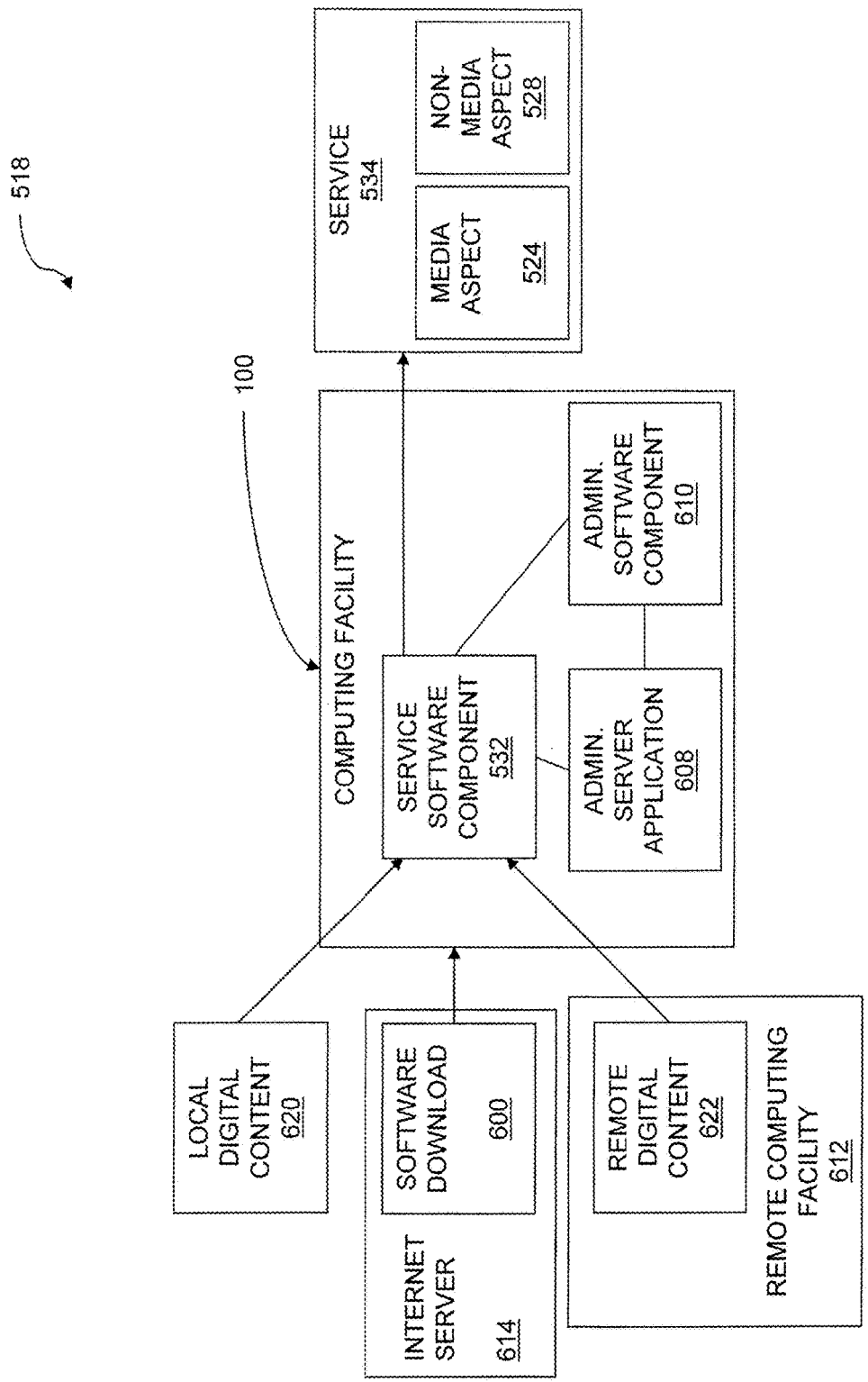
FIG. 6 depicts an embodiment of a child-oriented computing system.

Referring now to FIG. 6, a child-oriented computing system 518 may be provided. On the one hand, the computing system 518 may be directed at providing a child with reliable access to digital content 402, even when an adult is not present. On the other hand, the computing system 518 may be directed at limiting the child's access to digital content 402, such as according to an access control rule specified or otherwise imposed by the adult. This system 518 may comprise an instance of local digital content 620; an instance of remote digital content 622, provided by a remote computing facility 612; a software download 600, provided by an Internet server 614; a service 534; and the computing facility 100, which may comprise a service software component 532; an administrative server application 608; and an administrative software component 610.

The service software component 532 of the computing facility 100 may provide the service 534, which may be provided by the service software component 532 and, thus, may be any of the features, functions, or aspects of the service software component 532. In some embodiments, the service software component 532 may be provided as a built-in component or standard feature of the computing facility 100. In other embodiments, the software download 600 may, in whole or in part, provide the service software component 532 to the computing facility 100. This software download 600 may comprise an installer, an update, an upgrade, a bug fix, a security patch, and the like.

The service software component 532 may comprise a proprietary software application, an open-source application, a Web browser, a multimedia application, an audio application, an image-related application, an instant messaging application, or any other application that provides the service 534. The service software component 532 may be associated with the administrative server application 608 and/or the administrative software component 610. In the depicted embodiment, the computing facility 100 may comprise both the administrative server application 608 and the administrative software component 610. However, in other embodiments described hereinafter with references to FIGS. 7; 8; 9; 10; 11; 12; and 13, it will be shown that the computing facility 100 may not comprise the administrative server application 608 and/or the administrative software component 610. In some embodiments, described hereinafter with references to FIGS. 10; 11; 12; 13; and 14, it will be shown that multiple instances of the administrative server application 608 and/or the administrative software component 610 may be present.

The administrative server application 608 may be a software component that may be associated with the service software component 532 and the administrative software component 610. The nature of these associations is described in detail hereinafter with reference to FIG. 1. In some embodiments, the administrative server application 608 may be provided as a built-in component or standard feature of the computing facility 100. In other embodiments, the software download 600 may, in whole or in part, provide the administrative server application 608 to the computing facility 100. This software download 600 may comprise an installer, an update, an upgrade, a bug fix, a security patch, and the like.

The administrative software component 610 may be associated with the service software component 532 and the administrative server application 608. The nature of these associations is described in detail hereinafter with reference to FIG. 1. In some embodiments, the administrative software component 610 may be provided as a built-in component or standard features of the computing facility 100. In some embodiments, the software download 600 may, in whole or in part, provide the administrative software component 610 to the computing facility 100. This software download 600 may comprise an installer, an update, an upgrade, a bug fix, a security patch, and the like. In the preferred embodiment, the administrative software component 610 may comprise a Web browser.

The service 534, generally speaking, may relate to the service software component 532. Some embodiments of the service 605 are described hereinafter. It will be appreciated, however, that there exists a vast number of possible embodiments of the service 534. Thus, to the broadest extent allowed under the law, all possible embodiments of the service 534 are intended to fall within the scope of the present invention.

The local digital content 620 may comprise the digital content 402 and may be created at the computing facility 100 by a user of the computing facility. To create this digital content 402 the user may utilize an input device such as and without limitation a keyboard, a mouse, a microphone, a digital still camera, a video camera or Webcam, and the like. The local digital content 620 may be provided to the service software component 532 and may be received by any of the service software component 532.

The remote digital content 622 may comprise the digital content 402 and may be provided by a remote computing facility 612. The remote computing facility 612 may be any computing facility, including without limitation a server computer, a personal computer, a portable computer, a Palm Pilot, a cell phone, and so forth. The remote digital content 622 may be provided to the service software component 532 and may be received by and of the service software component 532. In embodiments, this provision may occur via an Internet connection between the computing facility 100 and the remote computing facility 612. The connection between the computing facility 100 and the remote computing facility 612 may comprise an operative coupling between the two.

The software download 600 may be received by the computing facility 100 over an Internet connection from an Internet server 614. The Internet server 614 may comprise a server computer, a tower computer, a rackmount computer, and the like. The Internet connection from the Internet server 614 to the computing facility 100 may comprise an operative coupling between the two.

The administrative server application 608, in association with the administrative software component 610 and the service software component 532, may provide the non-media aspect 528 of the service 534. Generally, the administrative software component 610 may provide an administrative user interface through which an administrative user may specify and/or perform a monitoring and/or controlling of a user's access to the media aspect 524. In the preferred embodiment, the user is a child and the administrative user is a parent of the child; a guardian of the child; an adult responsible for the child (such as and without limitation a teacher, a tutor, a caregiver, and the like); or a delegate designated by the parent, guardian, or adult. In any case, the administrative user may be desirous of and/or responsible for monitoring and/or approving the child's access to the media aspect 524. The non-media aspect 528 of the service 534 may comprise this monitoring and/or approving. Information associated with the monitoring may be stored as an activity log file, which may comprise indicia of the activities of a user vis-a-vis the computing facility 100.

When providing the service 534, the service software component 532 may report to, confer with, and/or check information associated with or provided by the administrative server application 608 and/or the administrative software component 610. Generally speaking, the non-media aspect 528 may control access to a media aspect 524.

In one embodiment, the non-media aspect 524 may be the service software component's 532 checking to see if the media aspect 524 is associated with a whitelist provided by the administrative server application 608. In an alternate embodiment, the non-media aspect 524 may be the service software component's 532 providing to the administrative server application 608 information identifying the media aspect 524 and the administrative server application 608 may check to see if the media aspect 524 identified by the information is associated with the whitelist. In any case, if the media aspect 524 is associated with the whitelist, then the user may be allowed to receive the media aspect 524. Otherwise, the user may not be allowed to receive the media aspect 524.

The whitelist may comprise a list of approved Web sites and/or a list of approved media types (such as and without limitation audio, video, audio-video, interactive content, text, instant message, video chat, audio chat, and so forth). The administrative user may specify the approved Web sites and/or approved media types that appear in the whitelist. In some embodiments, the whitelist may comprise a categorization of the approved Web sites and/or approved media types. In these embodiments, each of the Web sites and/or media types may be associated with one or more categories (such as and without limitation, educational, entertainment, edutainment, free, pay-per-use, English-language, third-party-approved content, and so forth). The administrative user may be able to include or exclude Web sites and/or media types from the whitelist by selecting or deselecting a category that is associated with the Web sites and/or the media types.

In another example, the non-media aspect 528 may comprise an e-mail address and/or an instant messaging address, moniker, handle, or the like. The administrative user may specify the e-mail address and/or the instant message address via the administrative software component 610. Then, the service software component 532 may allow the first user to access a service 534 that comprises a media aspect 524 and the non-media aspect 528. The non-media aspect 528 may comprise an e-mail address and the media aspect 524 may comprise an e-mail message originating from or destined to the e-mail address. The non-media aspect 528 may comprise an instant messaging address and the media aspect 524 may comprise an instant message to the instant messaging address; an instant message from the instant messaging address; an instant messaging session that includes instant messages to and/or from the instant messaging address. The non-media aspect 528 may comprise a video chat address and the media aspect 524 may comprise a video chat session that include a video stream to and/or from the video chat address. Many other examples of pairs of media aspects 524 and non-media aspects 528 will be appreciated.

In another example, the non-media aspect 528 may comprise access to an educational item. The educational item may without limitation comprise an educational game, an educational Web site, an online reference that is associated with education (e.g. a dictionary, encyclopedia, blog, and so forth), a software tool for writing a report, a software tool for creating a presentation, a software tool for performing a calculation, and so forth. The administrative user may specify, such as via the administrative software component 610, one or more educational items as being accessible to the first user. The whitelist may be comprised of the educational items, references thereto, or identifiers thereof, any of which may be checked by the service software component 532 prior to allowing the first user to receive a service 534 comprising the educational item as the media aspect 524 and access to the educational item as the non-media aspect 528.

In still another example, the non-media aspect 524 may comprise access to a help feature, which may comprise an entertaining and/or visually demonstrative help feature. The help feature may be provided by the help facility 530, described hereinabove with reference to FIG. 5. The user may receive a service 534 comprising the help feature as the media aspect 524 and the timing of the provision of the help feature (e.g. periodically, from time to time, autonomously, on request, on startup, etc.) may comprise the non-media aspect 428.

In another example, the non-media aspect 524 may comprise a parental control, which may comprise a time limitation associated with one or more of the following: using the computing facility 100, watching television, watching a recorded program, playing a game, surfing the Internet, watching a video, watching a DVD, playing a song, communicating with a person via the Internet, using a particular software program, and so forth. Alternatively or additionally, the parental control may be associated with a schedule according to which one or more of the following may be accessed: the computing facility 100, a television program, a recorded program, a computer game, the Internet, a video, a DVD, a song, an instant messaging or video-chat session, a software program, and so forth. The parental control may comprise and/or be associated with a list of approved television channels, a list of approved television shows, a list of Web sites approved for Web surfing (e.g. the whitelist), a list of approved e-mail addresses, a list of approved instant messaging addresses, a list of approved video-chat or video conferencing addresses, a list of approved phone numbers, a content rating level, a list of friends (with whom the first use is authorized to e-mail, text message, video chat, share documents with, and so forth). Alternatively or additionally, the parental control may be associated with adding and/or removing software and/or content from the computing facility 100.

In some embodiments, the non-media aspect 524 may comprise a parental control that is associated with the completion of a task by the user of the computing facility 100. For example and without limitation, the parental control may allow the user to have access to a computer game, but only after a homework assignment is complete. Many other examples will be apparent.

Figure 16:
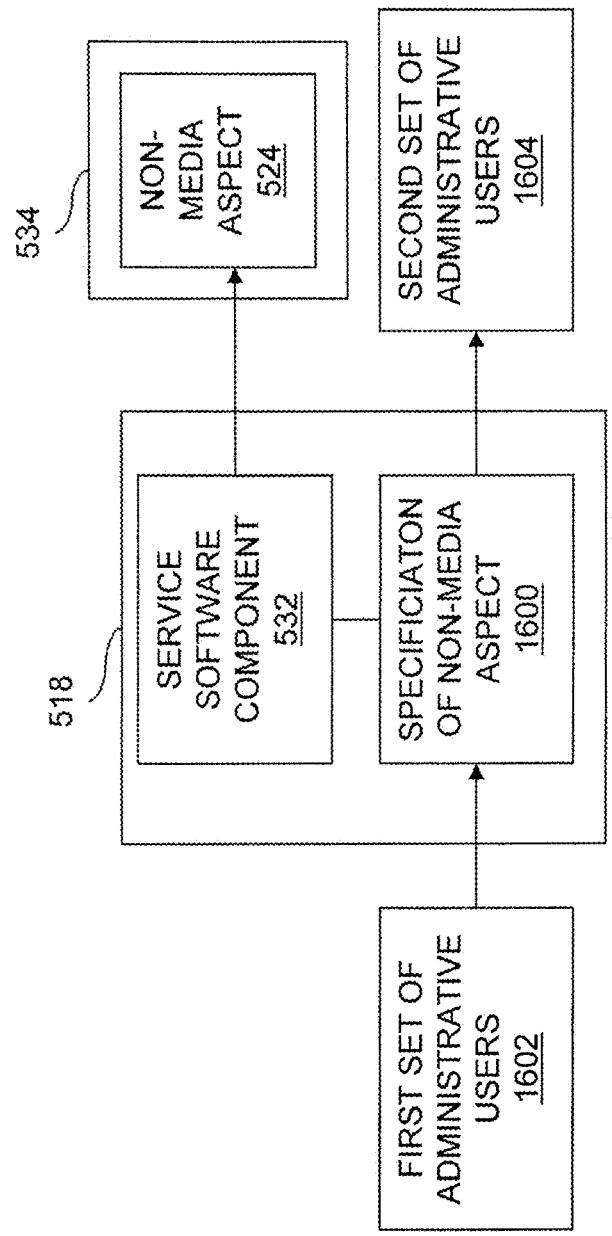
FIG. 16 depicts a functional block diagram of a computing facility.

Referring to FIG. 16, a specification 1600 of a non-media aspect 528 may be provided by a first set of administrative users 1602 and received by second set of administrative users 1604. Both sets of administrative users may have a cardinality of one or more. These sets may or may not be disjoint and may or may not be equal. Thus, administrative users may share specifications 1600 with each other, receive specifications 1600 from other administrative users, or provide specifications 1600 to other users. In one embodiment, a self-selected group of administrative users, such as a couple or group of adult family members, may share specifications with each others. In another embodiment, an administrator such as a parent may choose to receive specifications from a first set of administrative users such as a school, religious organization, trusted third party, and the like. Many other such examples will be appreciated. The sharing may occur in real-time, periodically, sporadically, automatically, in response to a manual input, and so forth. In all cases, the child-oriented computing facility 518 may receive the specification 1600 from the first set of administrative users 1602, store the specification 1600, and provide the specification 1600 to the second set of administrative users 1604. The service software component 532 may provide the non-media aspect 528 of the service 534 in accordance with the specification, which may be embodied as digital information, which may be stored or accessed by an element of the child-oriented computing system 518.

Figure 7:
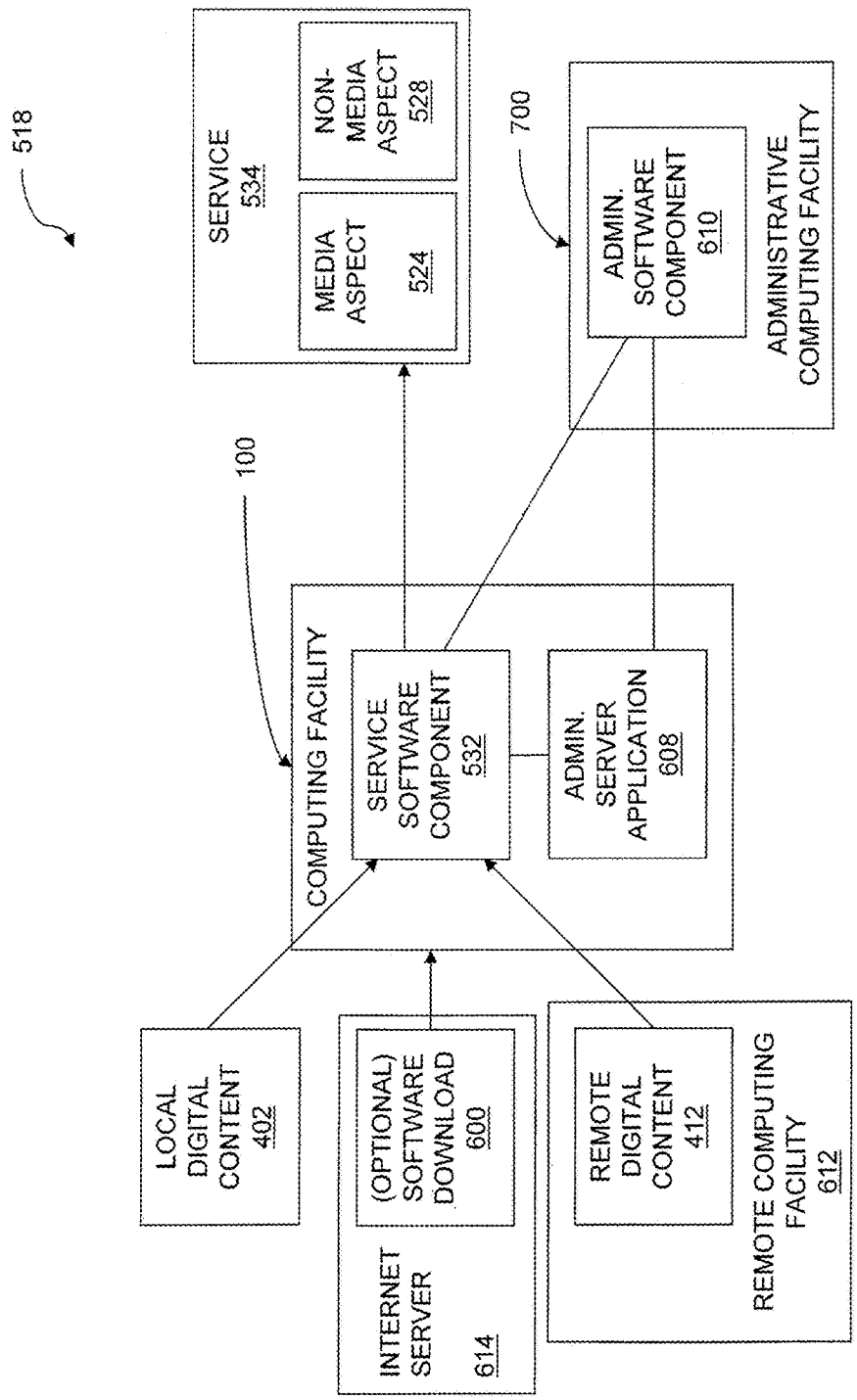
FIG. 7 depicts an embodiment of a child-oriented computing system.

Referring now to FIG. 7, the child-oriented computing system 518 may comprise the elements described hereinabove with reference to FIG. 6, with the following modifications: The computing facility 100 may not comprise the administrative software component 610. Instead, an administrative computing facility 700 may comprise the administrative software component 610. The administrative computing facility 700 may comprise any computing facility, such as and without limitation a server computer, a personal computer, a portable computer, a cell phone, a Palm Pilot, a Blackberry, and so forth. In the preferred embodiment, the administrative computing facility 700 comprises a personal computer. The administrative computing facility 700 may be under the control of an adult. The administrative computing facility 700 and its components may be operatively coupled to the elements of the computing facility 100 via an Internet connection.

Figure 8:
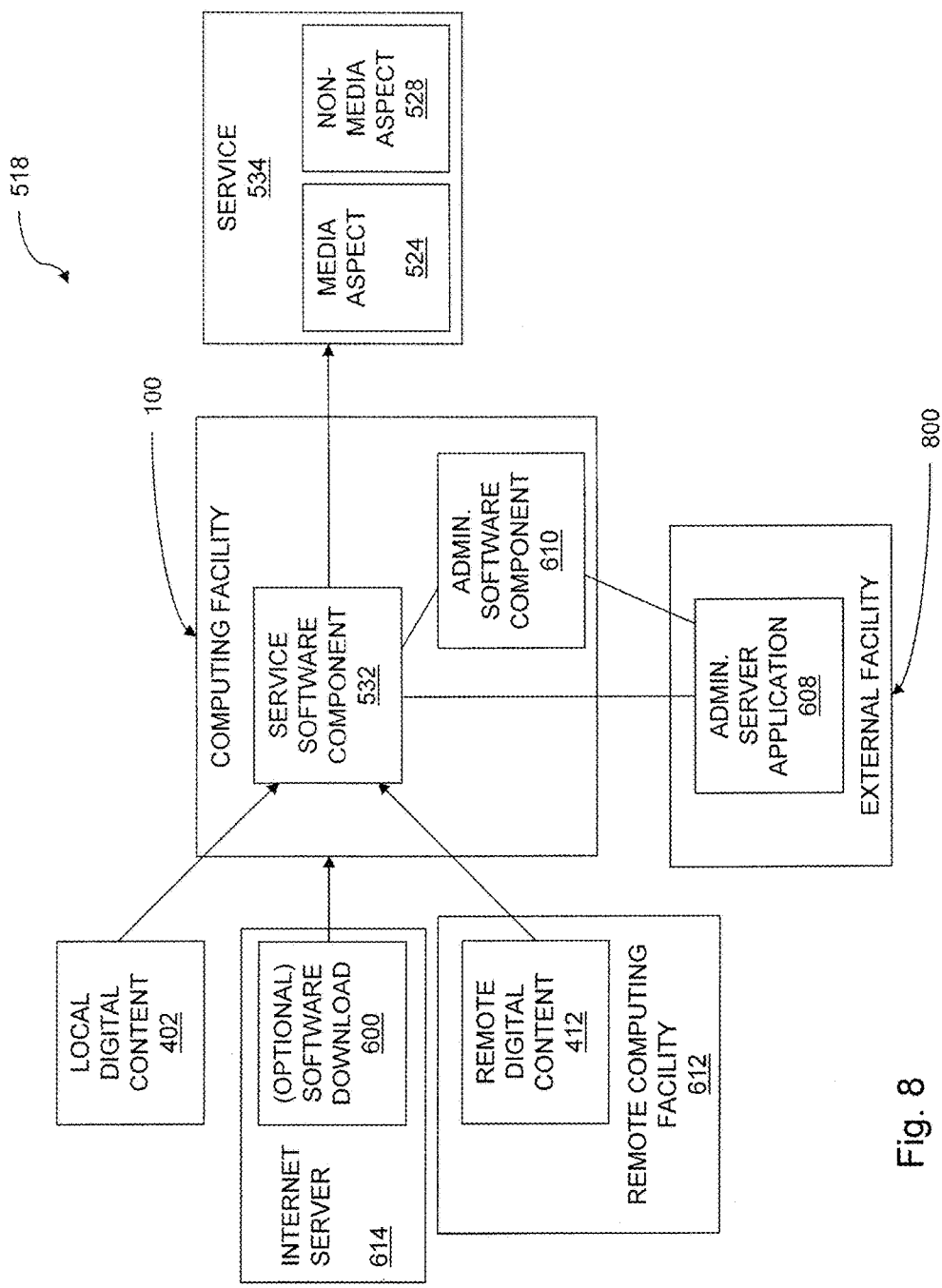
FIG. 8 depicts an embodiment of a child-oriented computing system.

Referring now to FIG. 8, the child-oriented computing system 518 may comprise the elements described hereinabove with reference to FIG. 6, with the following modifications: The computing facility 100 may not comprise the administrative server application 608. Instead, an external facility 800 may comprise the administrative server application 608. The external facility may comprise any computing facility, such as and without limitation a server computer, a personal computer a portable computer, a cell phone, a Palm Pilot, a Blackberry, and so forth. In the preferred embodiment, the external facility 800 comprises a server computer. The administrative server application 608 may be provided as and/or accessed as a service, such as in a service-oriented architecture and/or an application service provider business model. The external facility 800 and its components may be operatively coupled to the elements of the computing facility 100 via an Internet connection.

Figure 9:
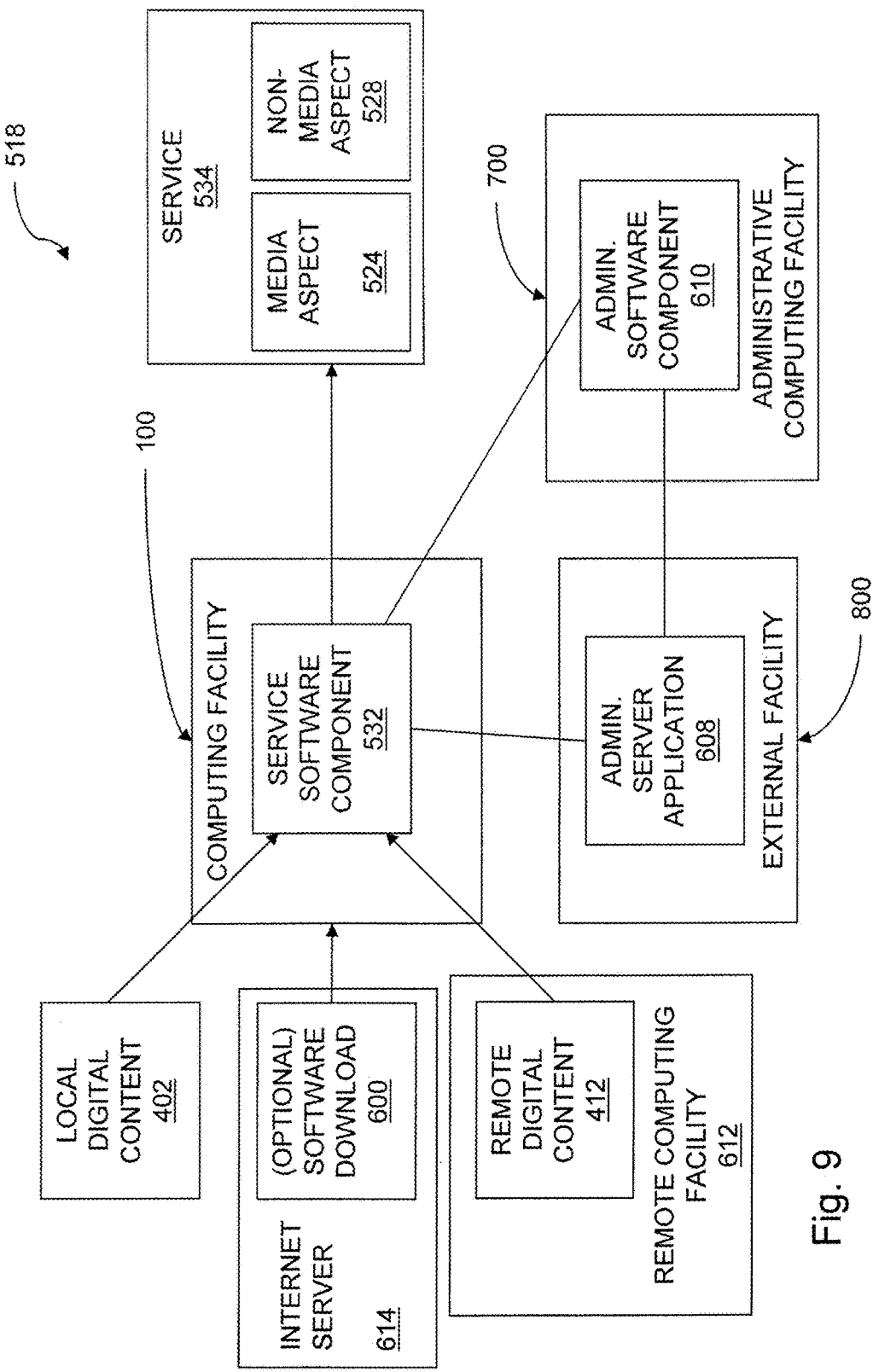
FIG. 9 depicts an embodiment of a child-oriented computing system.

Referring now to FIG. 9, the child-oriented computing system 518 may comprise the elements described hereinabove with reference to FIG. 6, with the following modifications: The computing facility 100 may comprise neither the administrative software component 610 nor the administrative server application 608. Instead, the external facility 800 may comprise the administrative server application 608 (as described hereinabove with reference to FIG. 8) and the administrative computing facility 700 may comprise the administrative software component 610 (as described hereinabove with reference to FIG. 7). The external facility 800, the administrative computing facility 700, the computing facility 100, and their respective components may be operatively coupled via an Internet connection.

Figure 10:
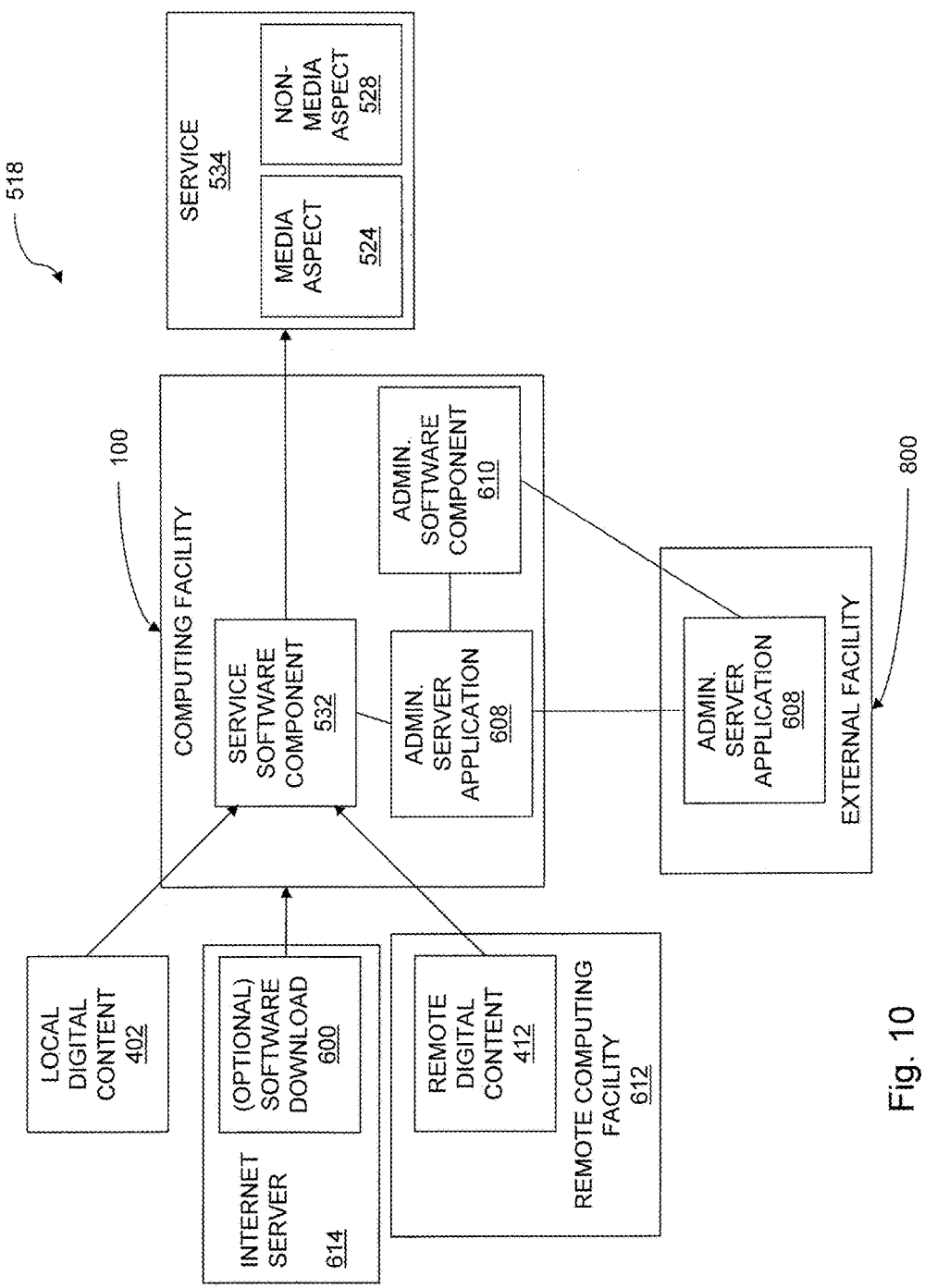
FIG. 10 depicts an embodiment of a child-oriented computing system.

Referring now to FIG. 10, the child-oriented computing system 518 may comprise the elements described hereinabove with reference to FIG. 6, with the following modifications: The external facility 800 is provided. The external facility 800 contains an instance of the administrative server application 608, which may be associated with the administrative server application 608 of the computing facility 100. This association, from time to time, may comprise an operative coupling between the administrative server applications 608 over which a signal may be passed from one of the administrative server applications 608 to the other. Also, the administrative software component 610 may be associated with both the administrative server application 608 of the computing facility 100 and the administrative server application 608 of the external facility 800. In this embodiment, some aspects of the administrative server application 608 my be provided by the instance 608 of the computing facility 100, while other aspects may be provided by the instance 608 of the external facility 800. For one example, the categorization of Web sites may be provided by a third-party who may, perhaps for a fee such as a subscription fee, operate the external facility 800. From time to time, the instance 608 of the computing facility 100 may retrieve the categorization so that it may be applied locally according to input received from the administrative software component 610.

Figure 11:
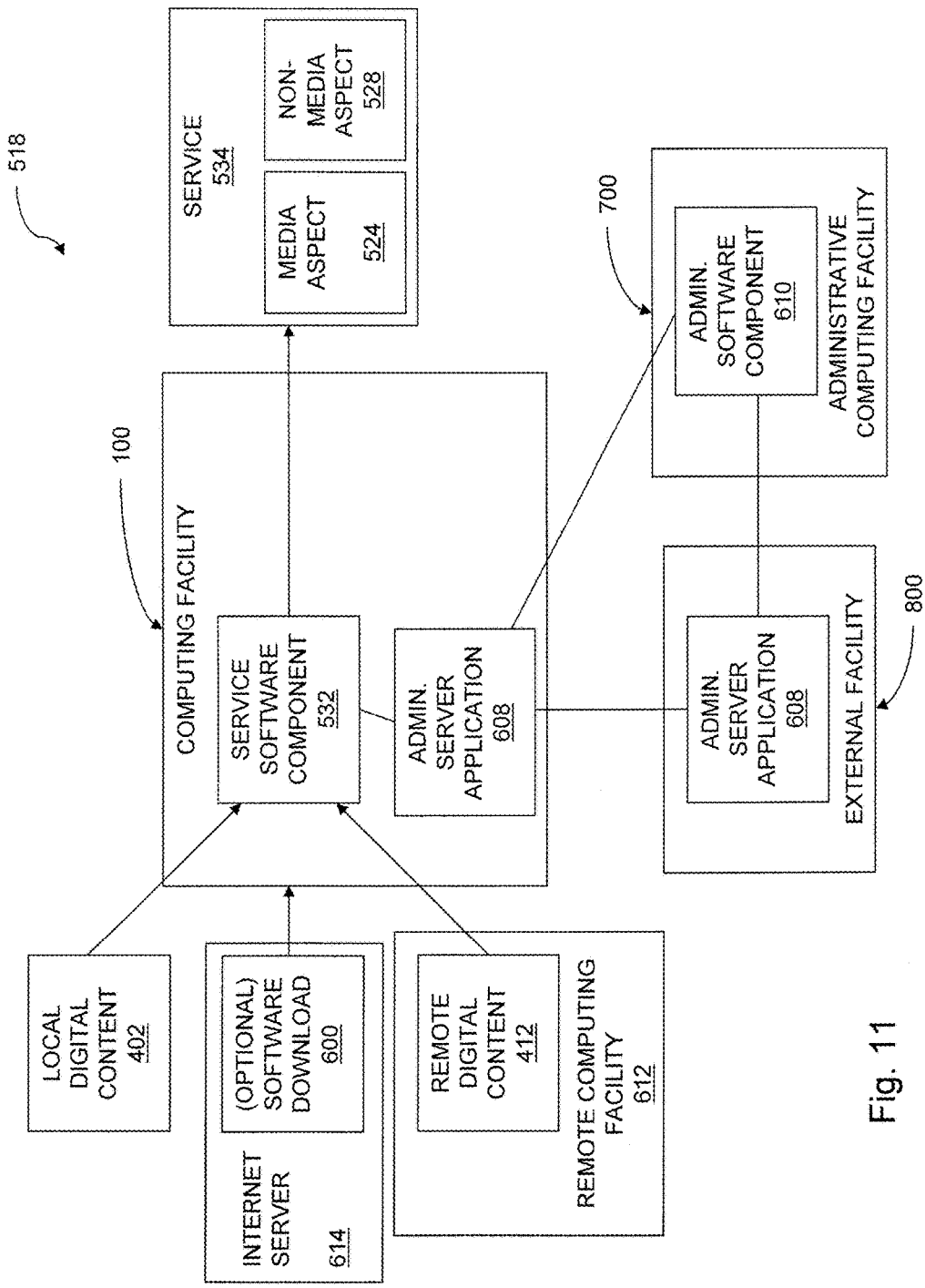
FIG. 11 depicts an embodiment of a child-oriented computing system.

Referring now to FIG. 11, the child-oriented computing system 518 may comprise the elements described hereinabove with reference to FIG. 6, with the following modifications: As was described hereinabove with reference to FIG. 10, the external facility 800 and its instance of the administrative server application 608 is provided. Also, as described hereinabove with reference to FIG. 7, the computing facility many not comprise the administrative software component 610. Instead, the administrative computing facility 700 and its instance of the administrative software component 610 may be provided. The embodiment is analogous to that described hereinabove with reference to FIG. 7, except that, for example, the administrative user may not provide administrative input and/or receive administrative output (such as a report associated with the usage of the computing facility 100 by the first user) at the computing facility 100. Instead, the adult must use the administrative computing facility 700.

Figure 12:
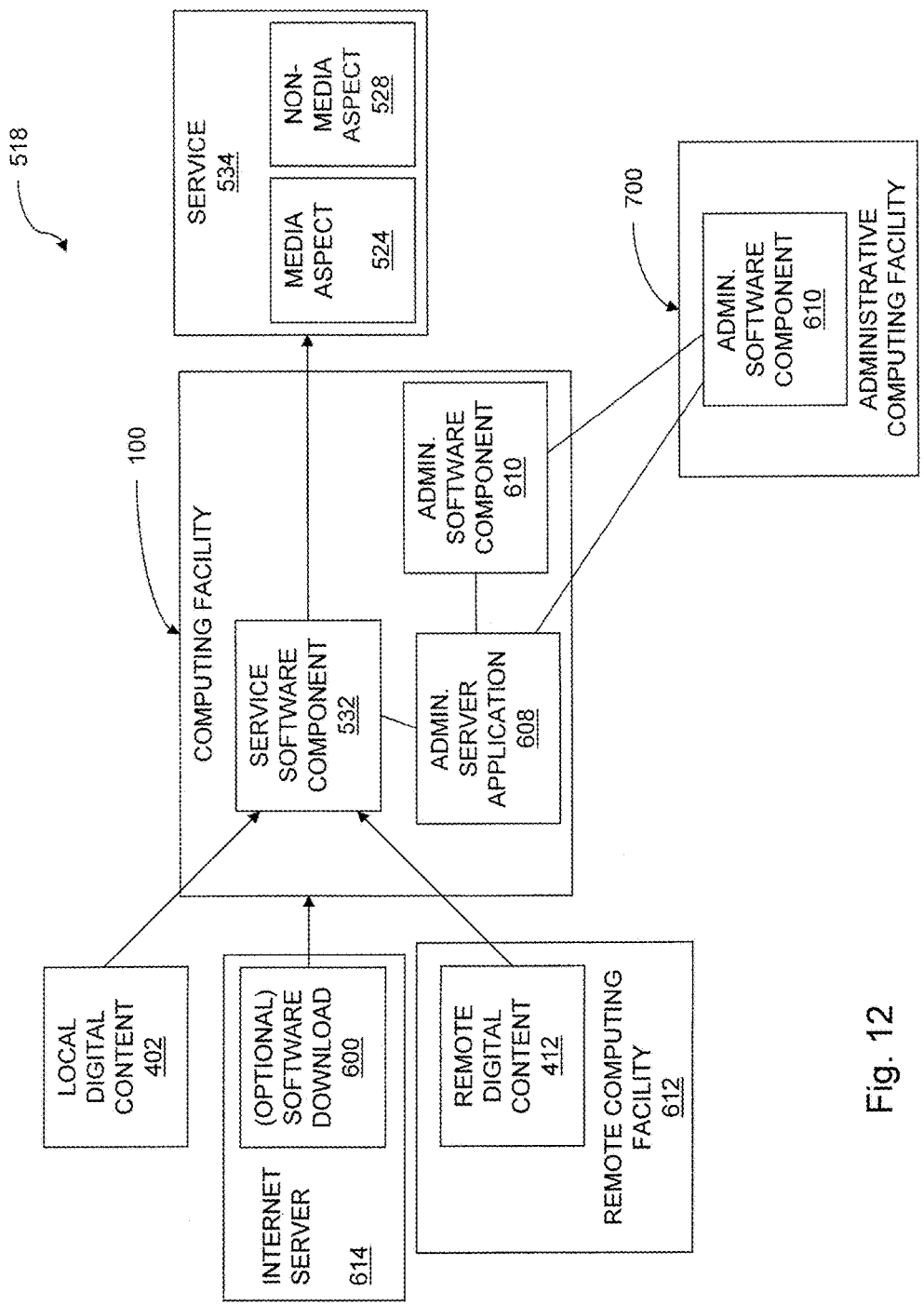
FIG. 12 depicts an embodiment of a child-oriented computing system.

Referring now to FIG. 12, the child-oriented computing system 518 may comprise the elements described hereinabove with reference to FIG. 6, with the following modifications: The administrative computing facility 700 and its instance of the administrative software component 610 (as described hereinabove with reference to FIG. 7) may be provided, which may be associated with the administrative software component 610 of the computing facility 100. This association, from time to time, may comprise an operative coupling between the administrative software components 610 over which a signal may be passed from one of the administrative software components 610 to the other. For example, the administrative user may provide administrative input and/or receive administrative output either at the computing facility 100 or via the administrative computing facility 700.

Figure 13:
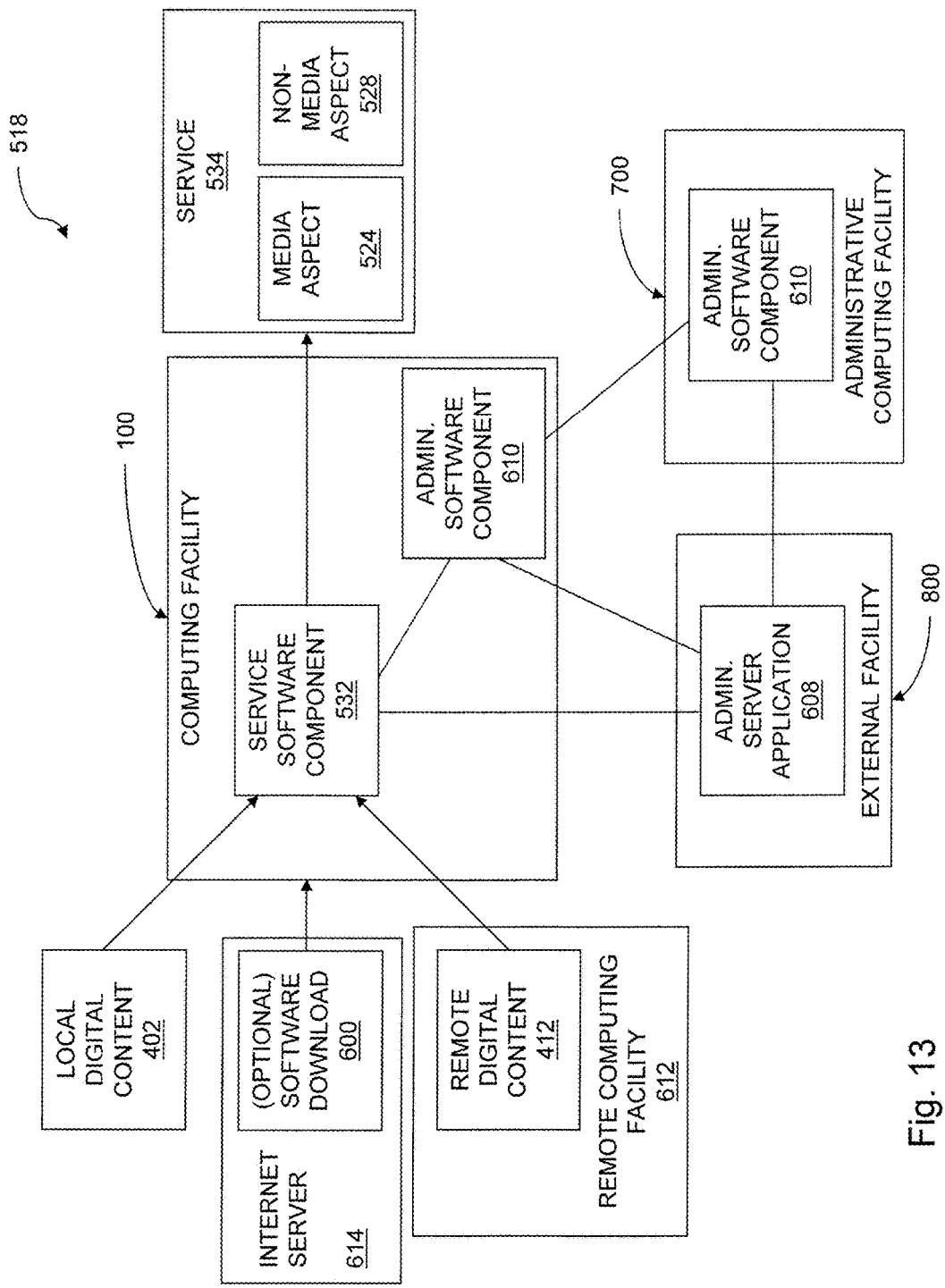
FIG. 13 depicts an embodiment of a child-oriented computing system.

Referring now to FIG. 13, the child-oriented computing system 518 may comprise the elements described hereinabove with reference to FIG. 6, with the following modifications: As was described hereinabove with reference to FIG. 8, the external facility 800 and its instance of the administrative server application 608 is provided, while the computing may not comprise the administrative server application 608. Additionally, as described hereinabove with reference to FIG. 12, the administrative computing facility 700 and its instance of the administrative software component 610 may be provided. This arrangement may provide two major advantages as compared with other embodiments. Like the embodiments described hereinabove with reference to FIG. 12, the administrative user has the freedom to access and/or provide administrative information at the computing facility 100 or via the administrative computing facility 700. Moreover, the entire administrative server application 608 is maintained at the external facility 800, which may allow multiple instances of the computing facility 100 (such as, multiple computing facilities distributed throughout a house) to share the information, services, and features of the administrative server application 608. This may provide a convenient way to have the same non-media aspects 528 provided at each of the computing facilities 100, since they are all provided in association with the same administrative server application 608.

Figure 14:
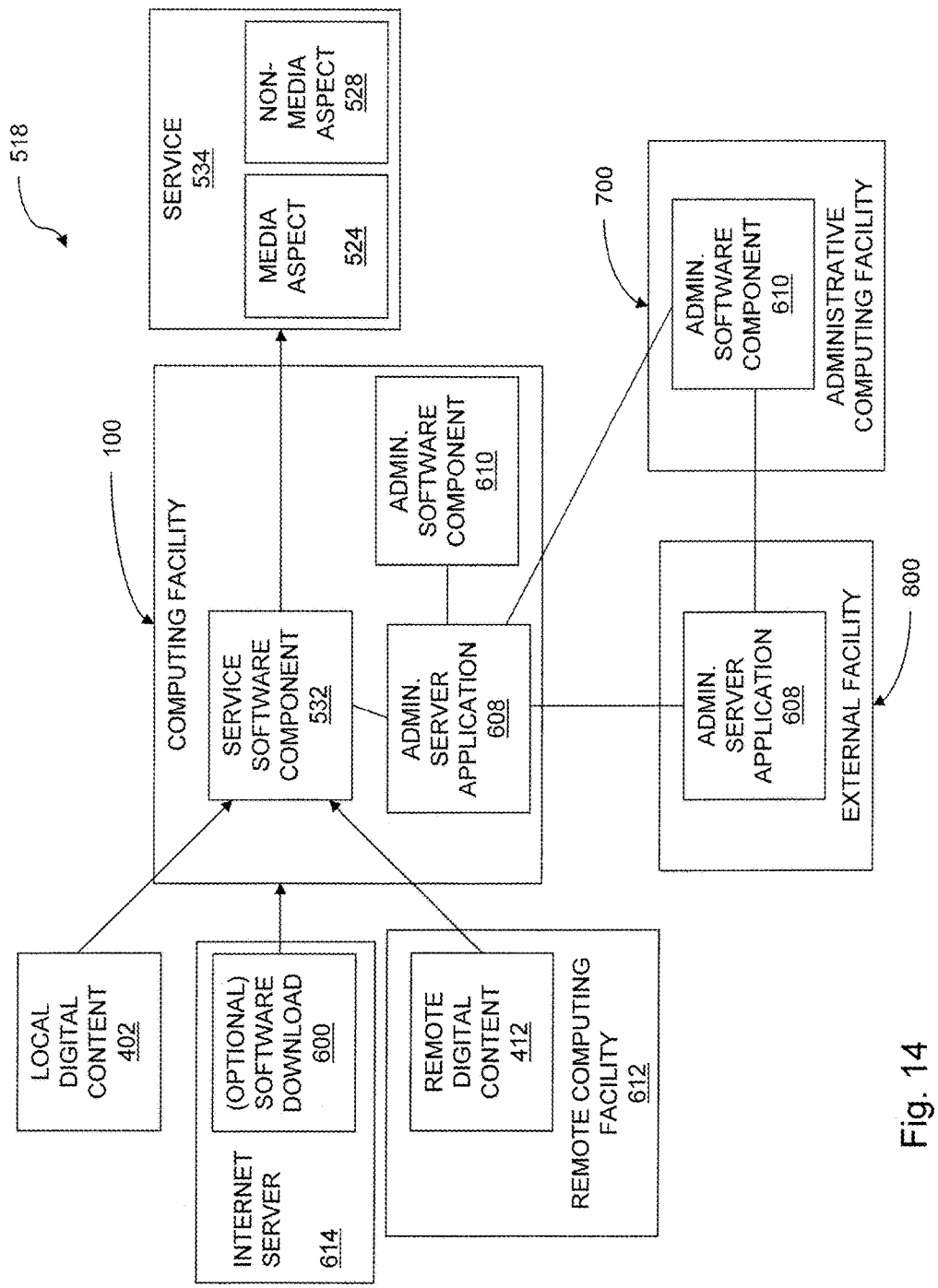
FIG. 14 depicts an embodiment of a child-oriented computing system.

Referring now to FIG. 14, the child-oriented computing system 518 may comprise the elements described hereinabove with reference to FIG. 6, with the following modifications: As was described hereinabove with reference to FIG. 8, the external facility 800 and its instance of the administrative server application 608 is provided. Additionally, as described hereinabove with reference to FIG. 12, the administrative computing facility 700 and its instance of the administrative software component 610 may be provided. This embodiment may provide all of the advantages of the embodiment described hereinabove with reference to Figure F14, with the added advantage that the computing facility 100 may function properly in the occasional absence of the external facility 800, such as due to a system failure of the external facility 800.

Figure 15:
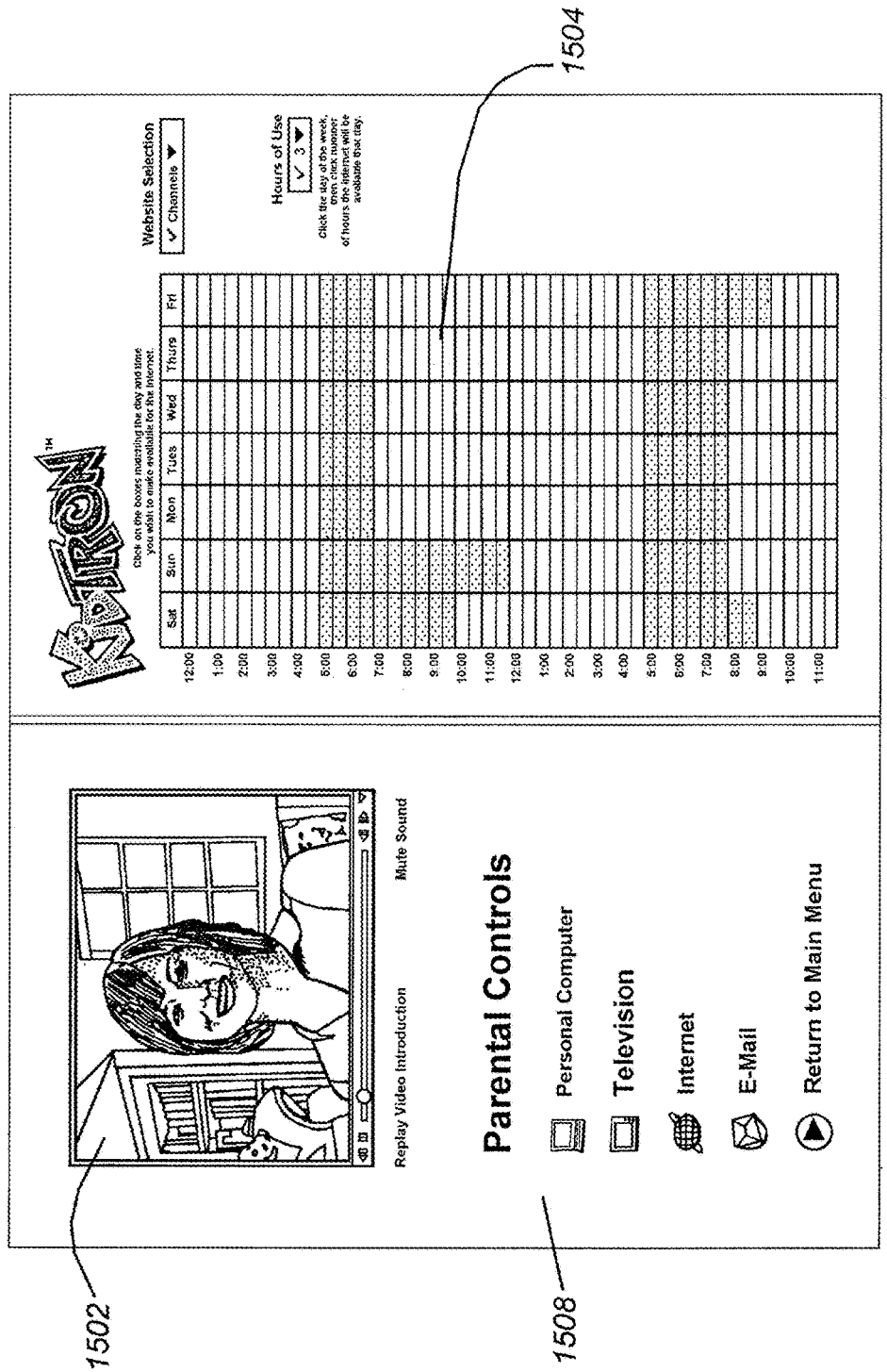
FIG. 15 is a screenshot of a user interface provided by an administrative software component.

FIG. 15 illustrates an administrative user interface 1500, which may be provided by the administrative software component 610. The administrative user interface 1500 includes features directed at regulating parental controls of over certain activities on the computer facility 100 according to principles of the present invention. In this embodiment, the administrative user may be presented with a control panel including parental controls 1508 directed at the functions, features and services provided to the user by the computing facility 100 (e.g. television, personal computer, Internet, e-mail, instant message, or other functions permitted on the computing facility 100, such as those provided by the service software component 532). For example, the administrative user may choose one of the functional representations (e.g. television). After selecting the representation, the administrative user may be presented with a calendar with times of day 1504, or other graphical control field, where the parent is capable of setting a user's weekly activity availability schedule. In embodiments, each of the functional areas may be set by the administrative user to provide the user with control over only certain functions at particular times of the day within days of the week. To aid the administrative user in operating the administrative user interface 1500, a help frame 1502 may be presented. In the depicted example, the help frame 1502 contains a help video.

In embodiments, a parent (i.e. an administrative user) may have the ability to communicate with his child (i.e. a user) via a parental account. Moreover, the parent may have the ability to share media and documents with their children via their parental account. For example, once the parent is signed onto their account (either via the administrative computing facility 700 or via the computing facility 100 itself), she can do direct one or more of the following actions at one or more of her children: manually send a message to a child, wherein the message appears in a screensaver that is provided to the child by the computing facility 100; automatically send a message to a child in association with information retrieved from the Internet (for example and without limitation, the message may comprise an indication of the forecast weather and the clothes that that child should wear in association with the weather); add an action item to a calendar that is associated with the child and provided to the child by the computing facility 100, wherein the item may comprise a task, event, or automated action (for example and without limitation, the event may comprise a scheduled wake-up message, which may be provided to the child at a scheduled time as an audible alarm, such as to wake up the child. For another example and also without limitation, on a child's birthday, an automated action allow the child to have access to the messaging facility 512 or some other feature that was previously unavailable to the child); share a digital image with the child, wherein the image may be provided to the child by the computing facility 100; withdraw a digital image from the child, wherein the image may cease being provided to the child by the computing facility 100; share a digital video with the child, wherein the video may be provided to the child by the computing facility 100; withdraw a digital video from the child, wherein the vide may cease being provided to the child by the computing facility 100; provide digital content 402 to the computing facility, wherein the digital content 402 originates from a Web site.

In embodiments, the child-oriented computing system 518 may provide a parental community that may enable parents to communicate with each other on a variety of topics, as well as enabling them to rate the various software, media and content related to the computing facility 100 and/or the child-oriented computing system 518. In embodiments, the parental community may provide trusted information, such as information on proper nutrition, exercise programs, or other health and/or nutritional information directed at parents. The parental community may be implemented as a database-backed Web site, a blog, a proprietary software application, a listserv, and so forth.

In embodiments, the computing facility 100 may provide different user interfaces that vary in complexity and capability. For example, the user interface level may change automatically based upon the age of a user and/or based on the mastery of a computing skill by the user. In the preferred embodiment, the levels are implemented as follows: At the lowest level, all navigation of on-screen features of the computing facility 100 (such as and without limitation Web browsing, song selection, video selection, game selection, instant message sending, and so forth) may be done simply by pressing keys on the keyboard 104, without using the mouse 108. In order to make the system 518 easy to use, at this level there may be no editing functionality. So, for example, a user may be able to transmit a predefined instant message, but may not be able to write a new one or edit an existing one. A user may be permitted to play a game (such as may be provided by the interactive program facility 510), consume media (such as may be provided by the audiovisual facility 500, the audio facility 502, the image facility 504, and so forth). At the next level, a simple editing capability may be provided, such as and without limitation the ability to crop a picture with a simple square that can be resized and moved around. Additionally, a user may be expected to master the use of the mouse 108 with respect to movement of the mouse 108 and the use of one button on the mouse 108. However, if the mouse 108 comprises more than one button, the user may not be provided with a capability associated with those other buttons. At the highest level, an advanced photo editing capability may be present along with a video editing capability. A user may be expected to have mastered all aspects of the mouse and, for example, will be able to take advantage of right-click menus (such as those available in Windows XP and other such operating systems).

In addition to the different levels of the user interface, a simple improvement may be made to the user interface 1500, such as the elimination of a capability that may both be associated with a mainstream operating system, such as Windows XP or Mac OS X, and be associated with confusing a child. In one example, the ability to change the text associated with an icon may be eliminated. Furthermore, menus may appear only in response to a click, not just a mouse-over.

In embodiments, a parents may have access to a support button, which may provide an authorization associated with allowing the computing facility 100 to log information and current system information and to transmit said information to the administrative server application 608 of the external facility 800. In embodiments, this information may be transmitted during a call to technical support, wherein providing technical support may be associated with the external facility 800. In embodiments, a parent may provide the authorization to the computing facility 100 remotely (such as from the administrative computing facility 700) or directly (such as via the computing facility 100 itself).

In embodiments, the child-oriented computing system 518 may provide personalized access to software, media, and/or other information directed at children.

In embodiments, a user interface provided by the computing facility 100 may be graphically themed for each application or component of the service software component 532. A theme for each application of component may be grouped together into a theme set. In embodiments, the theme set for the computing facility 100 may be projected onto, provided to, or associated with a Web site, so that when the Web site is accessed it provides a theme that matches a theme in the set.

Figure 17:
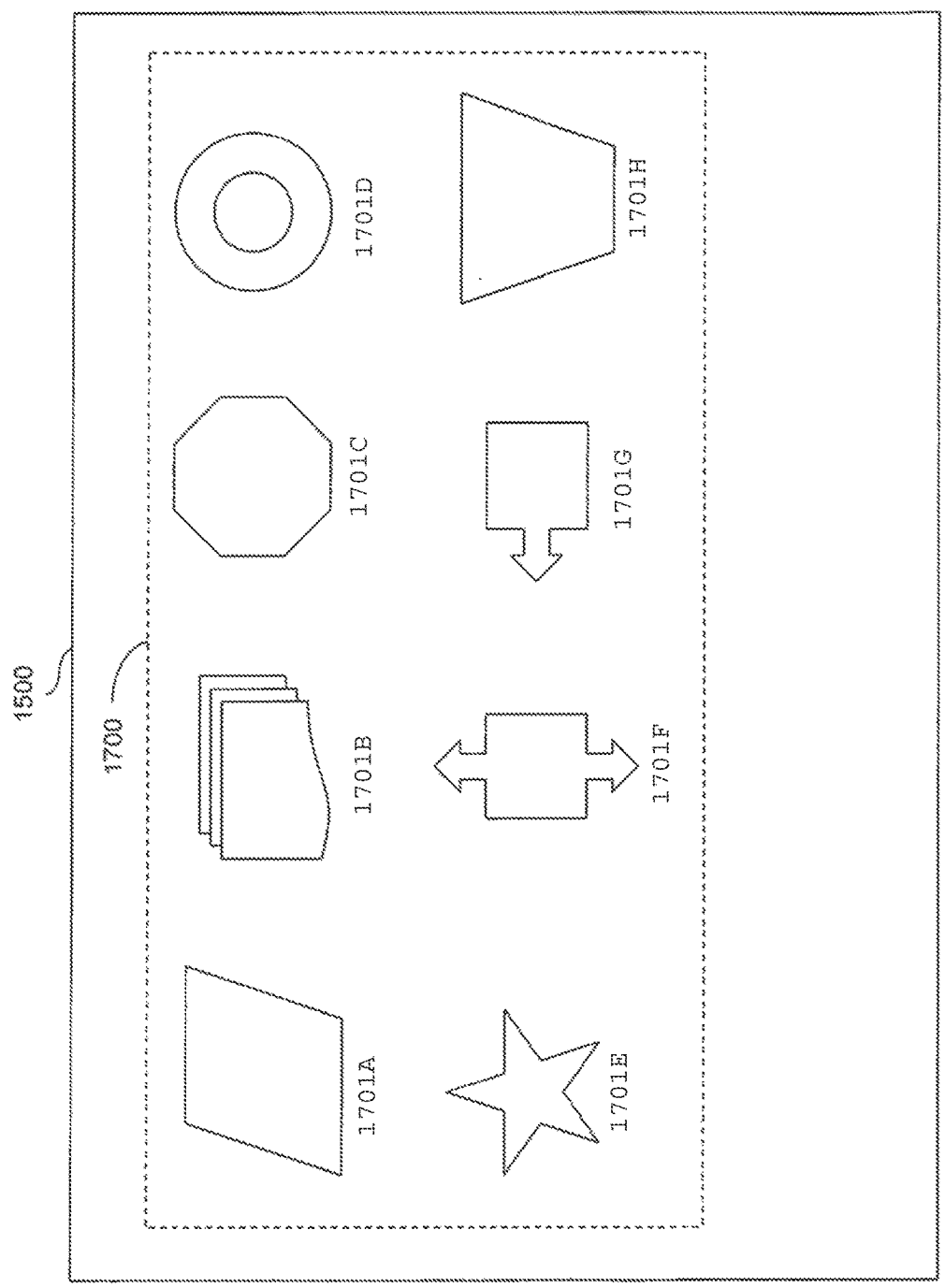
FIG. 17 depicts a graphical user interface.

Referring now to FIG. 17, the user interface 1500 may provide an access control feature, which may present a child with a number of pictorial challenges in lieu of requiring the child to enter a password to gain access or sign on to the system 518. The child's responses to the challenges establishes whether the child knows a secret. The secret may be defined by the child and known by only the child and the child-oriented computing system 518. The secret may comprise a person, a shape, a color, some other thing that may be represented as a picture, or a sequence of the foregoing. To define the secret, the child may select a picture from a set of pictures 1700 presented to the child by the user interface 1500. The set of pictures 1700 may include a number of graphical shapes 1701A-1701H from which the child may choose. Then, the user interface 1500 may present the child with a game that is directed at establishing that the child really knows the secret. In one example embodiment, the secret is a sequence including a person, a shape, and a color. The sequence may be selected by the child, who may select a picture of the person, a picture of the shape, and a picture of the color via the user interface 1500. Alternatively, the sequence may be automatically generated by the system 518 and presented to the child via the user interface 1500 as a picture of the person, a picture of the shape, and a picture of the color. Many other embodiments of the secret will be apparent.

Figure 18:
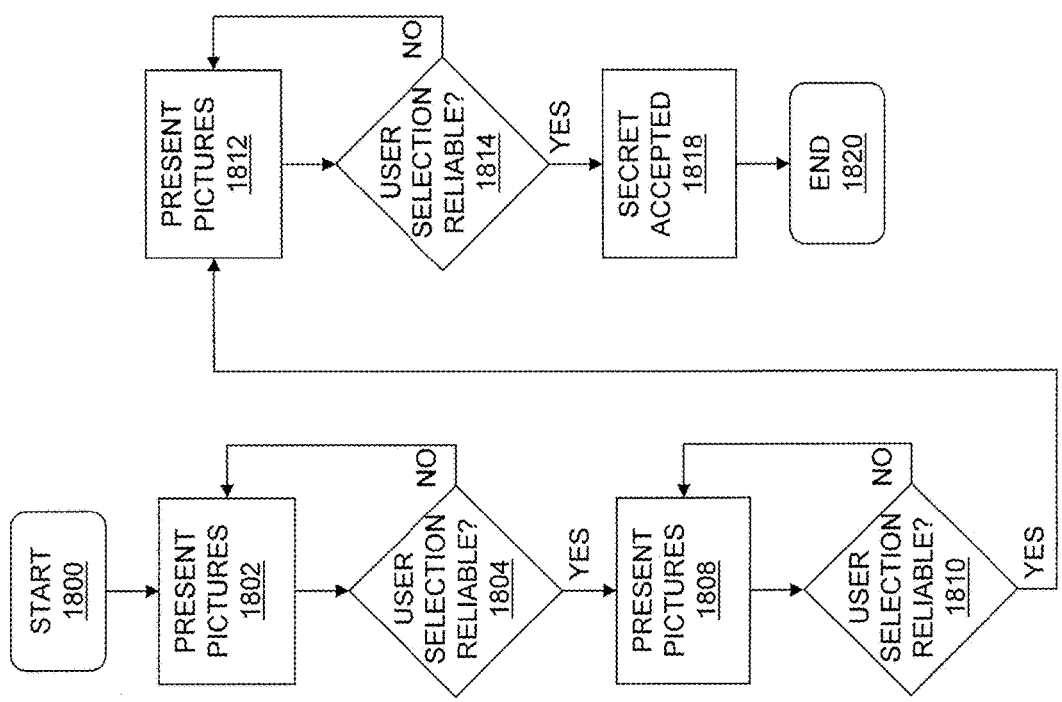
FIG. 18 is a logical flow diagram of a process for accepting a secret or solution.

Referring to FIG. 18 and according to the foregoing example embodiment of the secret, the game proceeds as follows: The game process begins at logical block START 1800. From there, processing flow continues to logical block PRESENT PICTURES 1802, where the child is presented with a first set of pictures 1700, each of which depicts a thing. One of the pictures depicts the person. The child utilizes the user interface 1500 to choose one of the pictures. Then, processing flow proceeds to logical block 1804, where a test is conducted to determine if the child has demonstrated that he can reliably select the picture of the person from the first set of pictures 1700. If the result of this test is negative, then processing flow returns to logical block PRESENT PICTURES 1802. Otherwise, processing flow continues to logical block PRESENT PICTURES 1808. There, the child is presented with a second set of pictures 1700. These pictures include a picture of the shape. The child utilizes the user interface 1500 to choose one of the pictures. Then, processing flow proceeds to logical block 1810, where a test is conducted to determine if the child has demonstrated that he can reliably select the shape from the second set of pictures 1700. If the result of this test is negative, then processing flow returns to logical block PRESENT PICTURES 1808. Otherwise, processing flow continues to logical block PRESENT PICTURES 1812. There, the child is presented with a third set of pictures 1700. These pictures include a picture of the color. The child utilizes the user interface 1500 to choose one of the pictures. Then, processing flow proceeds to logical block 1814, where a test is conducted to determine if the child has demonstrated that he can reliably select the shape from the third set of pictures 1700. If the result of this test is negative, then processing flow returns to logical block PRESENT PICTURES 1812. Otherwise, processing flow continues to logical block SECRET ACCEPTED 1818. There the child-oriented computing system 518 accepts the secret. Processing flow continues to logical block END 1820, where the game procedure ends. Thenceforth, the child will be presented with a set of pictures or a sequence of sets of pictures when signing on to the child-oriented computing system 518. The child will be required to provide evidence that he knows the secret by selecting pictures representative of the secret from a set of pictures or a sequence of sets of pictures, either of which are presented to the child by the user interface 1500.

Figure 19:
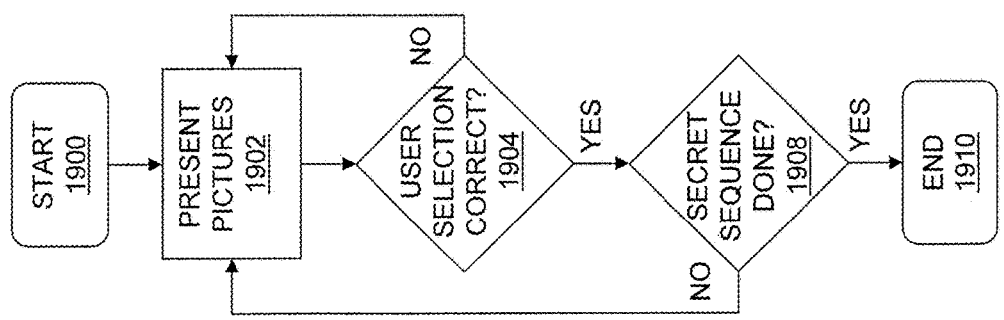
FIG. 19 is a logical flow diagram of a process for verifying that a user knows a secret or solution.

Referring to FIG. 19, a process for determining if the child knows the secret is presented. Processing flow begins at logical block START 1900. From there, processing flow continues to logical block PRESENT PICTURES 1902, where the user interface 1500 presents to the child a set of pictures 1700. These pictures include a picture of one of the secret things. The child utilizes the user interface 1500 to choose one of the pictures. Then processing flow continues to logical block 1904, where a test determines if the child has selected the secret thing that was included in the pictures. If the result of the test is negative, processing flow returns to logical block 1902. Otherwise, processing flow continues to logical block 1908, where a test is conducted to determine if the child has identified all of the secret things. If the result is negative, processing flow returns to logical block 1902, where the user interface 1500 presents to the child another set of pictures 1500, which includes a picture of one of the secret things that the child has not yet identified. Otherwise, processing flow continues to logical block end 1910, where the process terminates. It should be appreciated that the secret may be an ordered or unordered set of things, and that the process described here with reference to FIG. 19 may test the child's knowledge of these things in a particular order, when appropriate.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

It will be appreciated that the above processes, and steps thereof, may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a camera system and/or a computer in a number of ways, or all of the functionality may be integrated into a dedicated, standalone image capture device or other hardware. All such permutations and combinations are intended to fall within the scope of the present disclosure.

It will also be appreciated that means for performing the steps associated with the processes described above may include any of the hardware and/or software described above. In another aspect, each process, including individual process steps described above and combinations thereof, may be embodied in computer executable code that, when executing on one or more computing devices, performs the steps thereof.

Figure 20:
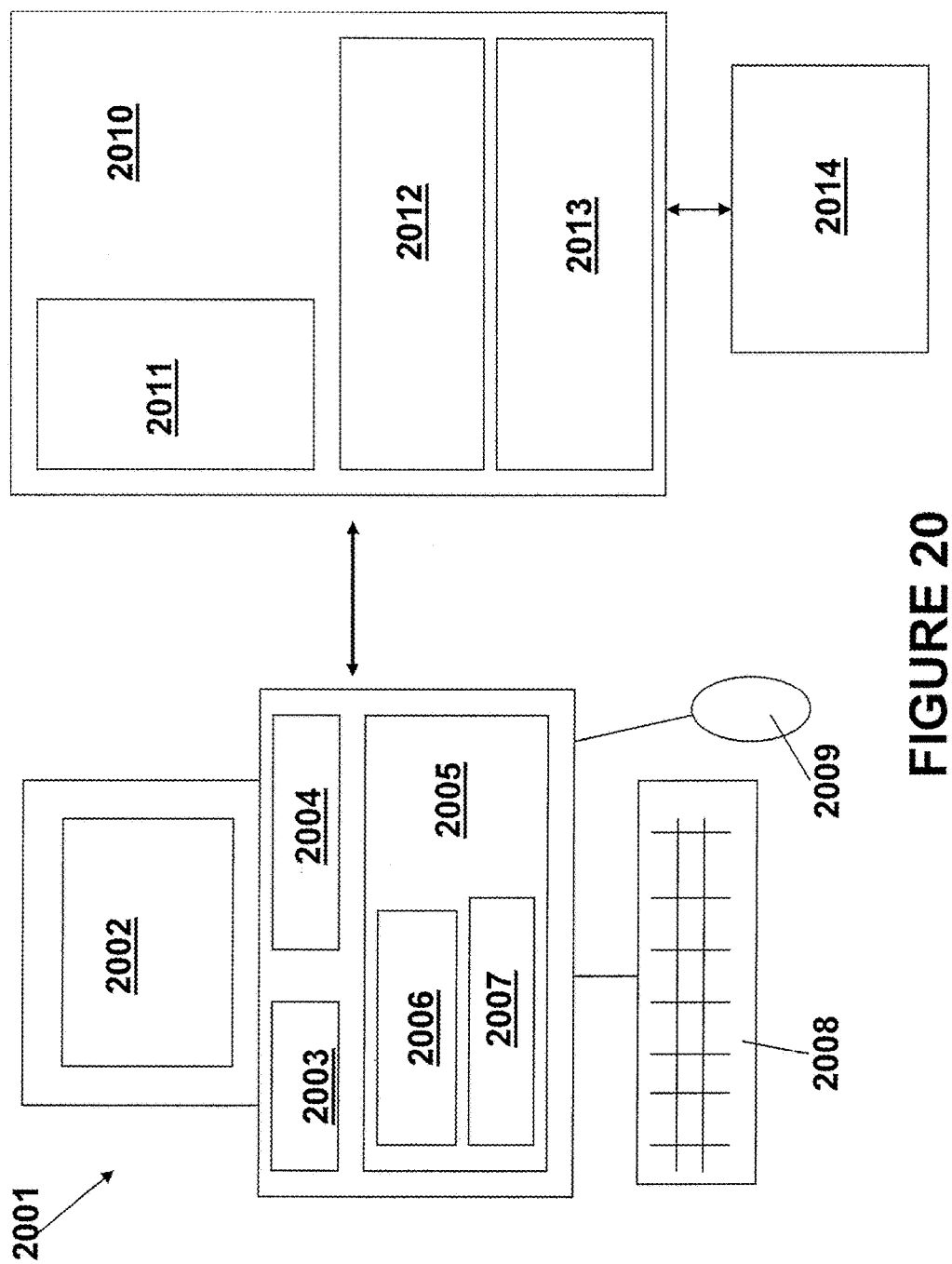
FIG. 20 illustrates an example implementation of a downloadable software embodiment of the child-oriented computing system.

FIG. 20 illustrates an example implementation of a downloadable software embodiment of the child-oriented computing system. In this embodiment, the child-oriented computing system is provided by a piece of software downloaded from a management unit to a computing device wherein one or more children use the downloaded software when installed to browse content. In particular, the system may include a computing device 2001 that may be owned by a parent or parents of the one or more children wherein the computing device further comprises a display unit 2002 that, among other functions displays a user interface of a child-oriented browser provided by the downloaded software, a processing unit 2003 that, among other functions executes an operating system 2006 and executes the plurality of lines of computer code that implement a child-oriented browser application 2007, a persistent storage device that stores various data associated with the computing device and a memory 2005 that stores the code and software being executed by the processing unit such as the operating system 2006 and the client-oriented browser application 2007. The computing device may also include one or more input/output devices, such as a keyboard 2008 and a mouse 2009, that permit a user of the computing device, such as a child, to interact with the browser application displayed on the display unit. If the computing device does not already contain the browser application, a parent of a child, once a member of the child-oriented system, may access a website and download the child-oriented browser application and install it on the computing device. Once installed on the computing device, the browser application controls the browsing and web surfing activities of each child that uses the computing device and logs the activities of each child so that the activities can be reviewed by a parent as described in more detail below. In one embodiment, content, searches, and navigation paths can be tagged by the child user and shared with friends via the custom browser. The custom browser also contemplates the ability to provide chat and email services as well.

The system may further comprise a management unit 2010, such as one or more server computers in an exemplary embodiment, that can be accessed by the computing device over a network, such as the Internet or other network. The computing device may establish a session and then interact with the management unit in order to at least: 1) download the browser application; 2) change the parental settings; 3) review and approve particular web pages and/or categories of content; 4) download web pages containing the browsing activities and selected content for a particular child; 5) download content categories when the child is browsing using the browser application; and/or 6) provide product recommendations to a parent based on a child's browsing activities. The computing device and management unit may also interact to perform other functions and operations as described below in more detail. The system may also provide content suggestions to the child based on the child's history of use, visits, favorites, age, gender, and other factors.

The management unit 2010 may further comprise a web server 2011 that serves web pages to the computing device or download content to the browser application among other functions, a child-oriented content manager application 2012 that manages one or more pieces of content that may be browsed by the browser application, and a database management unit 2013 that manages the data in a data store 2014 such as a database system. The data store 2014 may store the data associated with the system such as the user data (child and parent data), content data, category data, web page content and the like.

Figure 37:
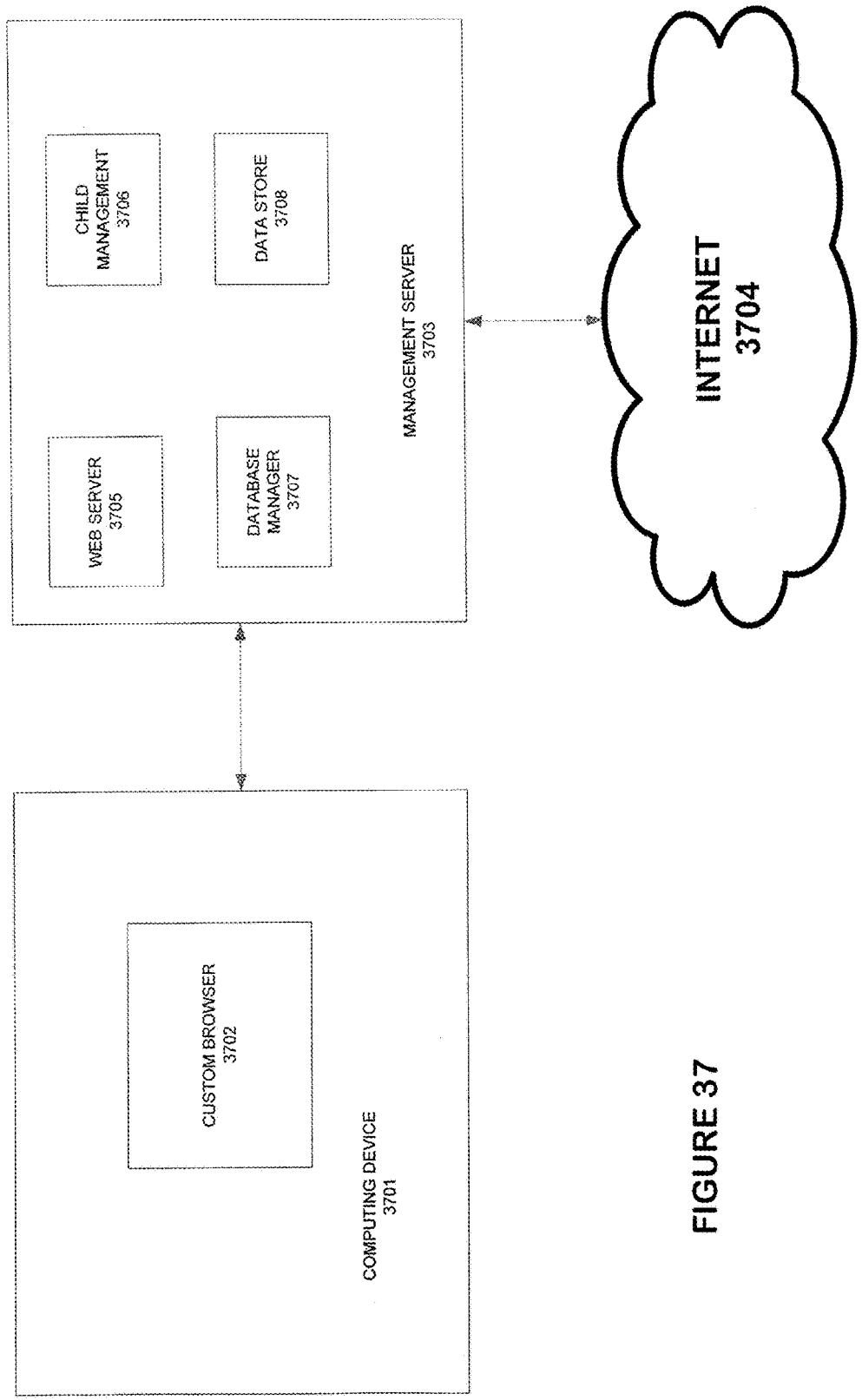
FIG. 37 illustrates an example implementation of a software embodiment of the child-oriented computing system.

FIG. 37 illustrates an alternate embodiment of the system of FIG. 20. In one embodiment the system uses a custom browser to provide the interface between the user and the Internet. The browser controls all requests and replies so that the user has a layer of protection between himself and the Internet. FIG. 37 illustrates an example implementation of a software embodiment of the child-oriented computing system. In this embodiment, the child-oriented computing system is provided by a piece of software downloaded from a management unit to a computing device wherein one or more children use the downloaded software when installed to browse content. In particular, the system may include a computer 3701 that is used by the children to access the Internet. (The computer 3701 may be any suitable computing device that is capable of accessing the Internet and may be the example embodiment described in FIG. 1). A typical browser (e.g. Internet Explorer, Netscape, Mozilla, etc.) is replaced with a custom browser 3702 that includes browser functions such as searching, multi-media presentation, favourite lists, browsing, chatting, emailing, social networking functions, and the like and whose requests and replies are directed to and from the Internet 3704 via a managing server 3703. Once installed on the computing device 3701, the browser application 3702 controls the browsing and web surfing activities of each child that uses the computing device and logs the activities of each child so that the activities can be reviewed by a parent as described in more detail below.

The system may further comprise a management server 3703 such as one or more server computers in an exemplary embodiment, that can be accessed by the computing device over a network, such as the Internet or other network. The computing device 3701 may establish a session using the custom browser 3702 and then interact with the management server 3703 in order to at least: 1) update the browser application; 37) change parental settings; 3) review and approve particular web pages and/or categories of content; 4) download web pages containing the browsing activities and selected content for a particular child; 5) download content categories when the child is browsing using the browser application; and/or 6) provide product recommendations to a parent based on a child's browsing activities. The computing device 3701 and management server 3703 may also interact to perform other functions and operations as described below in more detail.

The management server 3703 may further comprise its own web server 3705 that serves web pages to the computing device 3701 or downloads content to the browser application 3702 among other functions. The management server 3703 may also include a child-oriented content manager application 3706 that manages one or more pieces of content that may be browsed by the browser application, and a database management unit 3707 that manages the data in a data store 3708 such as a database system. The data store 3708 may store the data associated with the system such as the user data (child and parent data), content data, category data, web page content and the like. Data store 3708 may also store a list of approved URL's, web pages, web sites, or other content that may be accessed by a user via the network.

In one embodiment, The custom browser software consists of the custom browser operating system layer, the custom browser system layer, the custom browser parental control layer and the custom browser user layer. The custom browser software works in concert with a management server system.

The management server system provides automated updates of software and content, as well as parental controls and server components for all other features.

The parental control features are available from the custom browser locally and remotely via a web browser or via any other means, such as via email, cell phone, instant messaging, text messaging, PDA's, etc.

The management server system maintains a persistent network connection to the custom browser, so it can almost immediately effect changes that are set from the custom browser parental control interface. The custom browser operating system layer provides a normalized interface to the underlying operating system. This provides smooth portability of other software components between operating systems.

The custom browser system layer provides interaction between the management server system and the custom browser. The custom browser system layer also provides common custom browser software features to all custom browser software.

The custom browser parental control layer verifies whether access to local and remote resources is permissible. If the access is not permissible, the parental control layer prevents access to the resource in question. The custom browser user layer provides user control functions and information presentation to the user. The behavior of the user control functions and the way information is presented depends on the current desktop environment settings.

The custom browser provides a safe environment for children on the internet. Children can only access web sites that are safe and they can only communicate with those deemed safe by the children's parents.

Safe Web Surfing

The custom browser brings children into the internet age, by enabling them to surf the web safely without the direct supervision of a parent. The custom browser lets children visit web sites that have already been approved, whether by the system or by their parents. In one embodiment, the system approves content initially and the parents can modify those choices later. The system helps parents by editorially selecting a list of sites appropriate for children. Parents have the ability to add or remove sites in the list of sites that are approved. The custom browser web site provides a simple categorization of the approved sites to simplify browsing.

Parents can elect to have web sites filtered via whitelist (i.e. a list of sites that are approved) or a blacklist (i.e. a list of sites that are not approved). In order to reduce the setup/configuration burden on parents, they can also elect to use internet settings that have been created by an organization that they trust (i.e. a school, a church, etc.) or a friend or other trusted individual who is willing to share settings with them or based on community ratings of web sites by other parents belonging to the custom browser network.

The list of sites that is approved or denied is maintained by the management server system. The site list is communicated to custom browser any time a modification is made to the list or a user signs on to a custom browser, without having an up to date list present.

Safe Communication

The custom browser network introduces children to the internet communication, by providing children with an email address and instant messaging address and voice over IP address. Parents must enter the email addresses, instant messaging addresses and voice over IP address that they approve their children communicate with.

If an email is sent to a custom browser email account, belonging to a child and the source address is not in the list of approved email addresses, the parents are notified and they can elect to approve the new email address or reject it. The same procedure is followed with an instant message address and a voice over IP address that is not already approved.

Email messages and instant message invitations are intercepted by the management server system and the custom browser software to ensure custom browser users communicate only with those who are approved for communication.

Education

The custom browser provides powerful aids for children's education, ranging from educational games, access to web sites with educational content, to online references that are helpful with homework. The custom browser also provides the necessary software tools to write reports and create presentations, perform calculations, etc. that can aid in learning.

The custom browser aims to teach children how to use a computer effectively as well as to provide children with the tools to do their homework. The custom browser also provides parents with reporting on how advanced their children are in different subjects and offers parents software and curriculum to address those areas.

The custom browser can accept the input of grades through the parental control interface. If grades are available, the custom browser attempts to bring educational materials and educational games corresponding to the area that the child needs to improve to the forefront.

Home Work Tools

The custom browser provides an integrated environment that includes word processing, graphics software, presentation software, spreadsheet, calculator and access to an encyclopedia, dictionary, curriculum and safe web searching to aid with homework. Within this integrated environment children also have access to all of the digital assets that is present on their computer, such as their pictures and their emails The custom browser environment enables users to view online references, browse the web and search, while they do word processing, create presentation or edit spreadsheets.

The custom browser network may provide facilities for teachers to post homework assignments for students and for teachers to review homework performed by students.

Learning Through Games

In one optional embodiment, the custom browser may determine how advanced in different subjects children are via educational games. The games both aim to help children master subjects as well as measure how strong children are in a given subject. Parents can view their child's progress via their account on the custom browser network.

The custom browser provides games to determine whether children recognize the letters and symbols on the keyword. For example, in one embodiment, the custom browser speaks a letter and if the child presses the correct letter, they receive feedback that the correct letter has been chosen. Once children have mastered a game of this nature they are advanced to games that make the reading sounds for letters, until the graduate to spelling games.

The custom browser provides games that determine whether children have mastered the mouse, by having the children find object in a picture where the size of the clickable areas diminishes with each level the child reaches.

The custom browser attempts to teach dragging and dropping with the mouse, through a paint program, where children dip paint brushes into paint cans of a various colors to color regions as you do in physical coloring books. Dragging and dropping is also done through games that require picking up and moving of objects.

Study Aids

The custom browser in one embodiment may include the complete curriculum from K-12 as well as a dictionary and encyclopedia, either locally or via the web. The curriculum may be modified geographically (e.g. by state, by county, etc.). The dictionary and encyclopedia will have standard features of dictionaries and encyclopedias as well as the following additional capabilities: [0204] The custom browser also provides text to speech capabilities, where words can be pronounced so users can learn the proper pronunciation and hear the phonetic structures of words. [0205] The custom browser also provides a variety of daily content to help expand a child's horizon, such as word of the day, quotation of the day, fact of the day that are relevant to their grade.

Media

The custom browser has all the media functions a child desires. Currently children have very little control over their media and a limited ability to access it without adults having to set it up for them. This is frequently the result of scratching physical media, such as DVDs and CDs and not having the ability to playback home videos or look at digital pictures.

The custom browser can store games, DVDs and music CDs on the local hard drive when they are inserted in the DVD/CD drive. This empowers children to access their media, as scratched physical media is a major problem for children.

The custom browser provides networked access to games, DVDs, music and other media, such as home video and television.

Television capabilities on the custom browser are provided via one of the following mechanisms:

Internet Protocol Television (IPTV) where television programming is provided over an internet broadband connection to the custom browser. The custom browser will offer both live television and video on demand via the IPTV mechanism.

TV Tuner which is a hardware component that can transform a television signal into a format that can be played back on a computer and can tune to different television frequencies.

In addition to delivery of television programming, the custom browser periodically downloads a program guide that matches the channels and programming available to the custom browser user. For users that have a TV Tuner, the custom browser requires configuration information to download the proper program guide.

Media Viewing

The custom browser provides a mouse, keyboard and remote control interface for viewing television, movies, DVDs and home videos. Users can use any of these devices to perform the following functions:

change the current channel
rewind within the current program
pause the current program
Navigate and view information on the current program, characters within the program and actors performing in the current program
Search for information and have the results displayed on the screen, while the television program diminishes in size, but continues to play
Initiate and receive instant messaging conversations, while viewing a television program.

Personal Video Recorder

The custom browser media center provides the following personal video recorder capabilities: [0224] All the capabilities of a personal video recorder, including the ability to record shows according to a schedule and pausing/resuming live television [0225] Users can search and sort the television listings by rating, user rating, genre, title and description. The search terms can be used by parents as a mechanism for setting the rule on what television programs are allowed. (i.e. only permit viewing of programs rated Y)

Movies

The custom browser media center provides the following movie capabilities:

The ability to play DVDs
The ability to record DVDs and store them on the custom browser for later playback.
The custom browser can automatically download movie posters and it provides movie library management capabilities
The ability to download movies from the custom browser network for playback
The ability to rate movies and view how other children have rated movies. Parents can set limits on which DVDs can be played based on the movie rating (i.e. only permit movies rated G) or by how other parents or organizations have rated the movie via the custom browser network.

Music

The ability to play music CDs
The ability to record and store music CDs on the local hard drive
The ability to listen to internet children radio. We could provide pvr type radio capabilities, but I am not sure it is worth it.
The ability to download music to the custom browser via the custom browser Network
Music management capabilities such as play lists
The ability to rate songs and view how other children have rated songs Parents can prevent music to be played based on rating. (i.e. CDs that have a rating of sexually explicit lyrics, can be prevented from playing)

Video

The ability to import home videos, directly from a video camera, from physical media (CD, DVD) or from the shared video space on the custom browser Network.
The ability to play back and manage home videos Pictures The ability to import digital pictures, directly from a digital camera, from physical media (CD, DVD) or from the shared pictures space of the custom browser Network.
Powerful ability to manipulate images, such as crop, reduces red eye, rotate, scale etc.

The system utilizes the same approval system for media content and clips as it does for other content. Only approved media can be accessed by the child. The permissions can be the default setting or may be modified by parents using parental controls.

Figure 21:
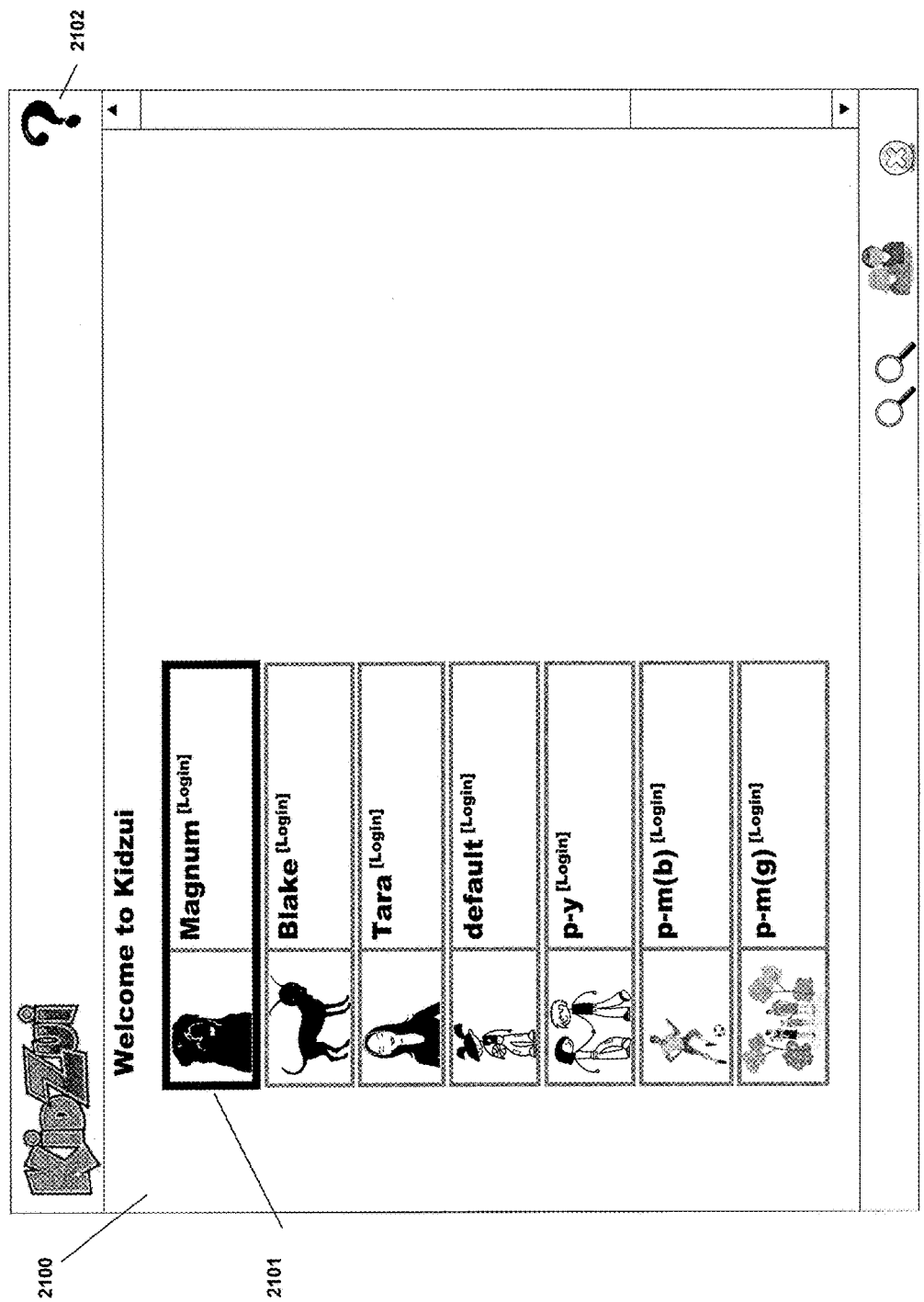
FIG. 21 illustrates an example of a login screen of the browsing user interface.

FIG. 21 illustrates an example of a login screen 2100 of the browsing user interface of the custom browser application when executed by the computing device. The browser application controls the desktop of the computing device so that the child using the computing device must use the browser application to browse content and therefore limits the browsing abilities of the child. The login screen has one or more child login portions 2101 that permits each child that uses the computing device to log into the browser application so that the browser application permits multiple children to use the browser application wherein each user has his/her own settings of the browser application. Each user interface screen of the browser application may include a help icon 2102 that permits the user of the browser application to access a help area of the browser application. When a child, such as Magnum, logs into the custom browser application, a home page 2200 of the browser application (shown in FIG. 22) is displayed to the child.

Figure 22:
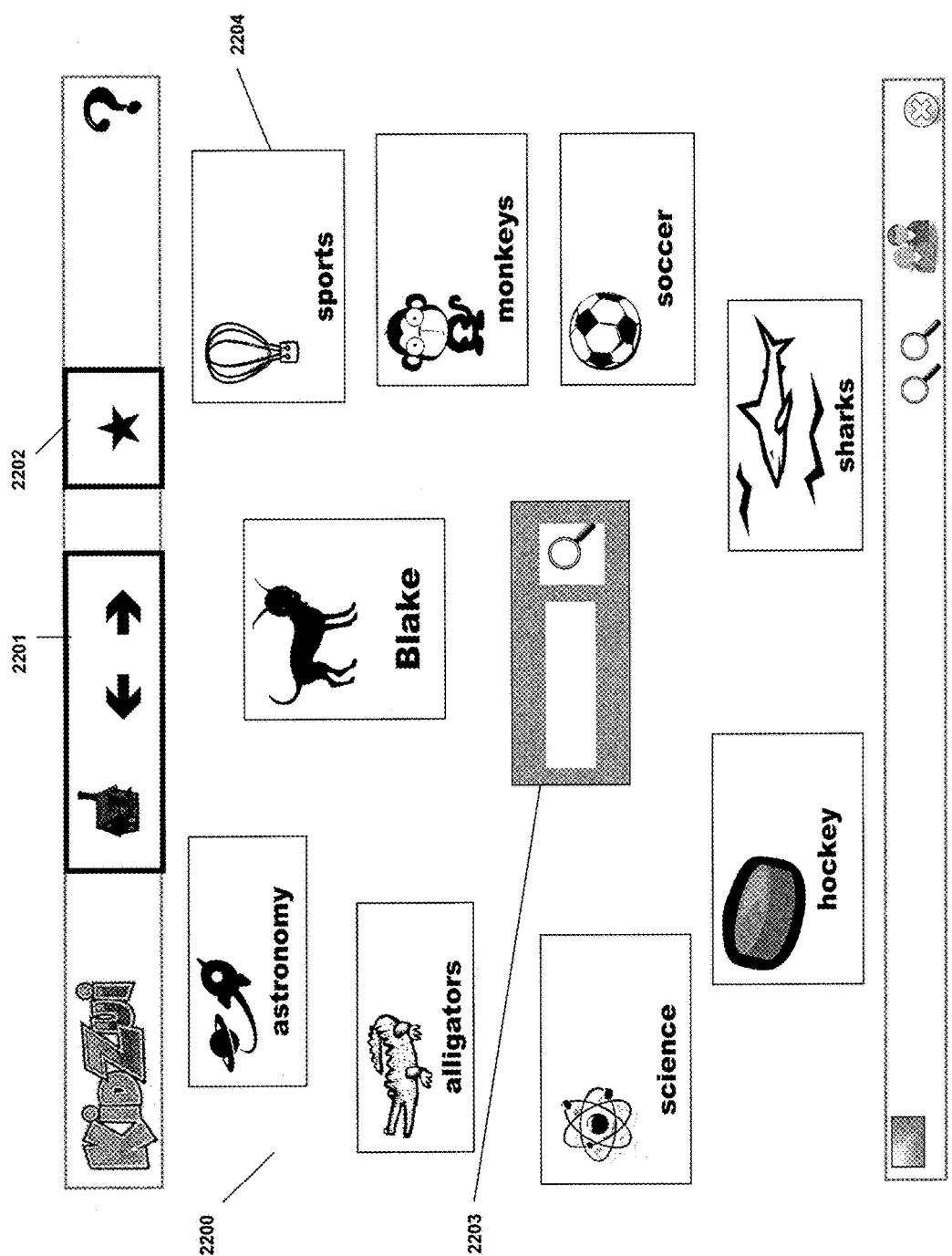
FIG. 22 illustrates an example of a home interface of the browsing user interface for a particular child.

FIG. 22 illustrates an example of a home user interface 2200 of the browsing user interface for a particular child. The home page 220 is customized for each child user of the custom browser and includes a number of graphical elements that can be chosen, positioned, and manipulated by the child themselves to optimize the home page for their particular use. The home interface may include a navigation portion 2201, such as a home icon, a forward icon and a backward icon, that permits the child to navigate in the browser application and a favorite icon 2202 that permits the child to add a particular piece of content or category of content as a favorite that may be displayed initially on the home user interface of the child. The home user interface may also include a search portion 2203 (located in the center of the home user interface) that permits the child to perform a search of the content associated with the browser application. The home user interface may also include one or more content category icons 2204 that identify the different categories of content that are accessible by the browser application wherein the different displayed categories may be customized for each child of the system. In the example shown in FIG. 22, the content categories may be "Sports", "Monkeys", "Soccer", "Sharks", "Hockey", "Science", "Alligators" and "Astronomy". From this home user interface, the child may select a particular category such as the "Sports" category.

Figure 23:
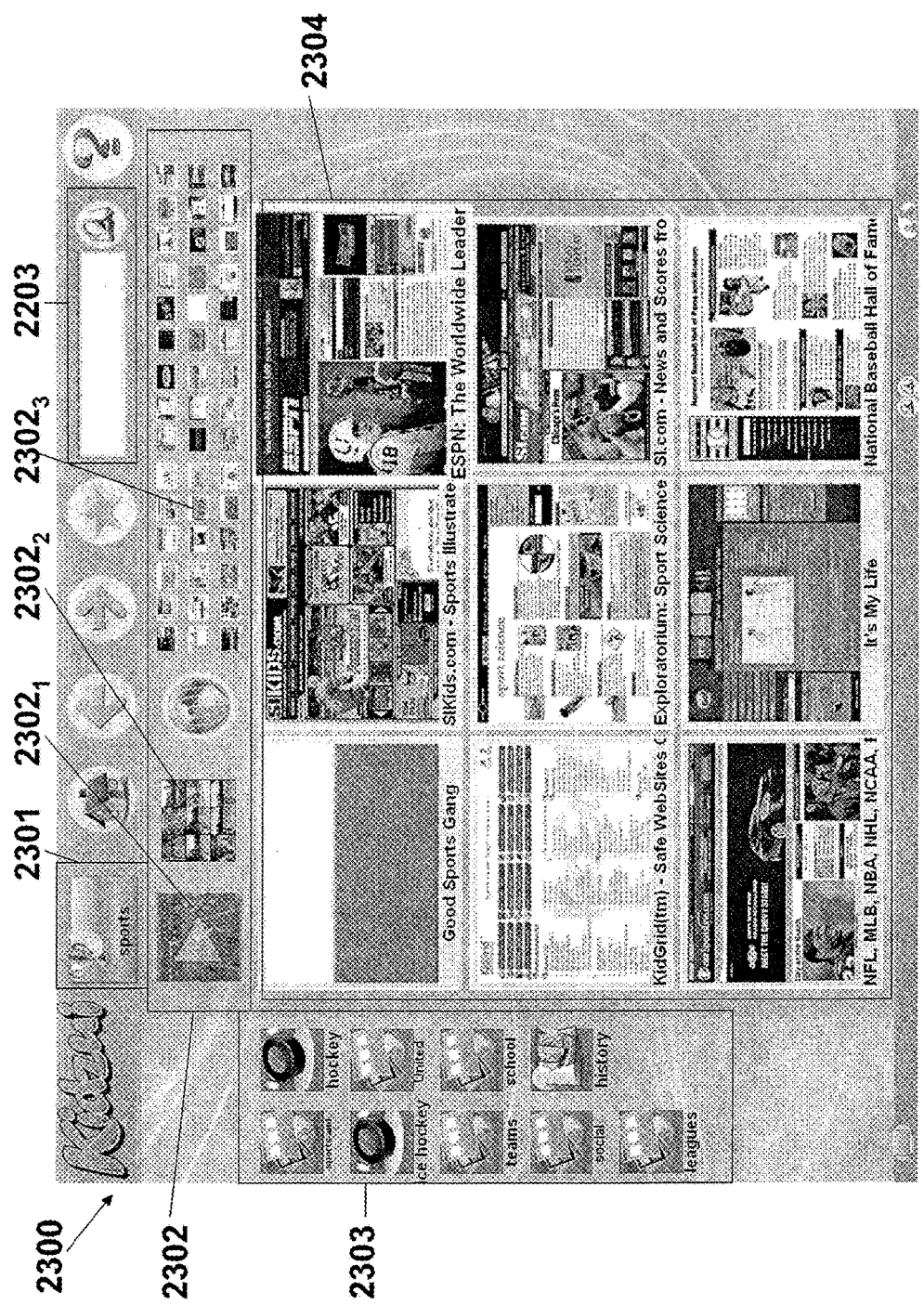
FIG. 23 illustrates an example of a user interface for a particular chosen category of content in the browsing user interface.

FIG. 23 illustrates an example of a user interface 2300 for a particular chosen category of content in the browsing user interface. When a particular category is selected, a selected category icon 2301 is shown along the top of the user interface (the periphery of the user interface) along with the search portion 2203 since those items are not selected/active in the user interface shown. In the user interfaces of the browser application, active/selected items (content, categories, functions) are zoomed into the foreground of a center of the user interface while inactive/unselected items (content, categories, functions) are zoomed out (shrunk in size) into the background of a periphery/sidebar of the user interface that provides a zoomable user interface. For example, in the user interface shown in FIG. 23, a set of unselected/inactive types of content 2302 are shown as small icons in an upper part of the user interface and a set of unselected/inactive content categories 2303 are displayed as small icons along a left side of the user interface. The types of content browsable using the browser application may include one or more video pieces of content $2302.\text{sub}.1$, one or more pieces of image content $2302.\text{sub}.2$ and one or more web pages $2302.\text{sub}.3$. In the exemplary user interface shown in FIG. 23, the active/selected item is a set of sports related web pages 2304 that are shown as larger icons in the center of the user interface. In the browser application, the different pieces of content, such as the set of sports related web pages, displayed to the child are controlled by the management unit (described below in more detail) wherein the content is approved by one or more experts/users/parents as described below in more detail.

An advantageous feature of the system is the ability to reconfigure a single page in the browser using the centering and zooming feature so that the child user does not need to wait for page loads to occur while clicking on different items in certain regions of the page. Only when a child user has selected a link to another page does a page loading operation take place. Otherwise the child has more freedom to explore the options on a presented page without the frustration of slow reloading.

In one embodiment, the choices presented to the user, particularly in region 2302, are based on a number of factors related to the user. For example, the items offered in section 2302 may be based on the user history of the child that is logged in. The video, image, and web page selections may be recently viewed items. In other instances, the presented content in section 2302 may be based on the age and or gender of the user. In still other instances, the presented content may be based on a search or other path (e.g. frequency of visits) followed by the user to arrive at this page. In another embodiment, the presented content may be based on the history of other children who have looked at the same content (and perhaps further filtered by age, gender, and/or geography). In another embodiment, the tagging and sharing history of a child mentioned above may also be used as a basis for presenting content.

Figure 24:
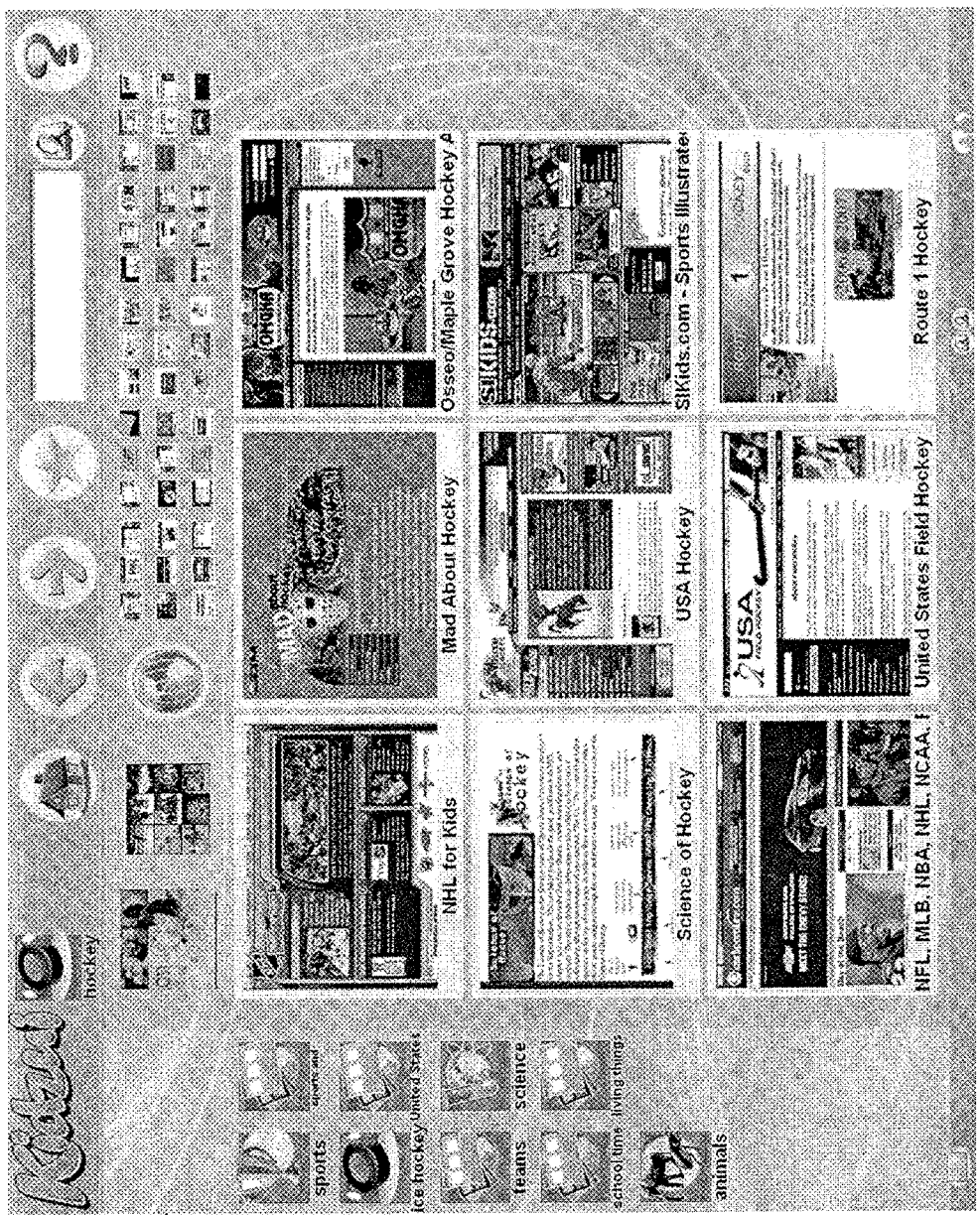
FIG. 24 illustrates an example of a user interface for another particular chosen category of content in the browsing user interface.
Figure 25:
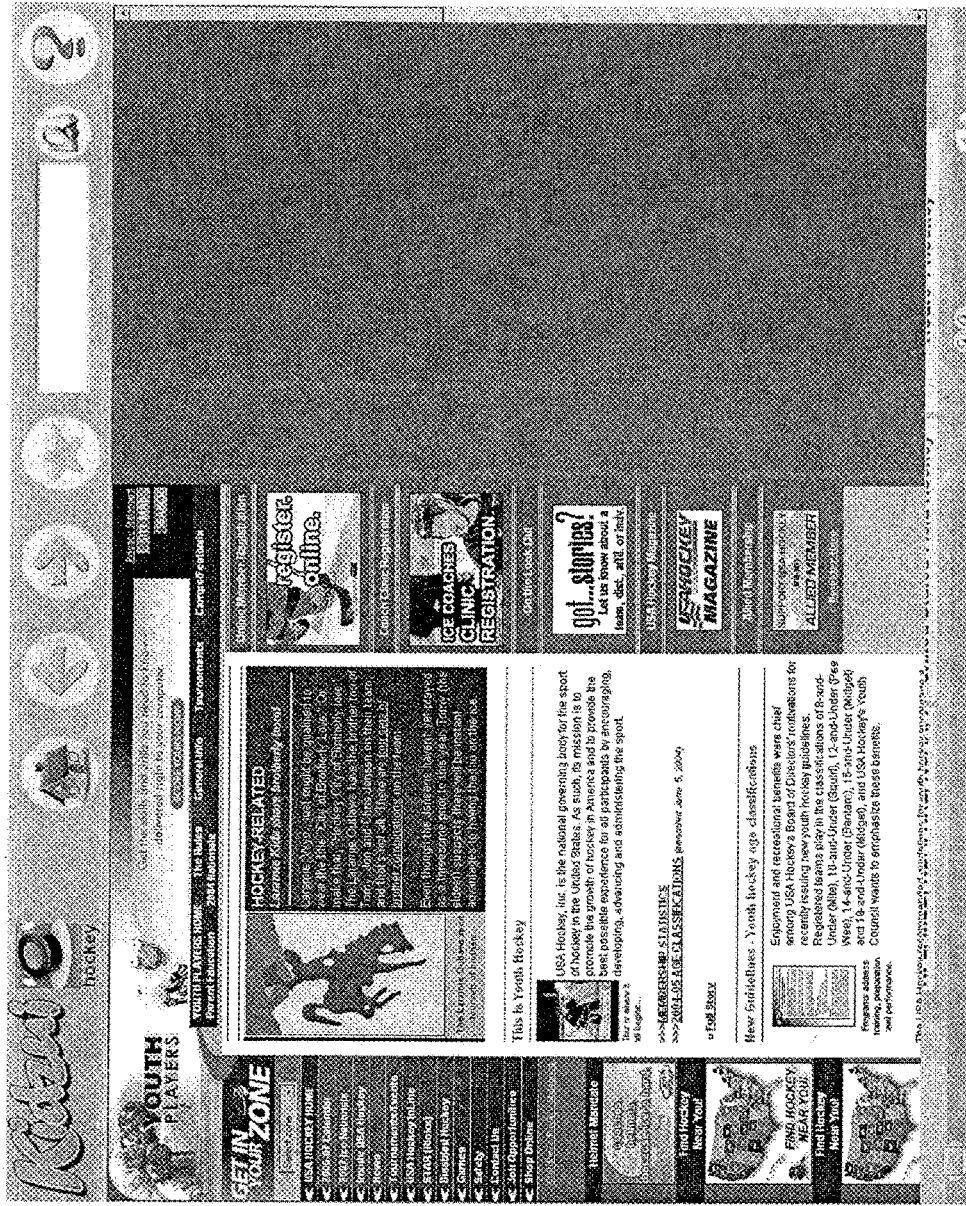
FIG. 25 illustrates an example of a webpage displayed in the browsing user interface.

FIG. 24 illustrates an example of a user interface 2400 for another particular chosen category of content in the browsing user interface. In this example, the content category "hockey" has been selected by the child along with the web pages content. As before, the unselected/inactive items are shrunk and displayed around the periphery of the user interface while the active item (the hockey web pages) and enlarged and shown in the center of the user interface. FIG. 25 illustrates an example of a webpage displayed in the browsing user interface which is shown when the child selects a particular piece of active content (a USA Hockey approved web page in this example). The browsing of the child is limited to the approved pieces of content (described in more detail below) and is also limited in that the browser application generates a sound and/or animation when the child clicks on a link (in a webpage) to content that the child is not permitted to view. In other words, the child is made aware if an attempt is made to link to content that is not on the whitelist of approved content.

Figure 26:
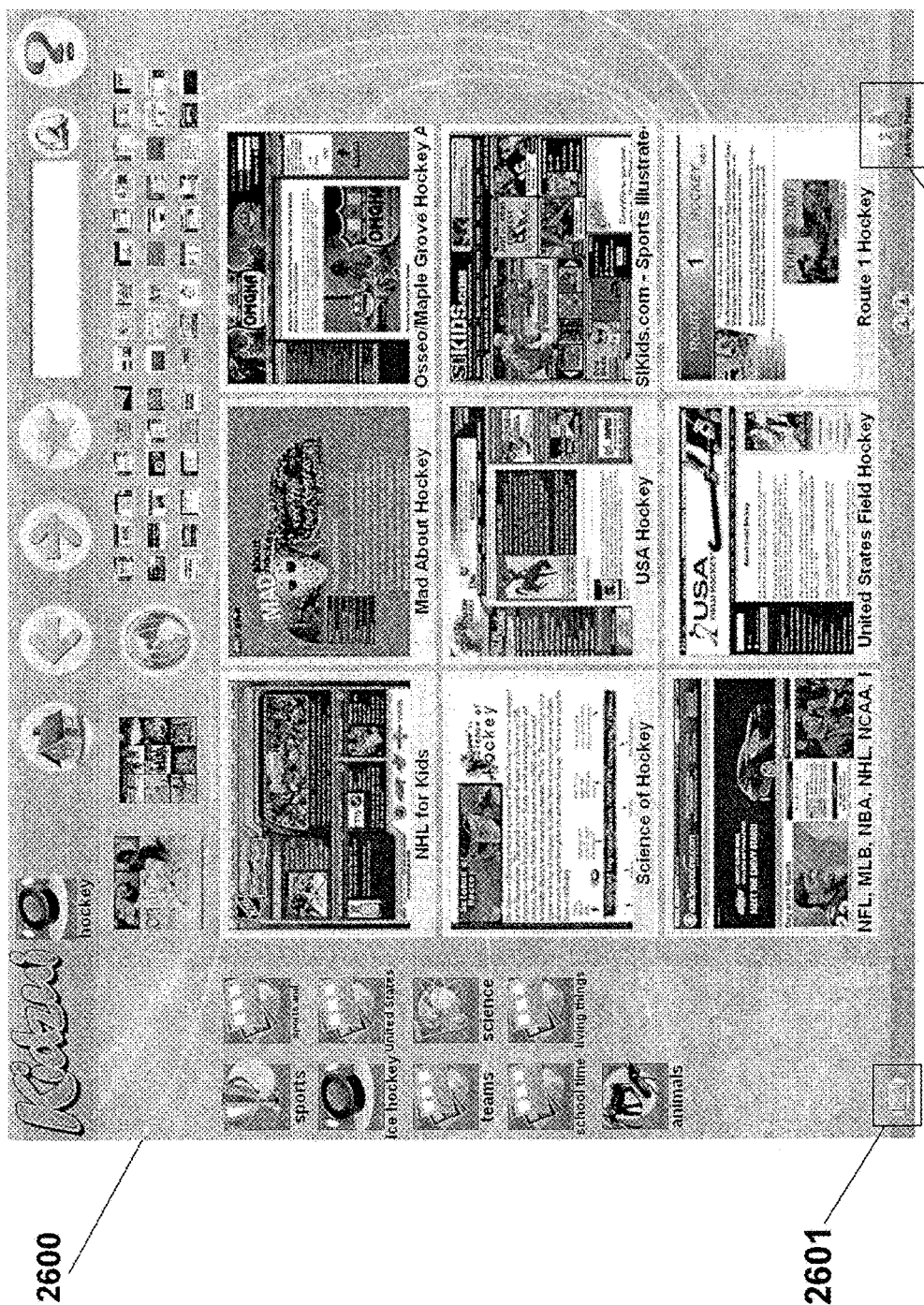
FIG. 26 illustrates an example of a parent override button on the browsing user interface.
Figure 27:
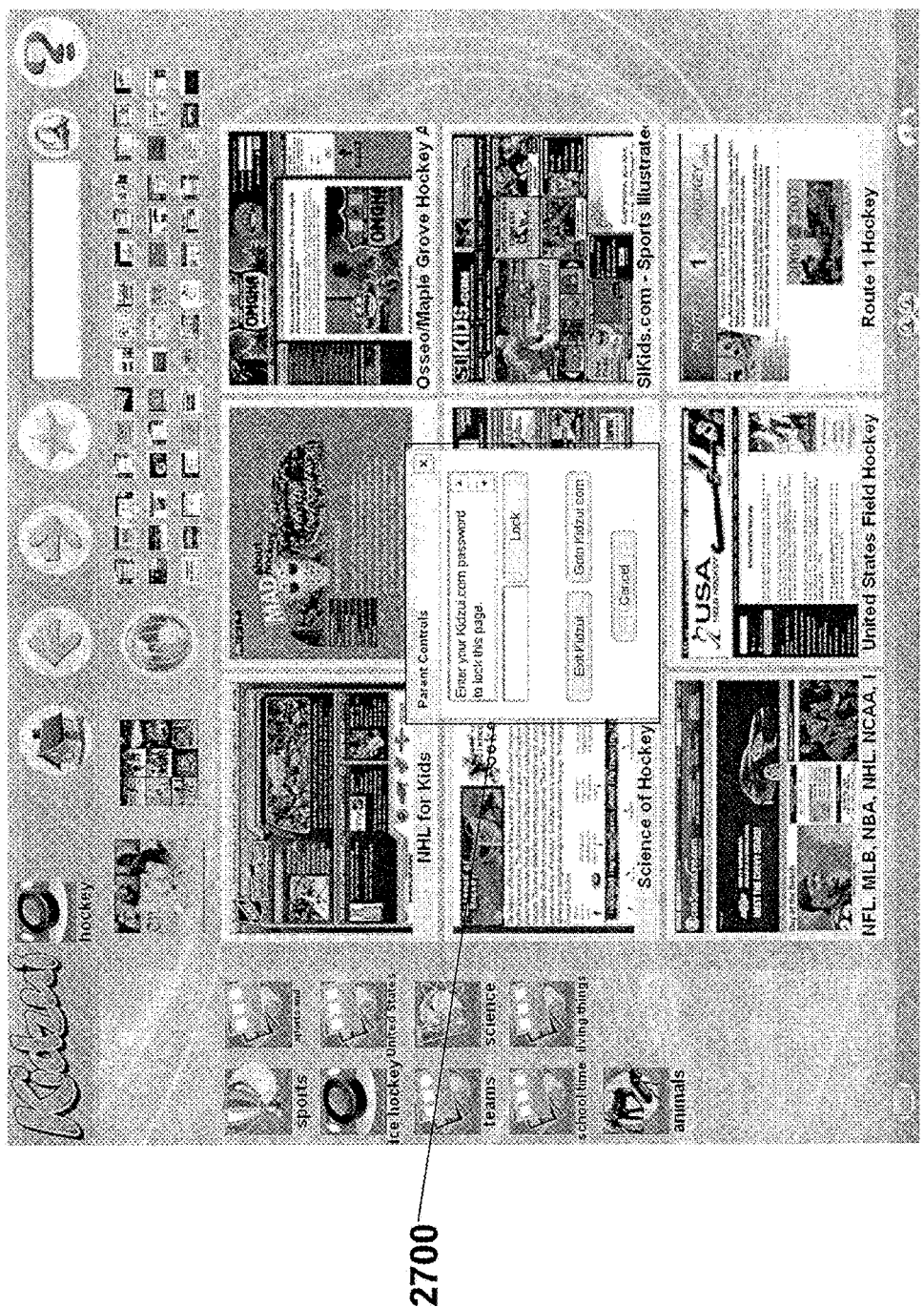
FIG. 27 illustrates an example of a parent override user interface.

FIG. 26 illustrates an example of a parent override button on the browsing user interface 2600. The exemplary user interface also illustrates a skins icon 2601 that permits the child to change the "skin" on the browser application much like a user can change the "skin" on a typical browser application such as Microsoft Internet Explorer. The user interface 2600 (and every other user interface for the browser application) may include a parent icon 2602 that permits a parent to override the controls of the browsing application. FIG. 27 illustrates an example of a parent override user interface 2700 that permits a parent to lock a page/unlock a page when the appropriate parent password is entered, exit the browser application once the appropriate parent password is entered or go to the website associated with the management unit when the appropriate parent password is entered. Thus, the parent is able to override the browser application (exit the browser application and use a typical browser application or use other functions of the computing device), override the content settings of the browser application or change the settings for the particular child stored in the management unit that affect the content downloaded to the browser application as the child is browsing.

Figure 28:
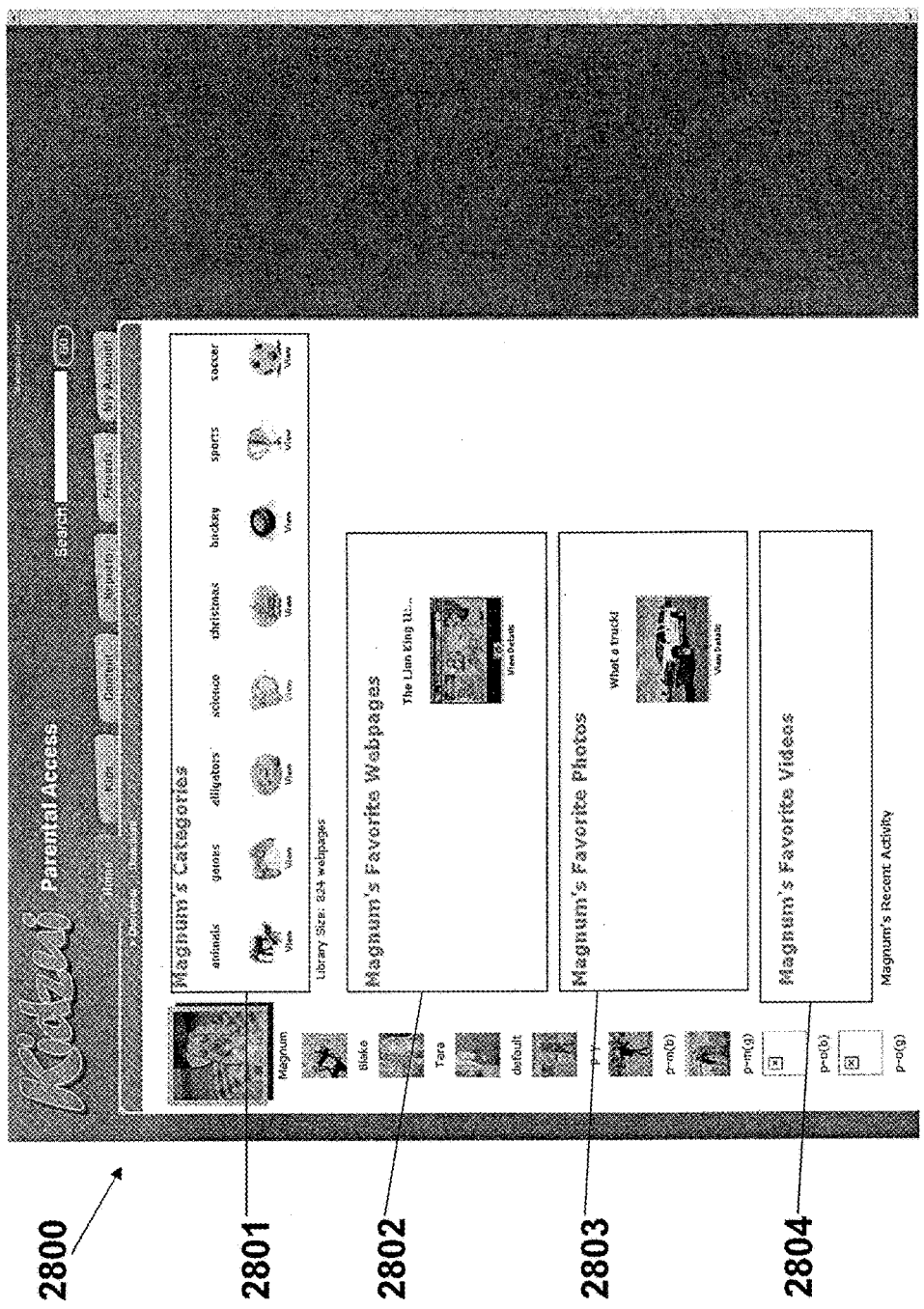
FIG. 28 illustrates an example of a home page for a particular parent that uses the child-oriented browsing system.
Figure 29:
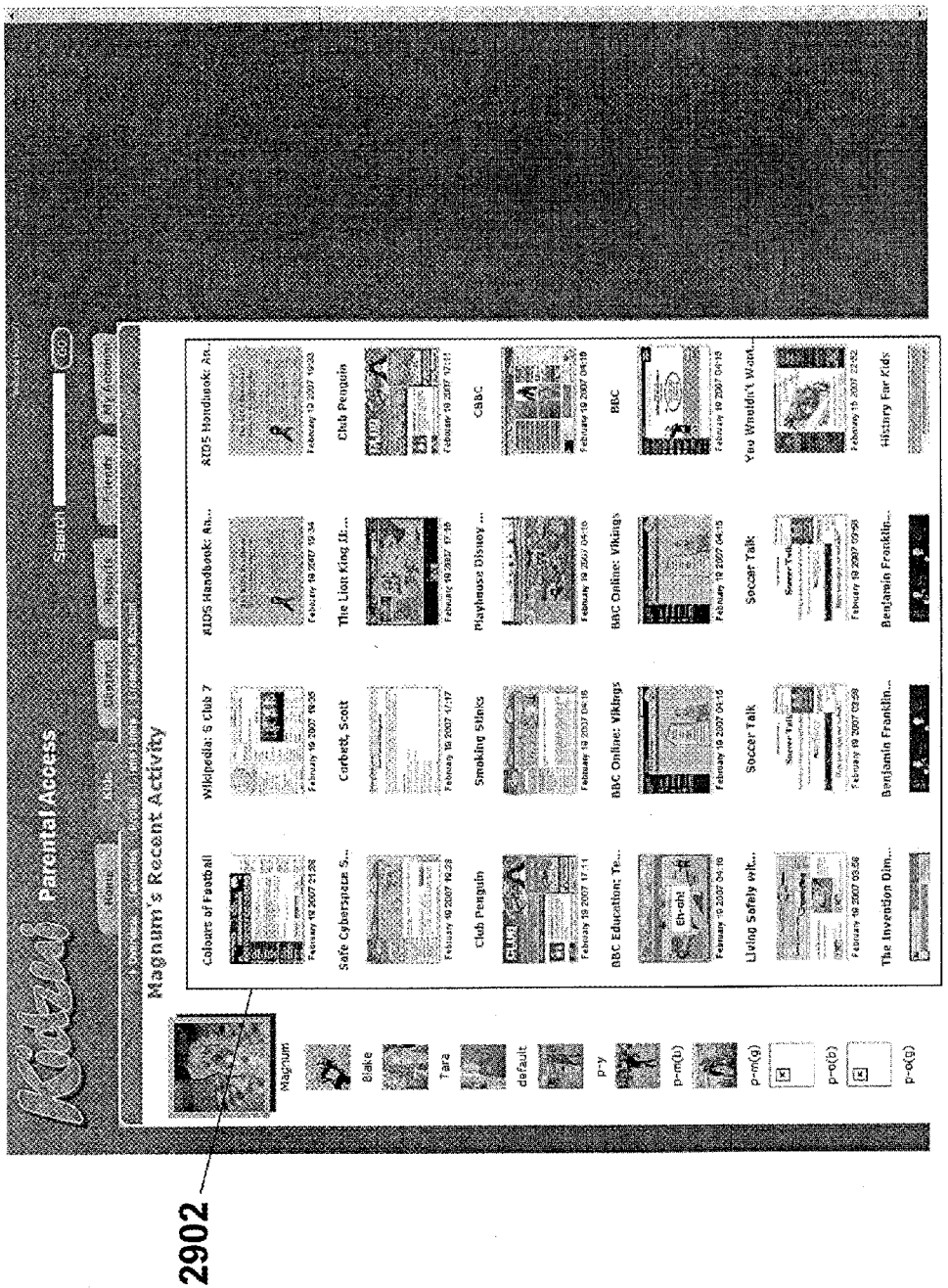
FIG. 29 illustrates an example of the home page for a particular parent showing the recent activities for a particular child.

FIG. 28 illustrates an example of a home page 2800 for a particular parent that uses the child-oriented browsing system. In the exemplary embodiment, the user interfaces of the management unit are displayed as web pages in a browser application, but can be displayed in other manners that are within the scope of the system. Since the browser application described above downloads its content from the management unit as described above, the management unit tracks and records the content downloaded to each browser application and then also the content actually viewed by each child. Thus, as shown in FIG. 28, a child, Magnum, has been selected (denoted by the larger icon) by the parent and the user interface displays information particular to that child. For example, the user interface displays a set of categories 2801 specific to Magnum wherein the parent can view each category, one or more favorite web pages 2802 of the child, one or more favorite photos 2803 of the child and one or more favorite videos 2804 of the child. As shown in FIG. 29, the same home page may also display one or more recent activities 2902. Thus, the parent can view each different type of content and the actual content being viewed by the particular child.

Figure 30:
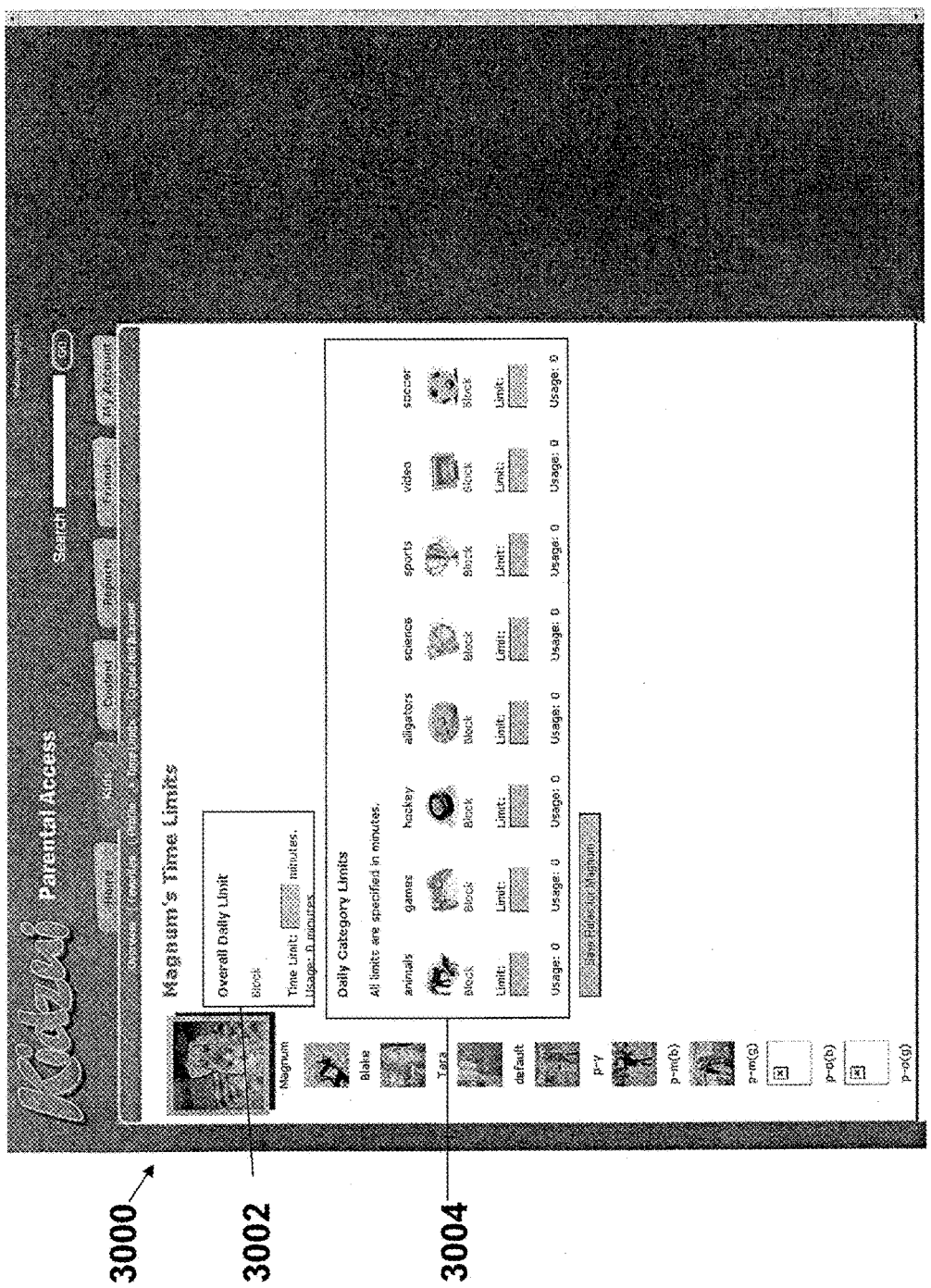
FIG. 30 illustrates an example of the home page for a particular parent that permits the parent to set time limits for a particular child.

FIG. 30 illustrates an example of the home page 3000 for a particular parent that permits the parent to set time limits for a particular child. In particular, the user interface permits the parent, for a particular child such as Magnum, to set a daily time limit 3002 or a time limit for one or more particular categories 3004. The daily time limit portion permits the parent to completely block access or set a daily usage time limit and display the current amount of time used by the particular child. In the category time limits portion 3004, the parent may block or set a time limit (and show the usage) for a particular child for a particular category of content.

Figure 31:
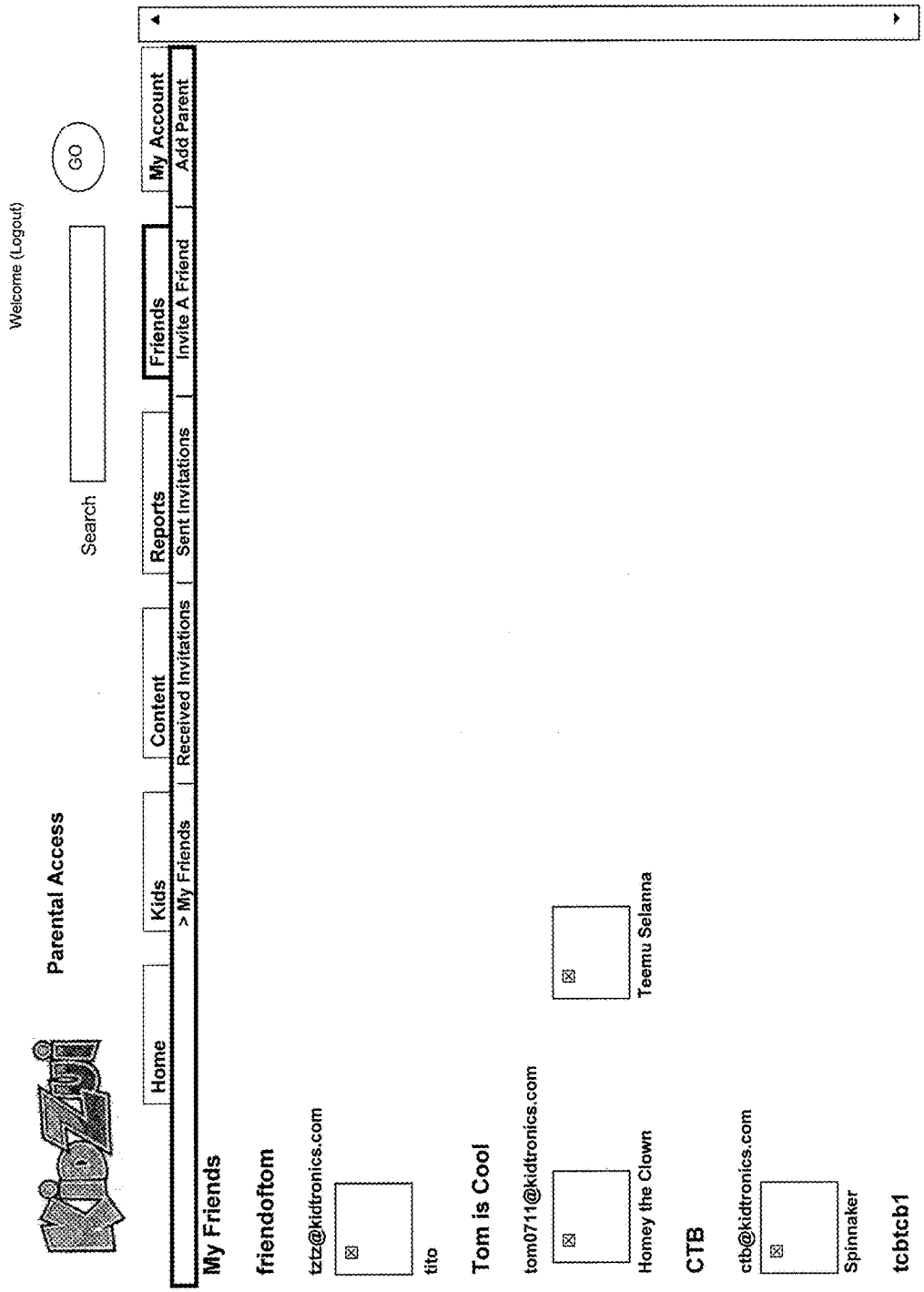
FIG. 31 illustrates an example of a community page for a particular parent.

FIG. 31 illustrates an example of a community page for a particular parent. The community page permits a parent to have friends that use the system and share content between the parents, etc within the system so that a community of parents that use the system is generated. Now, the tools that permits users of the system (parents and administrators) to edit/approve content for display in the browsing application will be described in more detail.

Figure 32:
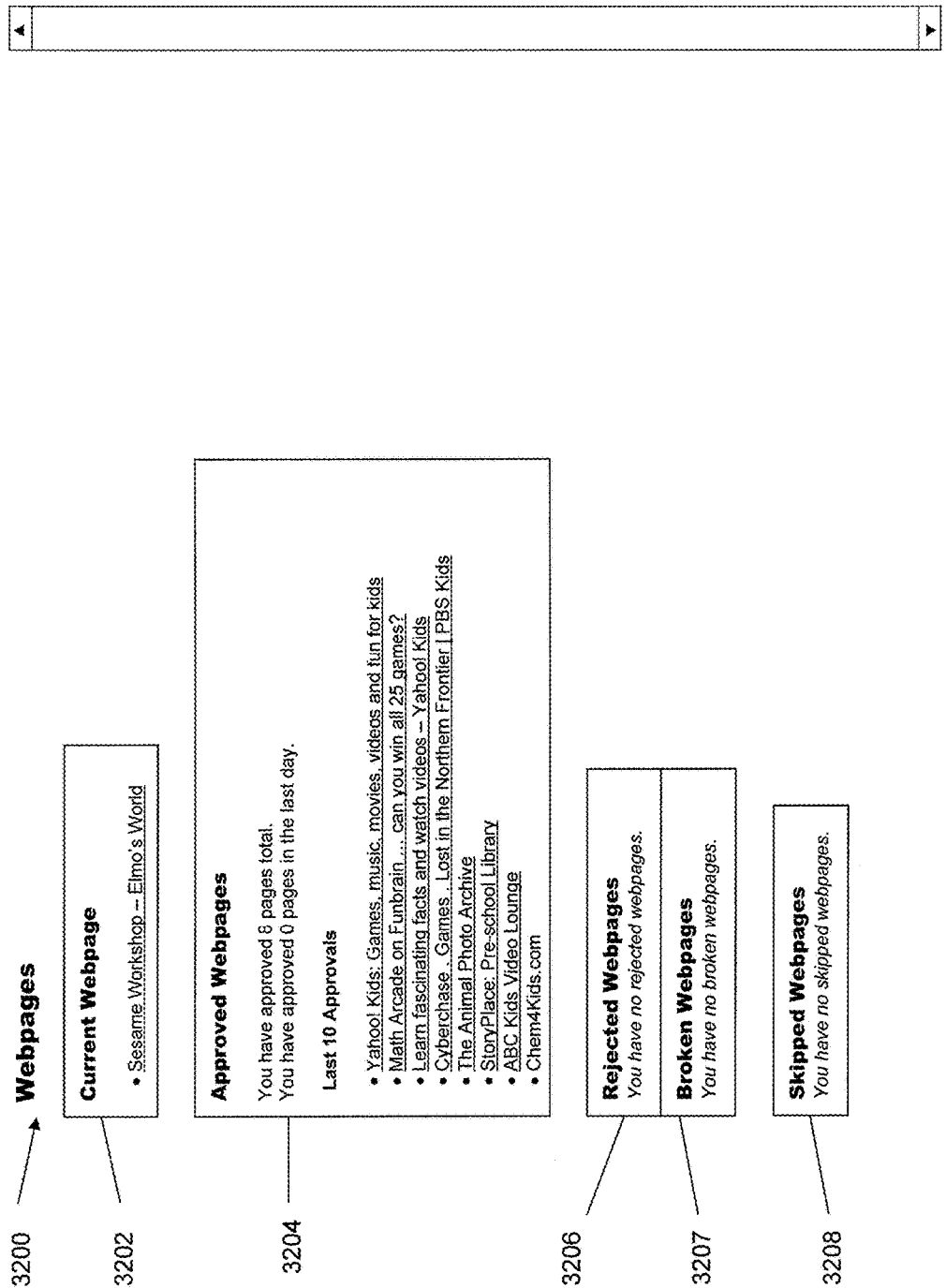
FIG. 32 illustrates an example of a web page approval portion of the child-oriented browsing system.

FIG. 32 illustrates an example of a web page approval portion 3200 of the child-oriented browsing system which is displayed in a web page in the exemplary embodiment. This portion of the management unit permits users, with the proper authorization, to review, categorize, rate and approve particular pieces of content (web pages in this example) that can be displayed to children in the browser application described above. The management unit may have similar pages that permit videos and images to be reviewed, categorized, rated and approved by the approved users. The user interface may include a current content portion 3202 that has the name and a link to the current piece of content being reviewed, an approved content portion 3204, a rejected content portion 3206, a broken content portion 3207 and a skipped content portion 3208 so that the authorized user can track the content and its status.

Figure 33:
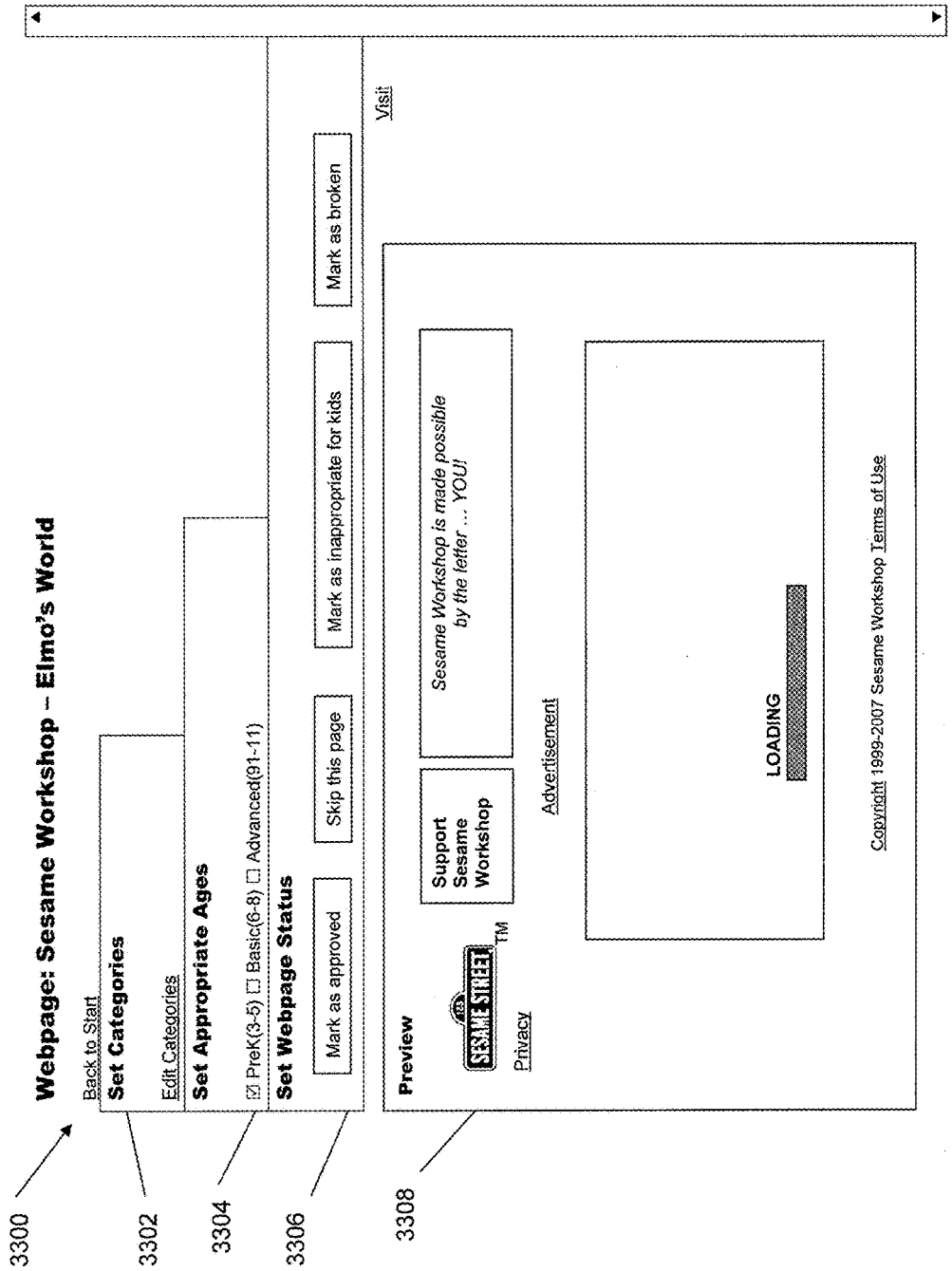
FIG. 33 illustrates an example of an approval page for a particular web page.

FIG. 33 illustrates an example of an approval page 3300 for a particular web page. The page may include a set categories portion 3302 (that permits the authorized user to pick the content categories for which the particular piece of content is appropriate), a set appropriate ages portion 3304 that permits the authorized user to select one or more age ranges for which the particular piece of content is appropriate, a set content status portion 3306 that permits the authorized user to change the approval status for the particular piece of content and a preview portion 3308 that provides the authorized user with a preview of the piece of content.

FIG. 34 illustrates an example of a content category review portion 3400 of the child-oriented browsing system. The category review portion permits a parent to view the various content categories (shown as a list along with the pieces of different types of content associated with each category), and then view of pieces of content associated with each category. For example, the parent may select a category 3402 that permits the user to see the pieces of content associated with that category.

Figure 36:
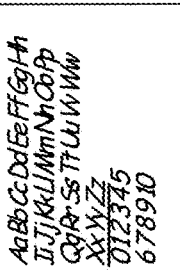

FIGS. 35 and 36 illustrate an example of the listing of the web pages for a particular content category of the child-oriented browsing system. In this example, the web pages associated with the "123" category are shown to the parent. The content within the category are organized by a set of top pieces of content 3500 and other pieces of content 3600 (shown in FIG. 36). The top pieces of content may be selected by an expert while the other pieces of content are approved, but not selected by an expert. The content within the top pieces of content are the pieces of content that will be downloaded to the browser applications when content for the particular category is requested while the other pieces of content 3600 are typically not downloaded to the browser application. However, the other pieces of content 3600 may be moved to the top category along with other ratings for the particular content.

While the invention has been disclosed in connection with certain preferred embodiments, other embodiments will be recognized by those of ordinary skill in the art, and all such variations, modifications, and substitutions are intended to fall within the scope of this disclosure as set forth in the appended claims.

The invention claimed is:

1. A computing device comprising:
a processor; and
a non-transitory computer readable storage media coupled with the processor, the non-transitory computer readable storage media comprising computer executable code to be executed by the processor to:
present to a first user, by the computing device, pictorial challenges in lieu of requiring the first user to enter a password to gain access to a service or the computing device;
receive, by the computing device, a request from the first user to access a service that includes at least one of a media aspect and a non-media aspect;
determine, by the computing device, if the service is associated with a whitelist of approved services and if the service is associated with a blacklist of services that are not approved;
allow, by the computing device, access to the service if the service is associated with the whitelist of approved services and not associated with the blacklist of services that are not approved;
deny, by the computing device, access to the service if the service is associated with the blacklist of services that are not approved;
log, by the computing device, activities of the first user interacting with the computing device including information associated with the request from the first user to access the service to an activity log file; and
provide, by the computing device, access to a second user to the activity log file.

2. The computing device of claim 1, wherein the non-transitory computer readable storage media further comprising computer executable code to be executed by the processor to:
determine if the service is associated with a parental control; and
allow access to the service only after a task specified in the parental control has been completed by the first user.

3. The computing device of claim 1, wherein the non-transitory computer readable storage media further comprising computer executable code to be executed by the processor to:
determine that the first user has mastered a predefined activity; and
change an interface level based on the determination that the first user has mastered the predefined activity.

4. The computing device of claim 1, wherein the non-transitory computer readable storage media further comprising computer executable code to be executed by the processor to:
receive, from the first user, a selection in response to the pictorial challenges; and
determine that the selection received from the first user is correct.

5. The computing device of claim 1, wherein the pictorial challenges comprise a person, a shape, a color, or an item represented as a picture.

6. The computing device of claim 1, wherein the pictorial challenges are a sequence of at least one of a person, a shape, and a color.

7. The computing device of claim 1, wherein the non-transitory computer readable storage media further comprising computer executable code to be executed by the processor to:
provide product recommendations to the second user based on the activity log file.

8. A method comprising:
presenting to a first user, by a computing device, pictorial challenges in lieu of requiring the first user to enter a password to gain access to a service or the computing device;
receiving, at the computing device, a request from the first user to access a service that includes at least one of a media aspect and a non-media aspect;
determining, by the computing device, if the service is associated with a whitelist of approved services and if the service is associated with a blacklist of services that are not approved;
allowing, by the computing device, access to the service if the service is associated with the whitelist of approved services and not associated with the blacklist of services that are not approved;
denying, by the computing device, access to the service if the service is associated with the blacklist of services that are not approved;
logging, by the computing device, activities of the first user interacting with the computing device including information associated with the request from the first user to access the service to an activity log file; and
providing, by the computing device, access to a second user to the activity log file.

9. The method of claim 8 wherein the media aspect includes audio, video, audio-video, interactive content, text, instant message, email message, video chat, or audio chat.

10. The method of claim 8 wherein the non-media aspect includes an email address, an instant messaging address, a video chat address, access to an educational item, access to a help feature, control access to a media aspect, or a parental control.

11. The method of claim 10 wherein the parental control comprises a time limitation for the first user to access the service, a schedule according to which the service can be accessed, a task that must be completed by the first user before the first user can access the service.

12. The method of claim 8 wherein the whitelist of approved services includes a list of approved websites, a list of approved media types, list of approved educational items, or a categorization of approved websites or media types.

13. The method of claim 8 further comprising:
determining if the service is associated with a parental control; and
allowing access to the service only after a task specified in the parental control has been completed by the first user.

14. The method of claim 8 wherein the service includes television, personal computer, Internet, email, or instant message.

15. The method of claim 8 further comprising:
determining that the first user has mastered a predefined activity; and
changing an interface level based on the determination that the first user has mastered the predefined activity.

16. The method of claim 8 wherein presenting a first user pictorial challenges in lieu of requiring the first user to enter a password to gain access to a service or the computing device further comprises:
receiving from the first user, a selection in response to the pictorial challenges; and
determining that the selection received from the first user is correct.

17. The method of claim 8 wherein the pictorial challenges comprise a person, a shape, a color, or an item represented as a picture.

18. The method of claim 8 wherein the pictorial challenges are a sequence of at least one of a person, a shape, and a color.

19. The method of claim 8 further comprising:
providing product recommendations to the second user based on the activity log file.

20. The method of claim 8 further comprising:
providing reporting on how advanced the first user is in different subjects based on the activity log of the first user.

* * * * *